United States Patent
Iiyama et al.

(10) Patent No.: US 8,402,922 B2
(45) Date of Patent: Mar. 26, 2013

(54) LIVESTOCK BREEDING SYSTEM

(75) Inventors: Ichiro Iiyama, Mooka (JP); Yoshikazu Kobayashi, Kannabe (JP)

(73) Assignee: Kabushiki Kaisha Miike Tekkosho, Hiroshima (JP)

( * ) Notice: Subject to any disclaimer, the term of this patent is extended or adjusted under 35 U.S.C. 154(b) by 0 days.

(21) Appl. No.: 13/442,576

(22) Filed: Apr. 9, 2012

(65) Prior Publication Data

US 2012/0204804 A1 Aug. 16, 2012

Related U.S. Application Data

(62) Division of application No. 12/462,034, filed on Jul. 27, 2009, now abandoned, which is a division of application No. 11/002,563, filed on Dec. 2, 2004, now Pat. No. 7,585,665.

(30) Foreign Application Priority Data

Dec. 3, 2003 (JP) .................................. 2003-404832
Dec. 10, 2003 (JP) .................................. 2003-412225

(51) Int. Cl.
*A01K 1/01* (2006.01)
*A01K 1/00* (2006.01)
*C12M 1/00* (2006.01)
*C12M 3/00* (2006.01)

(52) U.S. Cl. ........ 119/530; 119/527; 119/528; 119/529; 119/525; 241/5; 241/39; 241/28; 435/289.1

(58) Field of Classification Search ............... 435/289.1; 241/5, 39, 28; 119/516, 525, 527, 528, 529, 119/530

See application file for complete search history.

(56) References Cited

U.S. PATENT DOCUMENTS

| | | |
|---|---|---|
| 3,660,244 A | 5/1972 | Che |
| 4,260,685 A | 4/1981 | Pilipski |
| 4,342,830 A | 8/1982 | Holloway |
| 4,502,641 A | 3/1985 | Coombe |
| 5,765,766 A | 6/1998 | Yoshida et al. |
| 5,855,326 A | 1/1999 | Beliavsky |
| 6,283,833 B1 | 9/2001 | Pao et al. |
| 6,824,086 B1 | 11/2004 | Mazurkiewicz et al. |
| 7,150,421 B2 | 12/2006 | Blumel et al. |
| 2005/0051649 A1 | 3/2005 | Taketomi et al. |

FOREIGN PATENT DOCUMENTS

| | | |
|---|---|---|
| CH | 686 042 A | 12/1995 |
| GB | 2 348 876 A | 10/2000 |
| JP | 10-174534 A | 6/1989 |
| JP | 11-188343 A | 7/1999 |
| JP | 11-319819 A | 11/1999 |
| JP | 2001-17988 A | 1/2001 |
| JP | 2002-262690 A | 9/2002 |
| JP | 2002-335790 A | 11/2002 |
| JP | 2003-199452 A | 7/2003 |
| JP | 2004-337136 A | 12/2004 |

OTHER PUBLICATIONS

English translation of JP 2004-337136 A, Yamanobe, Kohei.*

* cited by examiner

*Primary Examiner* — Nathan Bowers
(74) *Attorney, Agent, or Firm* — DLA Piper LLP (US)

(57) ABSTRACT

A livestock breeding system including a breeding place enclosed by a fence for breeding livestock; layers of wood chips spread over and stacked up on the surface of the earth in the breeding place; and a feedstuff for breeding the livestock, and in this system, the feedstuff is prepared by mixing wood fine chips containing sawdust and/or wood fibers with large quantities of fermentation tubes.

8 Claims, 31 Drawing Sheets

Fig. 12
1 Cultuninig of fermentation tube
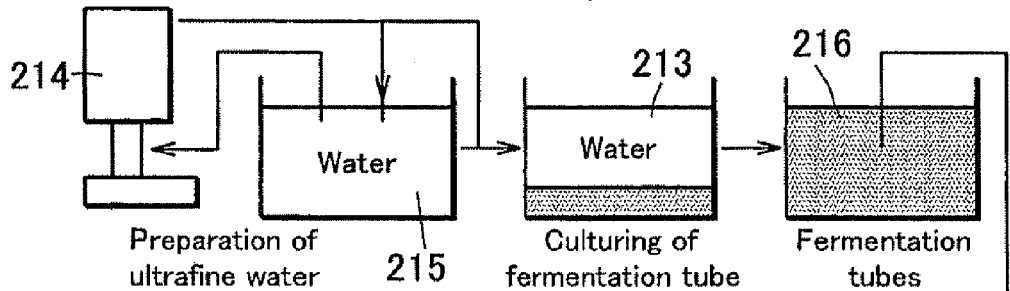
2 Fermentation treatment of colloidal sediment
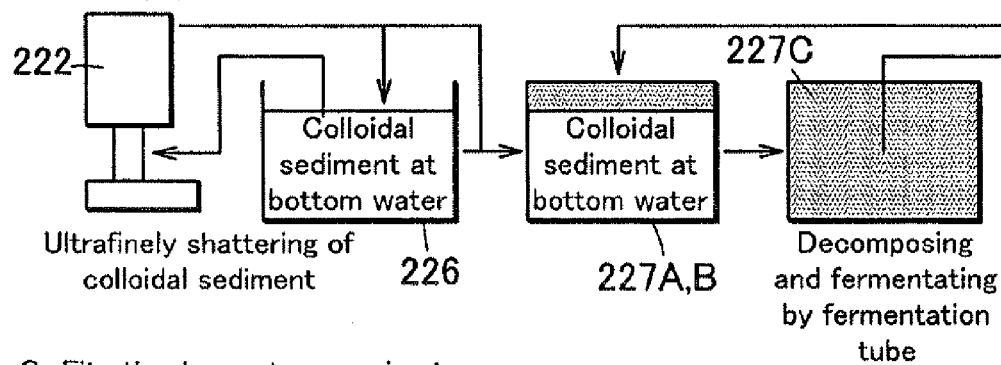
3 Fitration by postprocessing tower
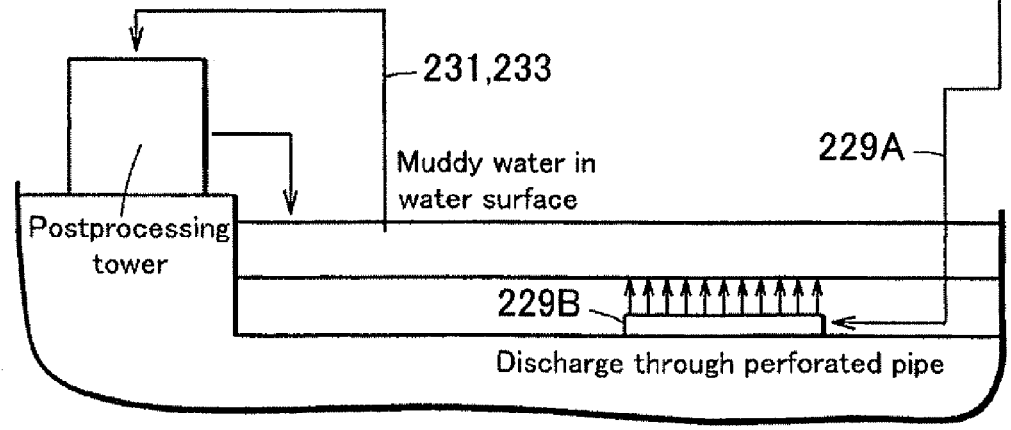

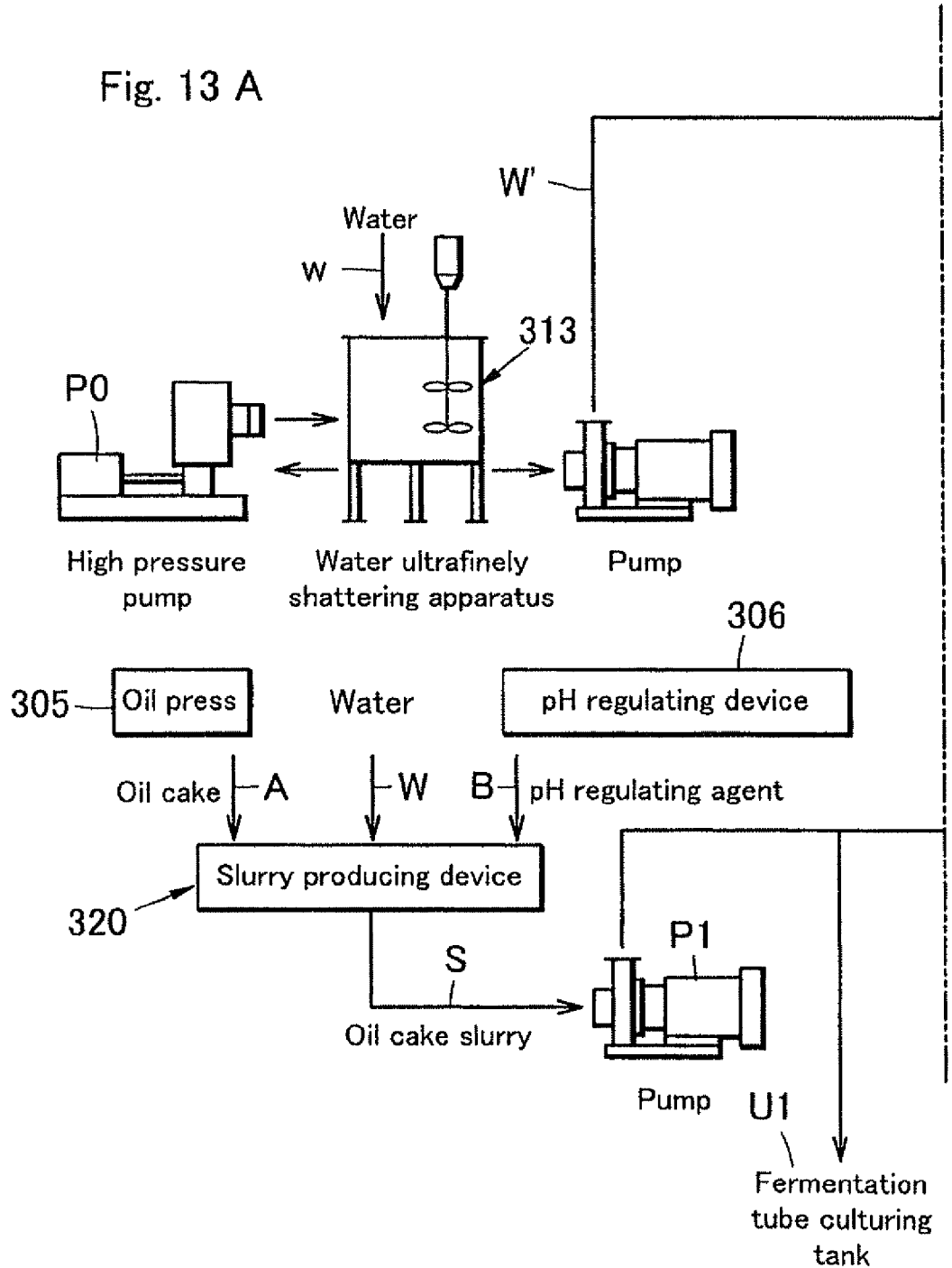

| Fig. 21 A | Fig. 21 B |

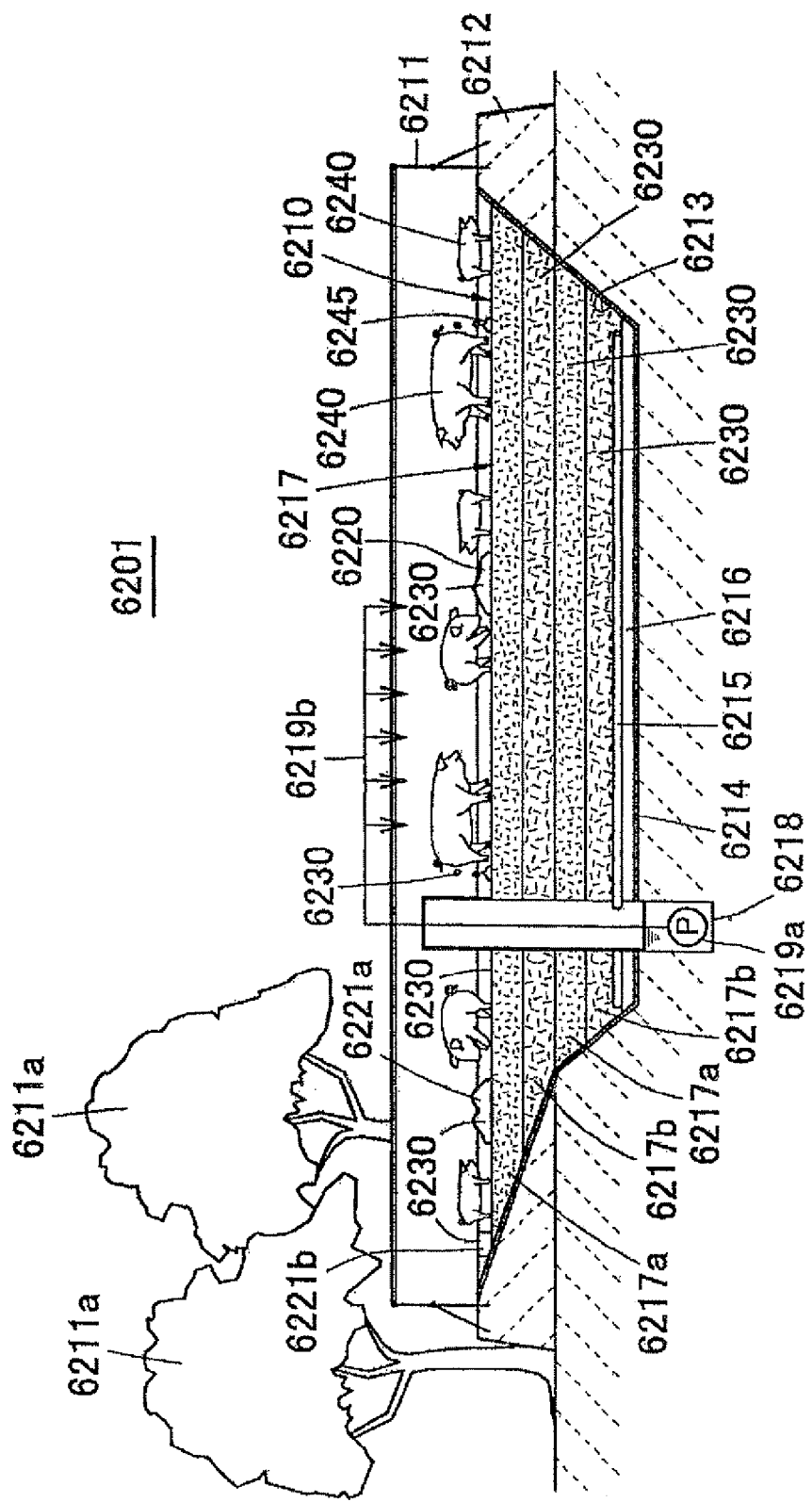

LIVESTOCK BREEDING SYSTEM

This is a 37 CFR §1.53(b) Divisional Application of a 37 CFR §1.53(b) divisional application of Ser. No. 12/462,034 which is a 37 CFR §1.53(b) divisional application of Ser. No. 11/002,563 (which is now the U.S. Pat. No. 7,585,665), which are hereby incorporated in its entirety by reference.

TECHNICAL FIELD

The present invention relates to an apparatus for ultrafinely shattering organic granular substances adapted to ultrafinely shatter organic wastes, particularly organic granular substances suspended in a slurry.

BACKGROUND OF THE INVENTION

Wastes discarded from the food industry, the stockbreeding and an ordinary household include large quantities of organic substances, and almost organic wastes are collected in a liquid, slushy or slurry-like condition. For example, as organic wastes there are a beverage, milk, pasteurized milk or other dairy products which have expired a consume-by date and thus been discarded from a shop, a waste liquid from the Shouchu industry, strained lees of an orange, an apple or other fruits discarded from the fruit juice industry, bean-curd refuse as a by-product during a bean curd process, sake lees produced during processing of Japanese rice wine (sake), oil cake, feces and urine of cattle discarded from a breeding farm or a pasture of a stock farmer, garbage from a household, a hotel and a restaurant, sludge from a biodegradation system and so on. These organic wastes may be recycled as a fertilizer in some cases, but they are almost incinerated in a garbage dump.

Since these wastes contain various kinds of ingredients, when being recycled as a fertilizer, it is preferable to process them into forms of dry powders, granules, pellets and so on. Therefore, it is necessary to finely crush them or smash them. Thereupon, it is also necessary for enhancing drying-up or granulation to finely crush or smash relatively long fibers of leaf-strings or roots of vegetables or straws mixed in cattle feces, hard bones, oils and fats contained in those wastes. Furthermore, since those wastes contain much water, the crushing and smashing is required to be carried out within a liquid or in a dripping wet condition.

Accordingly, as a wet method for smashing organic substances, a prior art utilizing a cavitation action is disclosed in the patent document of Japanese Patent Laid Open Publication No. 11-319819. The prior device has a water injection nozzle disposed within a box-like casing on one side so as to be directed toward inside, and air is sucked into a water jet to positively generate cavitation bubbles therein while the water jet is discharged through an opening on the other side, so that cells of organic granular substances can be broken by cavitation action of the water jet and gas-liquid separation can be attained.

In another reaction device utilizing a cavitation action as disclosed in the patent document of Japanese Patent Laid Open Publication No. 2001-017988, a high-pressure water jet nozzle and a target plate having a concaved surface disposed on the opposed side to the nozzle are fixedly arranged within a water such as a water in a pond or the like. Between the nozzle and the target plate, high-pressure water jet is produced so as to circulate autonomously and accompany with cavitation bubbles, so that by the cavitation produced there, organic granular substances suspended in the water can be dissolved and cell membranes of bacteria can be broken, resulting in purification of the water in the pond for a long time.

In the high-speed water flows injected from the water injection device, the cavitation action is generated to apply strong forces such as shear, tension, compression and so on to cells of the bacteria so as to cut and shatter the cells. The cavitation has such a capability as to break cells of plants, namely hard tissues or fiber constructed by the cells, which can be utilized in the shattering of the above-mentioned wastes.

In the former prior art, though comparatively soft organic granular substances such as the bacteria cells can be broken by breaking forces generated by the high-speed water flows, the breaking forces acting only instantaneously don't continue and thus are low in efficiency and lack of practical use with respect to the plant tissues, fibered tissues including hard portions of animals and a large mass. Especially, it is difficult to supply the plant fibers or lump-like substances effectively into the jet water flows. When processing animal wastes, especially containing fats, fats and oils are separated and suspended in a water to often make filter cloggy and to shut down the device resultantly. Therefore, it is difficult to operate the device continuously and effectively for a long time.

Further, since metallic component members of the casing is repeatedly subjected to an erosion, a corrosion and/or large impact accompanied with the cavitation produced by a continuous operation of the device within the casing, it is necessary to take a countermeasure for repeat fatigue failures of the component members considering their material characteristics and a construction of the casing.

SUMMARY OF THE INVENTION

The present invention is directed to solve the above-mentioned problems and to provide an apparatus which is capable of ultrafinely shattering wastes including plant and/or animal organic substances continuously and effectively.

Particularly, the present invention is directed to provide an apparatus for ultrafinely shattering organic granular substances which is also capable of effectively shattering such wastes as containing oils and fats, and other cloggy substances without failures as well as capable of mechanically and constructively resisting impact accompanied with cavitation action so as to continue a long-term operation.

The apparatus for ultrafinely shattering organic granular substances according to the present invention has annular passages formed between two adjacent cylindrical walls arranged substantially concentrically within a cylindrical casing, a water injection device disposed so as to inject a water tangentially into the annular passages to create circumferential circulation of high-speed water flows, and a supply port formed in the inner cylindrical wall or the outer cylindrical wall to supply slurry containing organic granular substances into the annular passage and ultrafinely shatter the organic granular substances by the high-speed water flows.

In this apparatus, the slurry containing the organic granular substances are supplied through the supply port into the high-speed circulating water flows within the annular passage and ultrafinely torn and shattered by utilizing shear forces and cavitation action accompanying with creation and breakage of air bubbles in the high-speed water flows circulating near at the supply port so as to be suspended in the water.

Further, when this apparatus generates such a speed distribution as getting faster toward radially outside and slower toward radially inside as well as getting slower toward the upper side relative to the lower side within the annular passages, the organic granular substances may be shattered by the shear forces created by the speed distributions and the shattering may be enhanced.

The high-speed water flows are continuously generated by injecting a water from the water injection device into the annular passage tangentially with respect to the cylindrical wall and thus the organic granular substances supplied into the high-speed water flows can be continuously sheared and shattered ultrafinely therein, so that advantageously the organic granular substances even including much oils and fats can be shattered efficiently without causing any clogging due to the oils and fats.

In the apparatus for ultrafinely shattering organic granular substances according to the present invention, since the cavitation action is effected by the high-speed water flows within the annular passage between the doubled cylindrical walls within the cylindrical casing, the apparatus is strengthened in construction so as to sufficiently resist a failure or a damage which might be caused by the impact. Further, in the apparatus for ultrafinely shattering organic granular substances according to the present invention, three or more cylindrical walls may be arranged as described later in an embodiment as well as laminar water flows may circulate in the respective annular passages between the inside cylindrical wall and the outside cylindrical wall, so that advantageously the laminar water adhering to each cylindrical wall can absorb impact of the cavitation to contribute to durability of the apparatus.

BRIEF DESCRIPTION OF THE DRAWINGS

FIG. 12 is a functional explanatory view of the installation.

FIG. 29 is a schematic vertical sectional view showing a pig-farming system according to another application embodiment of the present invention.

DESCRIPTION OF THE REFERENCE NUMERALS

Figure 1:
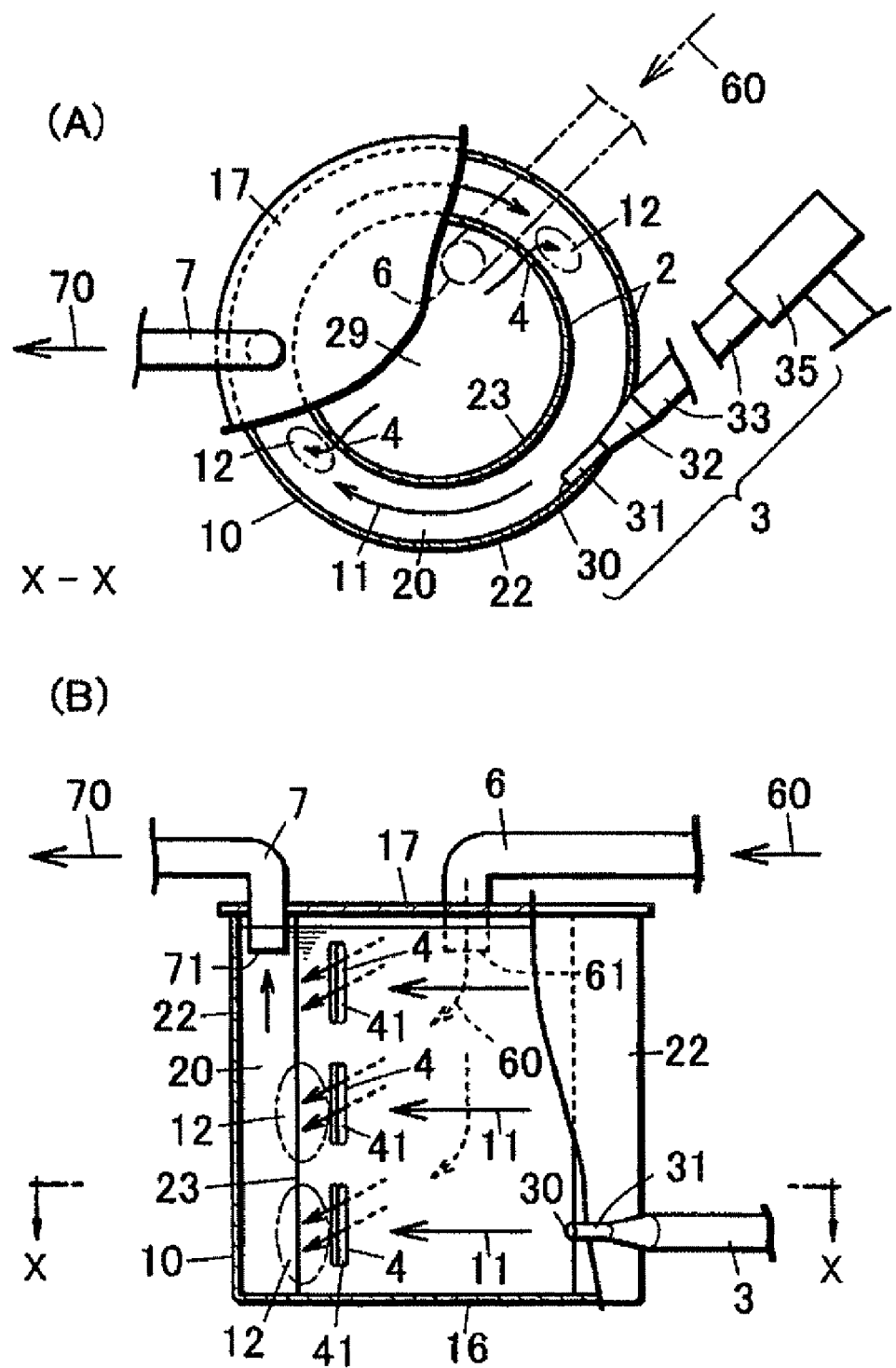
FIG. 1 schematically shows an apparatus for ultrafinely shattering organic granular substances according to one embodiment of the present invention, (A) is a fragmentary horizontal sectional view thereof and (B) is a fragmentary vertical sectional view thereof.

- 101 Double-coupled apparatus for ultrafinely shattering organic granular ubstances
- 102 Triple-coupled apparatus for ultrafinely shattering organic granular ubstances
- 201 Installation for decomposing colloidal sediment at the bottom of water
- 203 Area of colloidal sediment
- 301 Installation for decomposing oil cake
- 410 Installation for treating a ballast water of a ship
- 580 Another apparatus for ultrafinely shattering organic granular substances
- 601 Feedstuff manufacturing plant
- 604 Apparatus for ultrafinely shattering cluster of a water
- 605 Apparatus for separating packing materials from waste packed foods
- 665 Rotary spiral member
- 615 Wood smashing device
- 6100 Waste treating apparatus
- 6210 Pig-farming system
- 6250 Wood crushing device

DETAILED DESCRIPTION OF THE PREFERRED EMBODIMENTS

An apparatus for ultrafinely shattering organic particle substances contained in slurry according to the present invention comprises a cylindrical casing having a top wall, a bottom wall and two or more substantially concentric cylindrical walls arranged between the top wall and the bottom wall so as to define communicating annular passages between the adjacent cylindrical walls, a water injection device for injecting a pressurized water into the annular passage tangentially with respect to the cylindrical wall so as to generate high-speed water flows in a circumferential direction therein, a supply port formed in at least one of the top wall, the bottom wall and the cylindrical walls for supplying the slurry containing the organic granular substances, and a discharge port formed elsewhere in at least one of the top wall, the bottom wall and the cylindrical walls for discharging ultrafinely shattered organic particle substances, wherein the organic granular substances are shattered into particulates including ultrafine ones having the size of a few micrometers at least by means of shearing action created between the high-speed water flows.

The cylindrical casing with a bottom has annular passages defined between the two concentric cylindrical walls therein. In this invention, the cylindrical casing may have the cylindrical walls arranged vertically concentrically about the vertical axis or horizontally concentrically about the horizontal axis, and further may have the cylindrical walls arranged slantly concentrically about the slant axis with respect to the horizontal plane. Embodiments of the ultrafinely shattering apparatus of the vertical type will be explained exclusively hereinafter, but the explanation about that is also applicable to the horizontal type and the slant type.

The water injection device has a water injection pipe with its delivery opening at the leading end opened in the annular passage and its delivery direction directed tangentially with respect to the cylindrical wall. A water supply pump is connected to the water injection pipe pressurizes a water and supplies the pressurized water the annular passage through the delivery opening at a high speed so as to circulate the high-speed water flows in the annular passage.

In one example of the water injection pipe, it is preferable to increase a speed of the water flows to be delivered to the annular passage by providing a tapered portion in a midway portion leading to the delivery opening and a straight pipe portion of a small diameter and a length of 30 cm or more connected to an outlet of the tapered portion so as to form the delivery opening at its leading end.

As mentioned above, organic granular substances to be ultrafinely shattered includ food wastes, garbage from a household, oil cake, pressed food residues such as bean-curd refuse, feces and urine, and so on. These or other organic substances are previously crushed to include smashed solid substances and fibers having suitable size and length of, for example 20 mm or less, preferably 5 mm or less, especially 1 mm or less so as to pass through at least supply ports or supply nozzles as described later. It is preferable to fluidize the crushed organic substances to a certain extent as a whole so as to prepare them as a slurry movable through the pump and the piping. The slurry containing the organic granular substances is supplied into high-speed water flows within the annular passage and ultrafinely shattered in the high-speed water flows.

In the present invention, the supply port is formed as a slot-like nozzle in the cylindrical wall. The slot-like nozzle (in the vertical cylindrical casing, referred simply to as the vertical slot-like nozzle hereinafter) is elongated in the direction of the center axis of the cylindrical wall. Generally, the slurry supply direction is set to be substantially perpendicular to the cylindrical wall.

In order to ultrafinely shatter such organic granular substances, it is preferred to increase an average speed of the water flows circulating within the annular passage up to 8 m/second or more, particularly to 10 m/second or more. When being slower than 8 m/second, the ultrafinely shattering effect becomes insufficient.

In order to maintain the preferable speed securely, a quantity of water to be supplied is decided relative to a volume of the annular passage. For example, the quantity of water to be supplied from the water injection device per 100 liters of the volume of the annular passage is set to a range of 17 to 25 liter/second. Within this range, an average residence time of the supplied water within the annular passage can be made to be 3 to 6 seconds. This residence time is preferable for attaining a sufficient effect of the ultrafinely shattering the organic granular substances supplied from the supply port within the high-speed water flows under the above-mentioned range of flow speed.

The slot-like nozzle of the supply port may be disposed so that the slurry can be supplied into the high-speed water flows in the annular passage through the nozzle in the opposed direction to the water flows. Further, the slot-like nozzle of the supply port may be disposed so that the slurry can be supplied into the high-speed water flows through the nozzle in the same direction as that of the water flows.

The water flows in the annular passages may have speed differentials created in radial directions and/or in the rotary axis direction (in the upper and lower direction in the vertical apparatus) to shatter the organic granular substances by the shearing action created by the speed differentials.

The slot-like nozzle may be fixedly secured to the inside cylindrical wall forming the annular passages so that a slurry supply opening is provided inside the cylindrical wall, and the annular passage may be provided with a discharge port for discharging a portion of the high-speed water flows containing the ultrafinely shattered organic particle substances.

In another feature of the present invention, the slot-like nozzle may be formed in an outer cylindrical wall forming the annular passages, and the cylindrical casing covers the outer cylindrical wall and the outermost cylindrical wall provided with a slurry supply opening. This mode may have a circulation passage through which a portion of the high-speed water flows within the annular passages is returned to the water injection device. Since the recovered portion of the high-speed water flows containing the shattered organic particle substances from the slurry is injected again into the annular passage, the organic particle substances can be repeatedly shattered effectively to ultrafine degrees.

The inside cylindrical wall may have a recovery slot formed therein and a discharge opening provided in an interior of the inside cylindrical wall so as to be connected to the circulation passage.

In the ultrafinely shattering apparatus of the present invention, one of the adjacent cylindrical walls forming the annular passage therebetween may be rotatably supported about a vertical axis and connected to a rotating means for rotating it so as to accelerate upper water flows in the annular passage about the axis by means of blades formed in an upper portion of the cylindrical wall. The rotating means may be made from blades projecting from a lower portion of the cylindrical wall radially about the axis so as to be rotated by receiving the high-speed water flows by the blades. Another rotating means may be composed of an electric motor installed in the apparatus and a transmission means for transmitting a rotary force of the motor to the cylindrical wall.

Embodiment 1

In the Embodiment 1 of the present invention, a slurry containing organic particle substances is supplied from the supply nozzle into an annular passage substantially in the perpendicular direction to the water flowing direction. Therefore, the supply nozzle is formed like a vertically elongated slot passing through the outside or the inside cylindrical wall. The organic granular substances in the slurry supplied into the high-speed water flows within the annular passage are ultrafinely shattered by a cavitation action or a shearing action produced in the high-speed water flows.

In FIG. 1 showing the Embodiment 1, a cylindrical casing 10 has an inside cylindrical wall 23 and an outside cylindrical wall 22 mounted concentrically between a bottom plate 16 and a top plate 17 so as to form annular passages therein. A water injection pipe 33 of the water injection device 3 is fixedly attached to the outside cylindrical wall 22 adjacent to the bottom plate 16 so that a delivery opening 30 at a leading end of a narrowed straight pipe portion 31 of the water injection pipe 33 is directed in the tangential direction relative to the outside cylindrical wall and opened inside the outside cylindrical wall 22. The water injection pipe 33 is connected on the other side to a water supply pump 35 in communication to a water source. During operation, a water delivered from the water supply pump 35 is injected into the annular passage 20 from the delivery opening 30 at a leading end so as to create high-speed water flows 11 circulating at a high speed in the passage 20.

The slurry 60 containing the organic granular substances to be shattered is supplied into inside the inside cylindrical wall 23 from a slurry supply port 61 of a slurry supply pipe 6 and then supplied into the annular passage 20 through several sets of supply nozzles 4 each set of which comprises three vertically elongated slot-like nozzles 41 formed in the inside cylindrical wall 23 and arranged in the upper and lower direction. The slurry 60 inside the cylindrical wall 23 is supplied into the high-speed water flows 11 within the annular passage 20 through the supply nozzles 4, and the organic granular substances contained in the slurry are shattered into ultrafine particulates by shearing and cavitation generated by the high-speed water flows 11 at mixing zones 12 near to the nozzles 4. The shearing action for enhancing the shattering is created by speed differentials between the high-speed water flows 11 circulating in the annular passage 20.

In the vertically elongated slot-like nozzle 41, its longitudinal (in this case, its vertical) length may be set optionally, and its lateral width is made narrow to such an extent as to deliver the slurry into the high-speed water flows 11 at a high speed, for example set in a range of 5 to 25 mm, preferably of 10 to 15 mm, particularly set to 12 mm. An edge of the slot is rounded so as to prevent the clogging of the nozzle. The slurry delivered from the nozzles 41 causes the cavitation at the nozzles 41 themselves and at the mixing zones 12 by interaction with the high-speed water flows 11 within the annular passage, wherein extremely strong stirring with water and air bubbles produces large impact forces which readily shatter the organic granular substances, even cells of organic substances into ultrafine particles usually to an extension of 1 to 10 μm around.

A portion of the high-speed water flows 11 within the annular passage 20 is discharged substantially by an amount corresponding to an injected water from the water injection pipe 33 and a supplied slurry from the nozzles 41 from a discharge opening 71 to a discharge pipe 7.

A discharged water 70 may be separated into a wet lump of ultrafine organic particle substances and a water, while the recovered water is usually sucked by the supply pump 35 so as to be returned to the high-speed water flows 11 within the annular passage 20 through the water injection pipe 33.

Embodiment 2

In this Embodiment 2, an ultrafinely shattering apparatus utilize a shearing action provided by producing flow speed differentials in the radial direction and/or in the upper and lower direction in the high-speed water flows within the annular passage formed within the vertical cylindrical casing. Generally, the high-speed water flows get faster on the side of the outside cylindrical wall and slower on the inside cylindrical wall as well as when the delivery opening of the water injection device is disposed near to the bottom plate, the high-speed water flows get faster toward the bottom plate and slower to the top plate within the annular passage (to the contrary, when the water injection device is disposed near to the top plate, the water flows get faster toward the top plate and slower toward the bottom plate). Owing to such distributions of speed differentials of the water flows within the annular passage, the shear forces are applied to the organic granular substances to shatter them ultrafinely. In consideration of that above-mentioned feature, the ultrafinely shattering apparatus according to this embodiment has the water injection device disposed in the annular passage on the side of the outside cylindrical wall rather than the inside cylindrical wall as well as on the side of the bottom plate. Thereupon, the supply nozzle for the slurry may be formed in either cylindrical wall, but it is preferable to form it in the outside cylindrical wall to utilize the faster water flows.

Figure 2:
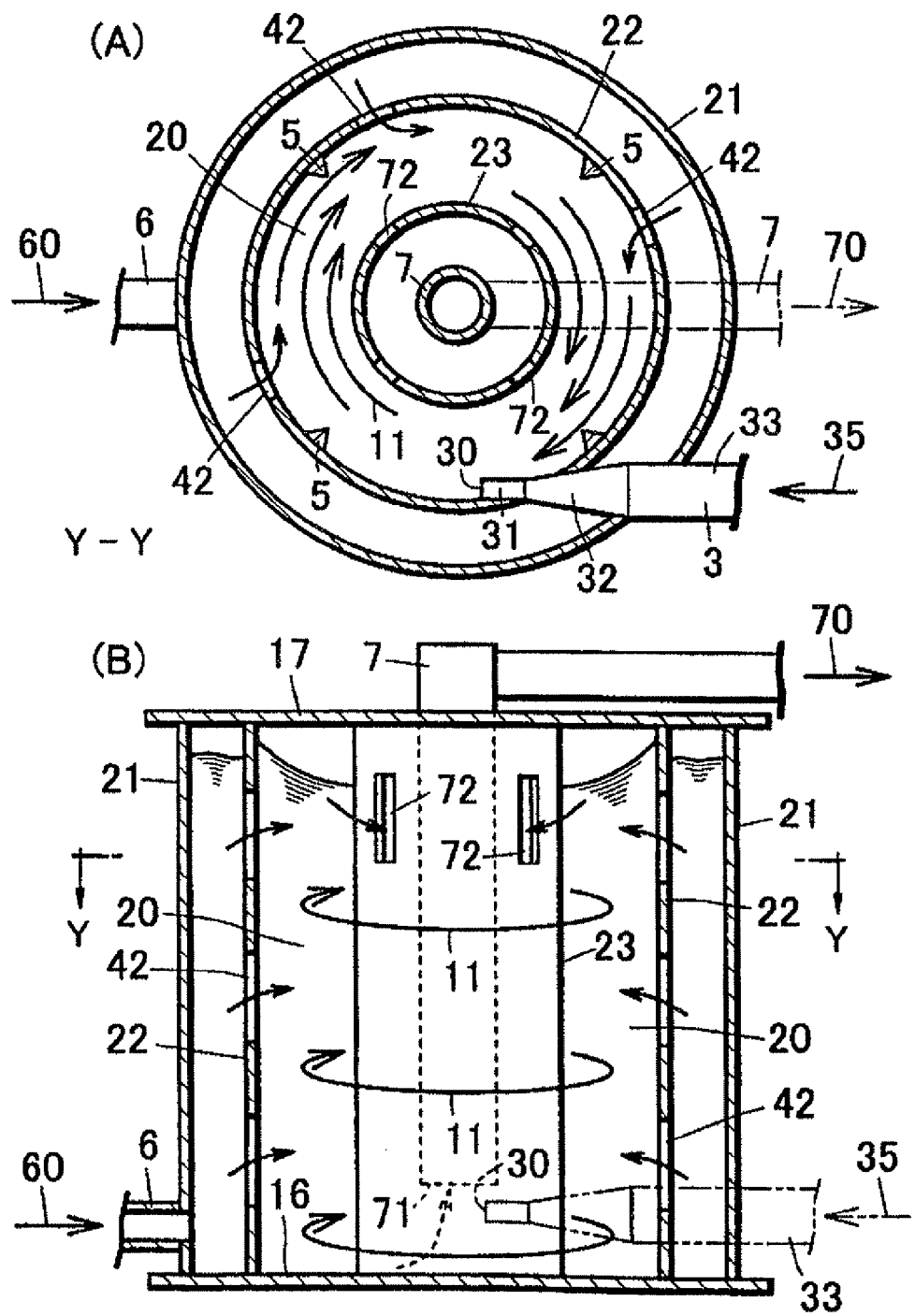
FIG. 2 schematically shows an apparatus for ultrafinely shattering organic granular substances according to another embodiment of the present invention, (A) is a fragmentary horizontal sectional view thereof and (B) is a fragmentary vertical sectional view thereof.

This ultrafinely shattering apparatus of this embodiment is shown in FIG. 2 and a cylindrical casing 10 has an inside cylindrical wall 23 and an outside cylindrical wall 22 between which the annular passage 20 is formed and another outside cylindrical wall (a second cylindrical wall) 21 disposed outside the mounted concentrically between a bottom plate 16 and a to plate 17, while since the vertically elongated slot-like nozzles 42, 42 are formed in the outside cylindrical wall (the first cylindrical wall) 22, the slurry 60 supplied to the annular passage between the first and the second outside cylindrical walls 22, 21 through the supply pipe 6 can be supplied into the high-speed water flows 11 through the nozzles 42, 42.

A width of the annular passage 20 between the inside cylindrical wall 23 and the outside cylindrical wall 22 is set to be comparatively wide so that the high-speed water flows 11 can have a large speed differential in the radial direction, preferably to 50 to 200 mm, particularly to 100 mm. The slot-like nozzles 42 are formed in the outside cylindrical wall 22 so as to be disposed on the outside within the annular passage 20 where the flow speed is higher.

In this embodiment, a portion of the high-speed water flows 11 is discharged through vertically elongated outlets 72, formed in the upper portion of the inside cylindrical wall 23 to an interior of the inside cylindrical wall 23 and a water pooled within the inside cylindrical wall 23 is discharged as a discharge water 70 through a discharge pipe 7 having an inlet opening 71.

Further, suitable projections may be formed in an inner surface of the first outside cylindrical wall or an outer surface of the inside cylindrical wall so as not to decrease the speeds of the high-speed water flows and to produce cavitation in high-speed turbulent flows around the projections to enhance the ultrafinely shattering of the organic granular substances. The projection may be formed as a streamlined member having a certain length and a cross-section such as a triangle, a rectangle, a trapezoid, or a semicircle or the like and may be arranged at a certain interval along the surrounding surfaces of the cylindrical walls.

As shown in FIG. 2(A), the four pieces of projections (baffle plates) 5 having the triangle cross-section and a vertical length are fixedly secured at their one sides to the inner surface of the first cylindrical wall 22 so as to easily generate cavitation adjacent thereto.

Embodiment 3

In this embodiment, the slurry supply slot-like nozzles are disposed in the first outside cylindrical wall so that the slurry supply direction is opposed to the flow direction of the high-speed water flows, namely the slurry supplied from the nozzles collides against the high-speed water flows within the annular passage. When the flows of slurry collide against the high-speed water flows, extremely strong impact forces and cavitation air bubbles are generated in stirred and turbulent flows at mixing zones to ultrafinely shatter the organic granular substances suspended in the slurry there. Though such nozzles may be formed in the inside cylindrical wall also, it is preferred that the vertically elongated slot-like nozzles are formed in the inner surface of the outside cylindrical wall on the higher speed side.

Figure 3:
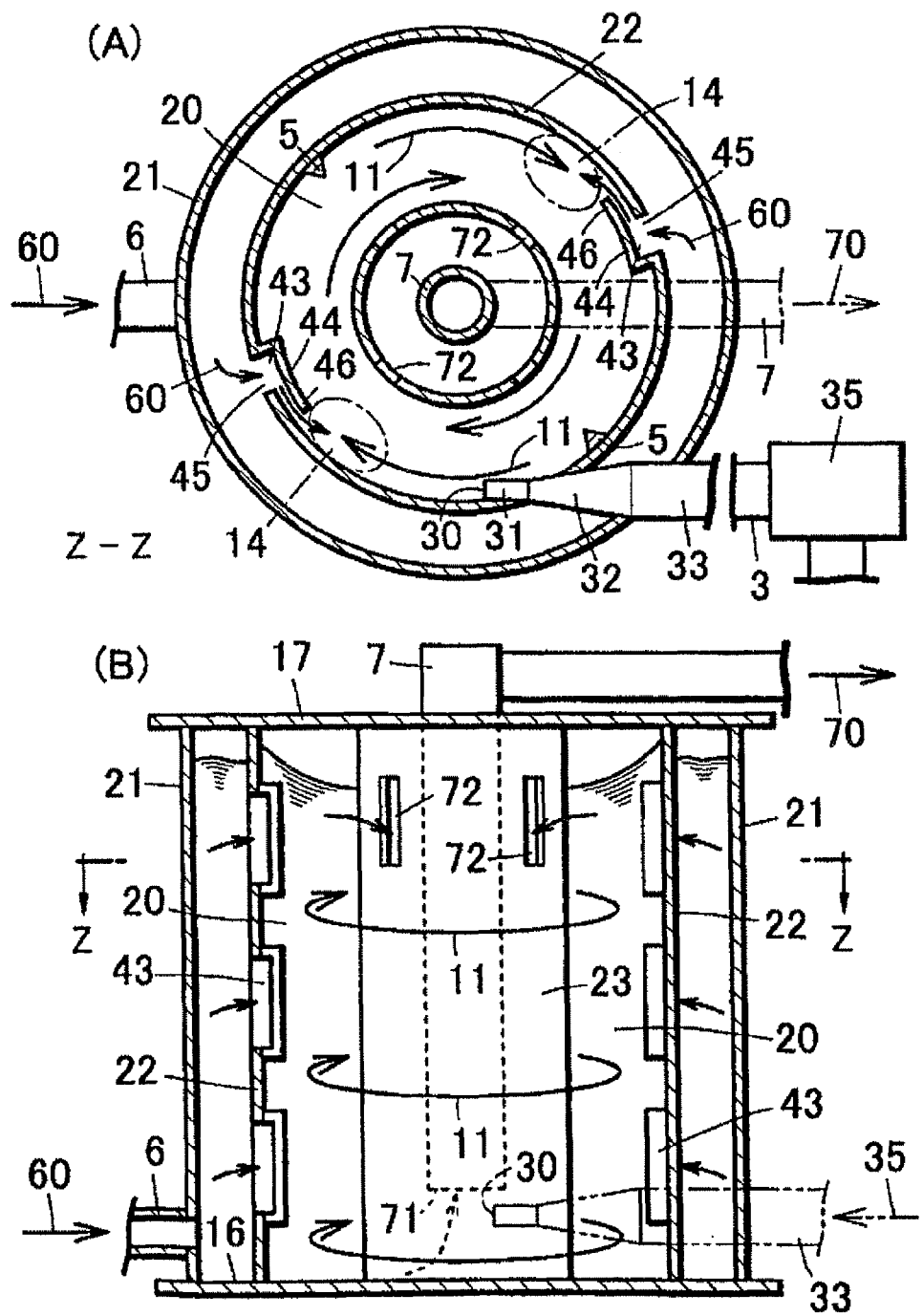
FIG. 3 schematically shows an apparatus for ultrafinely shattering organic granular substances according to still another embodiment of the present invention, (A) is a fragmentary horizontal sectional view thereof and (B) is a fragmentary vertical sectional view thereof.

As shown in FIG. 3, the water injection pipe 33 having the delivery opening 30 is attached to the first outside cylindrical wall 22 so that the water flow injected into the annular passage 20 defined between the inside cylindrical wall 23 and the outside cylindrical wall 22 within the cylindrical casing 10 can be directed tangentially relative thereto to generate the high-speed water flows within the annular passage 20.

The slot-like nozzles 43 are arranged in three stages in the vertical direction and at two locations in the circumferential direction and comprise a narrow vertical slot 45 formed in the first outside cylindrical wall 22 and a curved flow guide plate 44 with its one end fixedly secured to a downstream side edge of the vertical slot 45 and its other end forming a vertically elongated opening 46 together with the outside cylindrical wall 22 so that the slurry 60 can flow out into the upstream side mixing zone 14 within the annular passage 20 through a gap defined between the guide plate 44 and an inner surface of the outside cylindrical wall 22 and collide against the high-speed water flows 11 there. As a result, mixing zone 14 with large cavitation action is generated so that organic granular substances in the slurry can be broken.

A part of the high-speed water flows 11 is discharged through vertically elongated outlets 72 formed in the upper portion of the inside cylindrical wall 23 into an interior of the inside cylindrical wall 23, wherein a water pooled within the inside cylindrical wall 23 is discharged as a discharge water 70 through a discharge pipe 7.

Embodiment 4

An ultrafinely shattering apparatus according to this embodiment of the present invention includes a circulation passage for returning a portion of a discharge water separated from the high-speed water flows and containing the ultrafinely shattered organic particle substances to the water injection device to repeatedly perform the ultrafinely shattering of the organic particle substances and thus enhance an efficiency of the ultrafinely shattering. In this embodiment, the slurry supplied through an outermost cylindrical wall thereinto of multiple cylindrical walls within the cylindrical casing is supplied into the high-speed water flows within the annular passage defined between the inside cylindrical wall and the outside cylindrical wall as mentioned above so as for the organic granular substances suspended therein to be ultrafinely shattered, and a portion of the water flows is supplied into another inside cylindrical wall arranged inside the above-mentioned inside cylindrical wall so that a portion of the supplied portion is discharged and the remainder is supplied to a high-pressure pump from still another inside cylindrical wall for circulation.

Figure 4:
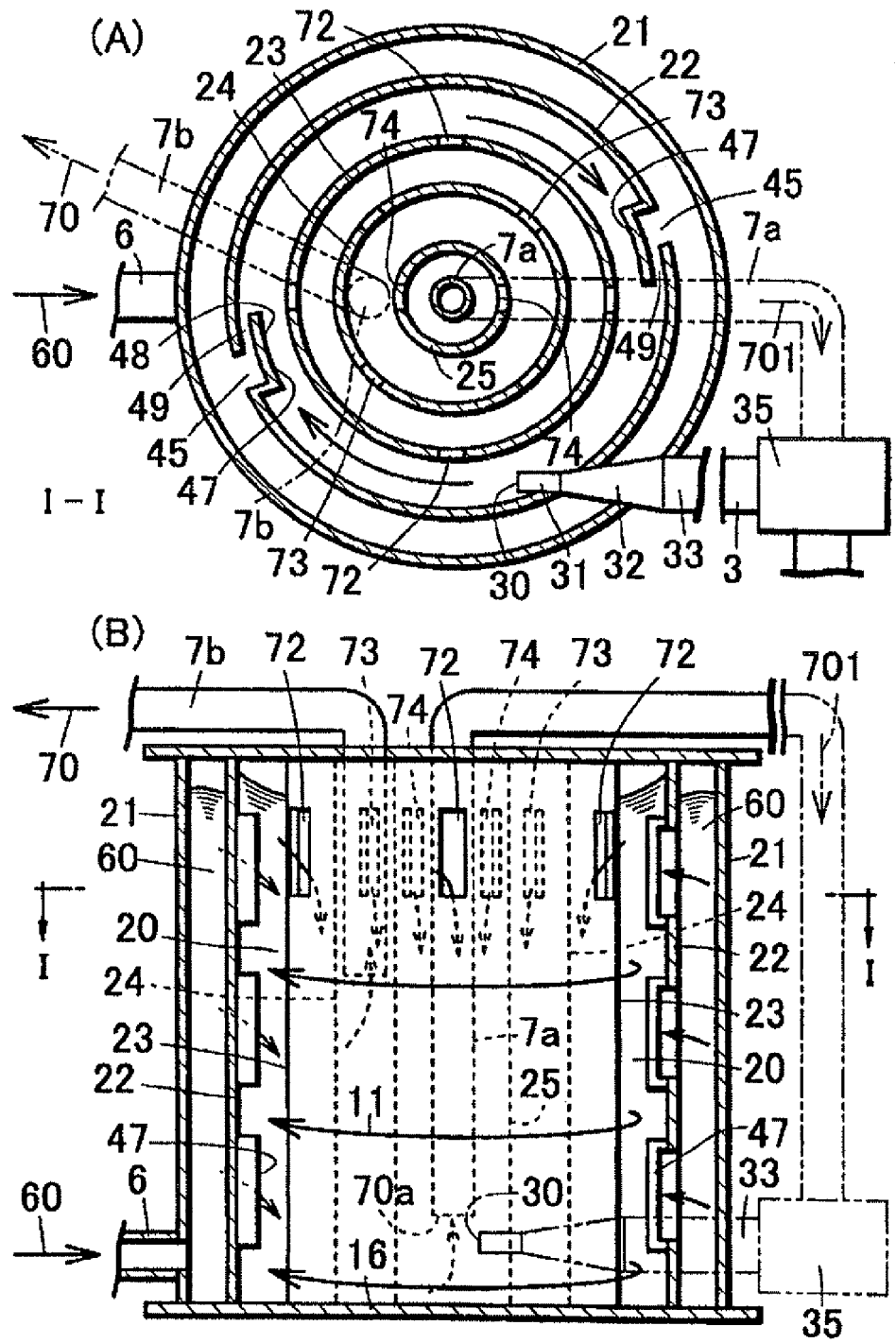
FIG. 4 schematically shows an apparatus for ultrafinely shattering organic granular substances according to further embodiment of the present invention, (A) is a fragmentary horizontal sectional view thereof and (B) is a fragmentary vertical sectional view thereof.

In FIG. 4 showing this embodiment, a cylindrical casing 10 has the annular passage 20 for the high-speed water flows 11 defined between a first outside cylindrical wall 22 adjacent to the bottom plate 16 so that a delivery opening 30 is directed in the tangential direction relative to the first outside cylindrical wall 22 and opened within the annular passage 20. In this embodiment, a second cylindrical wall 21 is disposed outside the first outside cylindrical wall 22, and the slurry 60 supplied to the annular passage between the first and the second outside cylindrical walls 22, 21 through the supply pipe 6 can be further supplied into the high-speed water flows 11 through vertical nozzles 45 formed in the first outside cylindrical wall 22. The vertical nozzle 45 has a curved flow guide plate 47 with its one end fixedly secured to a upstream side edge of the slot and its other end forming a vertically elongated opening 49 together with the outside cylindrical wall 22 so that the slurry 60 can flow out into the downstream side mixing zone within the annular passage 20 through a gap defined between the guide plate 47 and an inner surface of the outside cylindrical wall 22 and mix with the high-speed water flows 11 there so as to be ultrafinely shattered there.

In this embodiment, inside the first inside cylindrical wall 23, there are provided second and third concentric inside cylindrical walls 24, 25, and all of them has outlets 72, 73, 74 formed in their upper portions so that a portion of the high-speed water flows 11 can flow inwardly sequentially into the into the third inside cylindrical wall 25. A portion of the water flows 11 is supplied between the second and the third inside cylindrical wall 24, 25 so that a portion of the supplied portion is discharged as a discharge water through a discharge pipe 7b and the remainder is returned to a high-pressure pump 35 from an interior of the third inside cylindrical wall 24 through a circulation discharge pipe 7a.

Embodiment 5

In this embodiment, an inside cylindrical wall forming the annular passage is rotatably supported about a vertical axis and has rotary upper blades projecting radially about the axis as a rotating means so as to accelerate upper water flows in the annular passage. As the rotating means, blades are also projected radially from a lower portion of the rotary inside cylindrical wall about the vertical axis so as to be rotated by receiving the high-speed water flows from the water injection device by the lower blades. When the lower blades are rotated, the rotary upper blades are rotated through the rotary inside cylindrical wall to accelerate the upper water flows within the annular passage. The ultrafinely shattering of the organic granular substances is enhanced also by the accelerated upper water flows.

Figure 5:
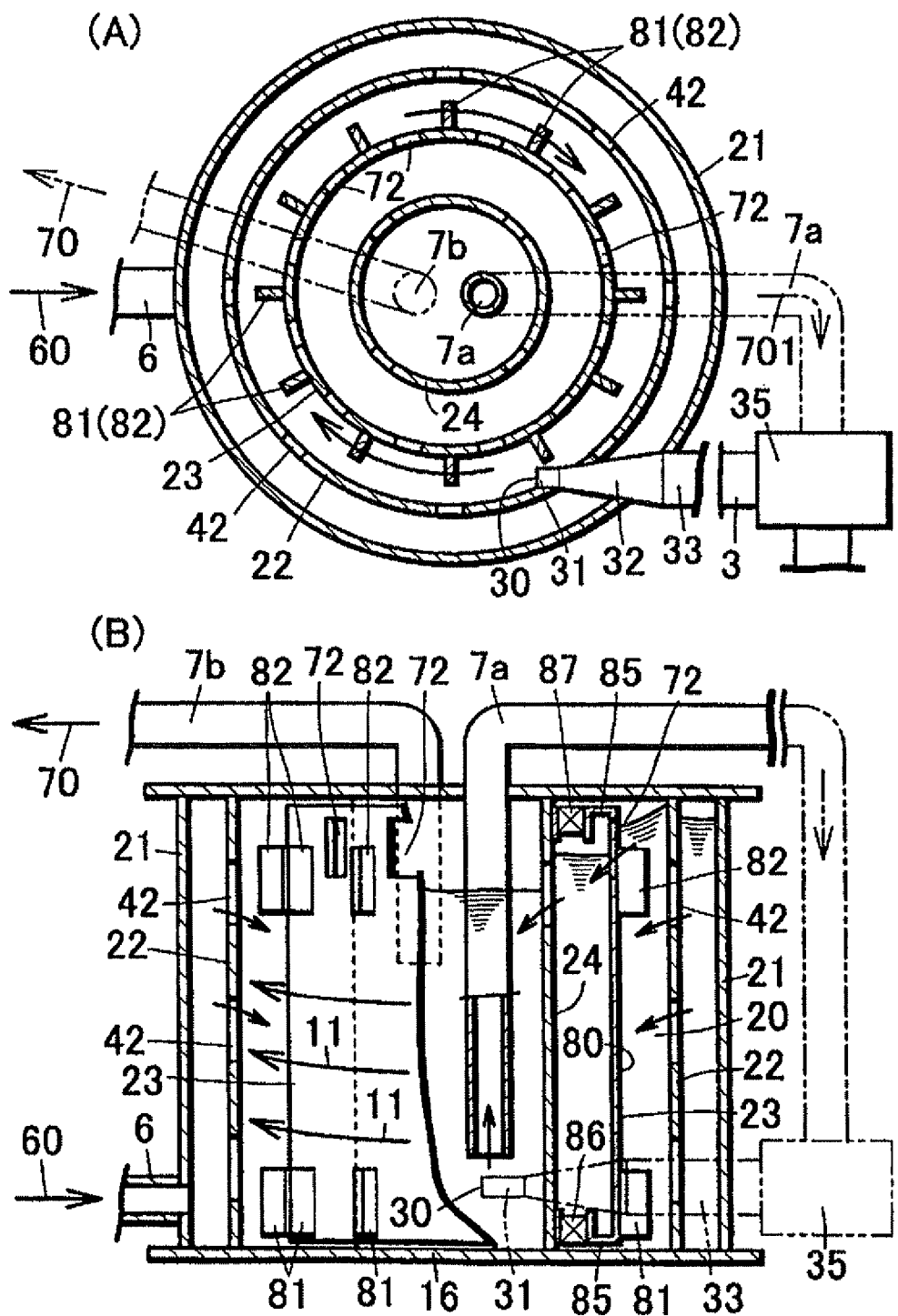
FIG. 5 schematically shows an apparatus for ultrafinely shattering organic granular substances according to still further embodiment of the present invention, (A) is a fragmentary horizontal sectional view thereof and (B) is a fragmentary vertical sectional view thereof.

As shown in FIG. 5, the first inside cylindrical wall 23 as a rotary inside cylindrical wall has upper blades 82 projected radially from its upper portion and lower blades 81 projected radially from its lower portion respectively. In this embodiment, the rotary inside cylindrical wall 23 is rotatably supported by the second inside cylindrical wall 24 through its upper and its lower support plates 85, 85 and bearings 87, 86, so that the blades 82, 81 can be rotated within the annular passage 20 by the rotation of the rotary inside cylindrical wall 23 through the bearing 87, 86.

The rotary inside cylindrical wall 23 is rotated by a water injection from the water injection pipe 33 and the high-speed water flows through the lower blades 81 which are positioned at substantially the same level as the delivery opening 30 of the water injection pipe 33, so that also the upper water flows can be accelerated to the same high-speed as that of the lower water flows by the upper blades 82. The slurry 60 is supplied to a space between the first and the second outside cylindrical walls 22, 21 and then supplied to the annular passage 20 through the vertically elongated slot-like nozzles 42 formed in the first outside cylindrical wall 22, so that the organic granular substances suspended in the slurry can be ultrafinely shattered there by the upper and lower high-speed water flows. The water containing the ultrafine organic particulate substances flows into an interior of the second inside cylindrical wall 24 through outlets 72 formed in the rotary first inside cylindrical wall 23 and the second inside cylindrical wall 24. A portion of the water within the second inside cylindrical wall 24 is discharged through the discharge pipe 7b and the remainder is supplied to the water supply pump 35 through the circulation discharge pipe 7a so as to be returned to the annular passage 20 again.

Embodiment 6

Figure 6:
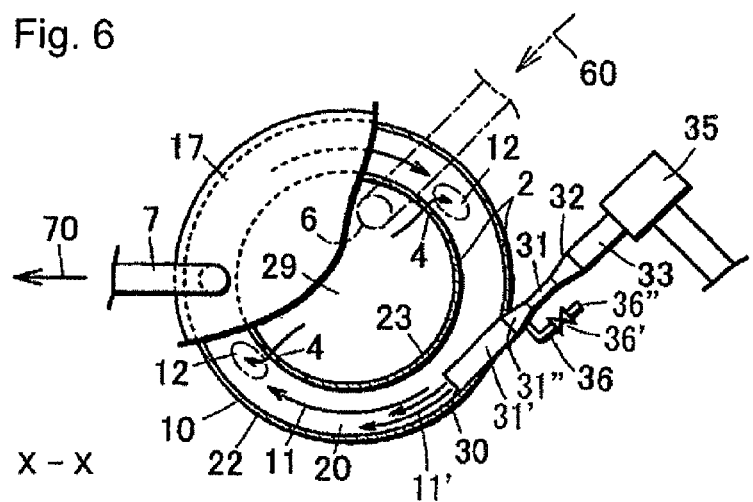
FIG. 6 is a fragmentary horizontal sectional view, similar to FIG. 1(A), of an apparatus for ultrafinely shattering organic granular substances according to another embodiment of the present invention.

This embodiment shown in FIG. 6 is directed to deliver air bubbles into the circulating water flows within the annular passage together with the high-speed water flows from the injection opening of the water injection device and as a variant embodiment of the apparatus shown in FIG. 1, has an air suction pipe 36 installed to the water injection pipe 33. The narrowed straight pipe portion 31 of the water injection pipe 33 has a widened portion 31' on its leading end side, the delivery opening 30 of which is directed tangentially with respect to the inner surface of the outside cylindrical wall 22. An air suction pipe 36 with a valve 36' is connected to a transition portion 31" disposed between the widened portion 31' and the original narrowed straight pipe portion 31. The air suction pipe 36 is opened to the atmosphere by the valve 36'. The water flow supplied by the pump 35 is compressed and accelerated at the narrowed straight pipe portion 31 and expanded on the way from transition portion 31" to the widened portion 31' where a pressure of the water flow is decreased to a negative pressure relative to the atmospheric pressure so that air can be sucked from the air suction pipe 36 into the widened portion 31' through the opened valve 36' and supplied into the high-speed water flows 11 within the annular passage 20 as fine air bubbles. The air suction pipe 36 may be connected to the widened portion 31'. The distribution of air bubbles in the high-speed water flows within the annular passage can be controlled by adjusting an amount of the suction air into the annular passage through the valve 36'. The air bubbles supplied into the high-speed water flows further stir the high-speed water flows 11 to promote the ultrafine shattering of the organic granular substances suspended in the slurry supplied into the high-speed water flows through the slot-like nozzles 4 and to enhance an efficiency of the shattering.

In the respective embodiments, it is preferred that the slurry containing the organic granular substances to be supplied to the ultrafine shattering apparatus of the present invention may be previously crushed or cut into 30 mm or less, for example by a cutter-pump or a hammer-pump on the way to the apparatus. Further, the crushed or cut organic granular substances may be filtered or screened before the apparatus to remove coarse grains or long fibers. Such preliminary crushing and filtering is especially applicable to wastes containing plants and/or cattle feces and urine.

Shattered solid bodies suspended in the discharge water from the ultrafinely shattering apparatus of the present invention may be caught by a filter and spin-dried by a dehydrator for use as, for example fertilizers depending on an application.

Embodiment 7

Figure 7:
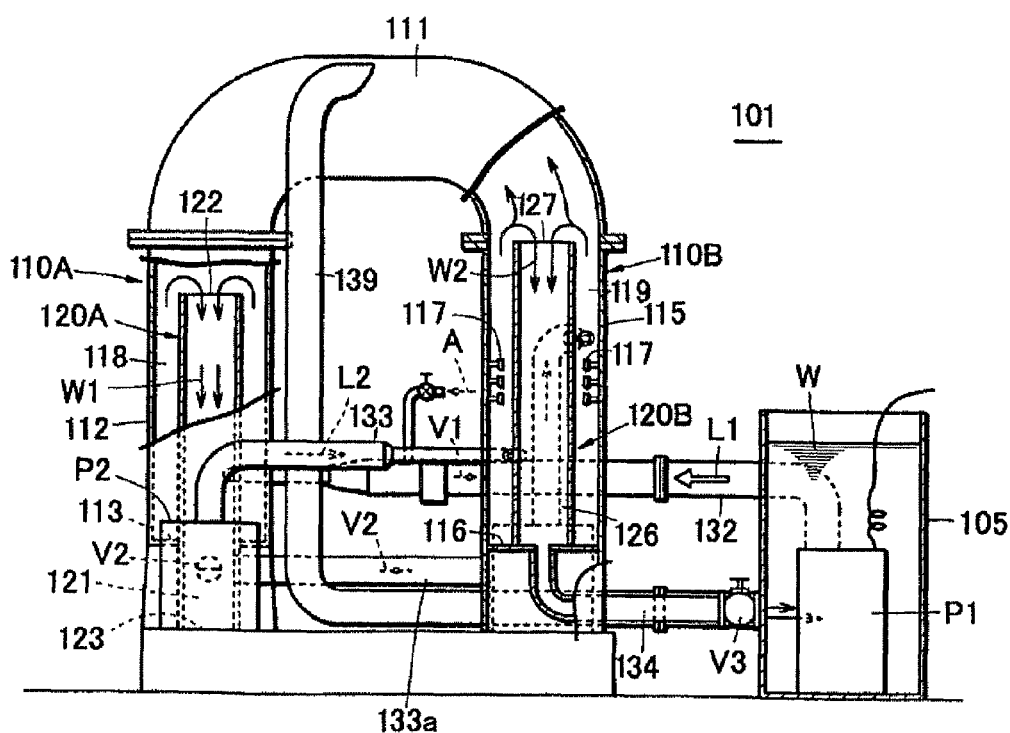
FIG. 7 is a fragmentary vertical sectional view of a double-coupled apparatus for ultrafinely shattering organic granular substances according to a representative embodiment of the present invention.
Figure 8:
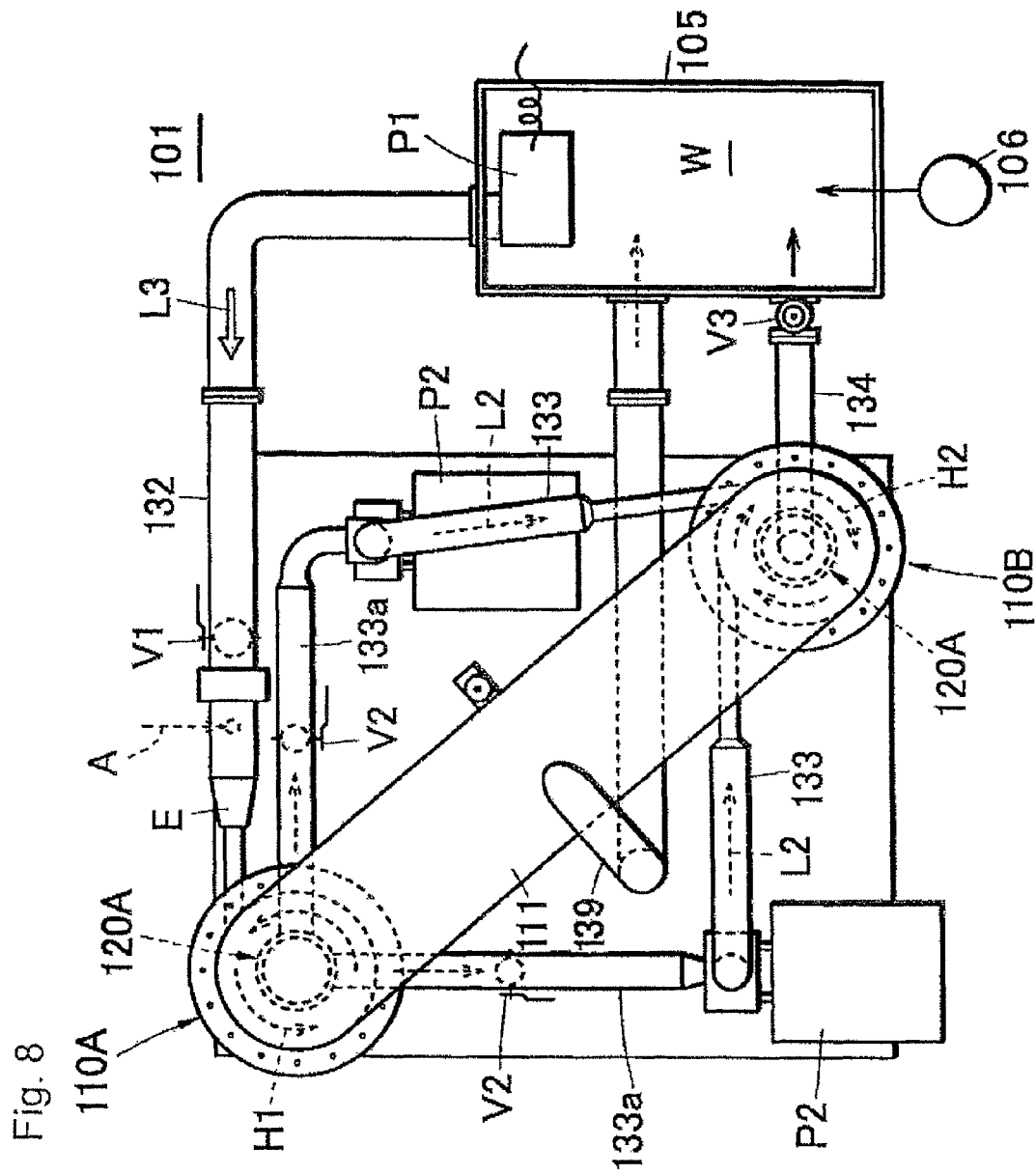
FIG. 8 is a plan view of a double-coupled apparatus for ultrafinely shattering organic granular substances thereof.

A double-coupled apparatus for ultrafinely shattering organic granular substances according to the present invention will be explained with reference to FIG. 7 and FIG. 8. The double-coupled ultrafinely shattering apparatus 101 according to a representative embodiment is supplied with a to-be-treated water W containing organic granular substances from a tank 105 by a high-pressure underwater pump P1 to ultrafinely shatter the clusters of water W and the organic granular substances so as to decompose the ultrafinely shattered organic particulate substances efficiently by fermentation tubes 106 equally distributed between the ultrafine clusters of water, and comprises two sets of reversed J-shaped outside cylindrical walls 110A, 1106 with the same diameters connected at the middle upper position in communication to each other so as to form a reversed U-shaped cylinder in a vertical view having a curved upper portion 111 and vertical lower portions 112, 115 with bottoms 113, 116, vertical inside cylindrical walls 120A, 120B with the same diameters concentrically fixedly secured to the vertical lower portions 112, 115 through bottoms 123, 116 respectively, the first pump P1 comprising the high-pressure underwater pump and a pipe 132 for a first section to supply high-speed water flows containing the organic granular substances tangentially into an annular passage 118 of the outside cylindrical wall 110A on the supply side to generate high-speed circulating water flows H1 of 8 m/second or more, preferably 30 to 50 m/second counterclockwise in a plan view, a second pump P2, P2 and pipes 133, 133 for the second section to suck from a bottom portion 121 of inside cylindrical wall 120A an intermediate water W1 falling to a bottom 123 over an open upper edge 122 of the inside cylindrical wall 120A and to supply high-speed water flows L2 containing the ultrafinely shattered organic particulate substances tangentially into an annular passage 119 of the outside cylindrical wall 110B on the discharge side so as to generate high-speed circulating water flows H2 of 8 m/second or more, preferably 30 to 50 m/second clockwise in a plan view, a pipe 134 for returning the ultrafinely shattered water W2 falling over an open upper edge 127 of the inside cylindrical wall 120E from a bottom portion 126 of the inside cylindrical wall 120B on the discharge side to the tank 105, valves V1, V2, V3 provided in a pipe 132 from the pump P1 to the outside cylindrical wall 110A, a pipe 133*a* from the cylindrical wall 110A to the pump P2 and the discharge pipe 134 respectively, and an overflow water discharge pipe 139 connected to the curved upper portion 111 at its mid position for returning an overflow water in the portion 111 to the tank 105 double-coupled apparatus for ultrafinely shattering organic granular substances thereof.

A height of the inside cylindrical wall 120A on the supply side is made low comparatively in order to enhance the inflow of the water thereinto and the bottom 123 thereof is lowered in order to increase a water falling distance, while the height of the inside cylindrical wall 120A on the discharge side is made high comparatively in order to readily guide the moving up and returning of the high-speed water flows H2 to the annular passage 118 on the supply side when repeating the ultrafinely shattering. Since the intermediate water W1 is sucked by the two second pumps P2, P2 from the bottom portion 121 of the inside cylindrical wall 120A on the supply side, the intermediate water W1 passing over the upper edge 122 falls to collide against the bottom 123 violently to enhance the ultrafinely shattering of the organic granular substances and the clusters of the intermediate water W1. An ejector E for sucking an air A by using the high-speed water flows is provided in the pipe 132 from the first pump P1 to generate air bubbles for cavitation action in the high-speed water flows H1, H2 in the annular passage 118, 119 and to activate aerobic bacteria in the tank 105. Further, a plurality of projecting members 117 are arranged in the inner surface of the outside cylindrical wall 110E on the discharge side so that a projecting distance of each member 117 can be adjusted within the annular passage 119. By making the high-speed water flows H2 generated by the second pumps P2, P2 collide against the projecting members 117, it becomes possible to make actions of the cavitation and the impact force upon the intermediate substances suspended in the intermediate water and to adjust degrees of the actions by changing the numbers of members 117 and the projecting distances thereof. Incidentally, the bottom 116 is used in common for the outside and the inside cylindrical walls 110B, 120B on the discharge side.

The ultrafinely shattering of the intermediate substances within the intermediate water W1 is attained by the shearing action generated between stratified different high-speed water flows H1, H2, especially between a water layer attached to the inner surface of the outside cylindrical wall 110A, 110E and the adjacent high-speed water flow within the annular passage 118, 119, the cavitation action associated with the shearing action, the impact forces generated by the falling of the intermediate water W1, W2 to the bottom 123, 116 of the inside cylindrical wall 120A, 110B, and the corrosion of the high-speed water flows H2 against the projecting members 117. An operating mode of the double-coupled ultrafinely shattering apparatus can be selected depending on a kind of organic granular substance to be treated and a degree of ultrafinely shattering thereof. Namely when it is unnecessary to repeat the ultrafinely shattering because of easily crushable substances to be treated and low degree of the ultrafinely shattering, the operation is carried out under a well-balanced condition between a supply amount of the water to be treated and a discharge amount of the treated water. When it is necessary to repeat the ultrafinely shattering to a desired degree, the operation is carried out by decreasing an opening degree of the valve V3 of the discharge pipe 134 so as to make the discharge amount less than the supply amount, so that the high-speed water flows H2 within the annular passage 119 on the discharge side flow into the annular passage 118 on the supply side with circulating at a high-speed and reversing their circulating directions so as not to interfere with the circulation of the high-speed water flows H1 within the annular passage 118. Thereupon, the supply amount is made balanced with the discharge amount from the discharge amount 134 and a discharge amount of from the overflow discharge pipe 139. The valve V1 of the pipe 132 from the first pump P1 is used for adjusting the supply amount and emergency stop, the valves V2 of the pipes 133*a* to the second pumps P2 are used for adjusting a speed of the high-speed water flows H2, and the valve V3 is used for selecting the operation mode as mentioned above.

Embodiment 8

Figure 9:
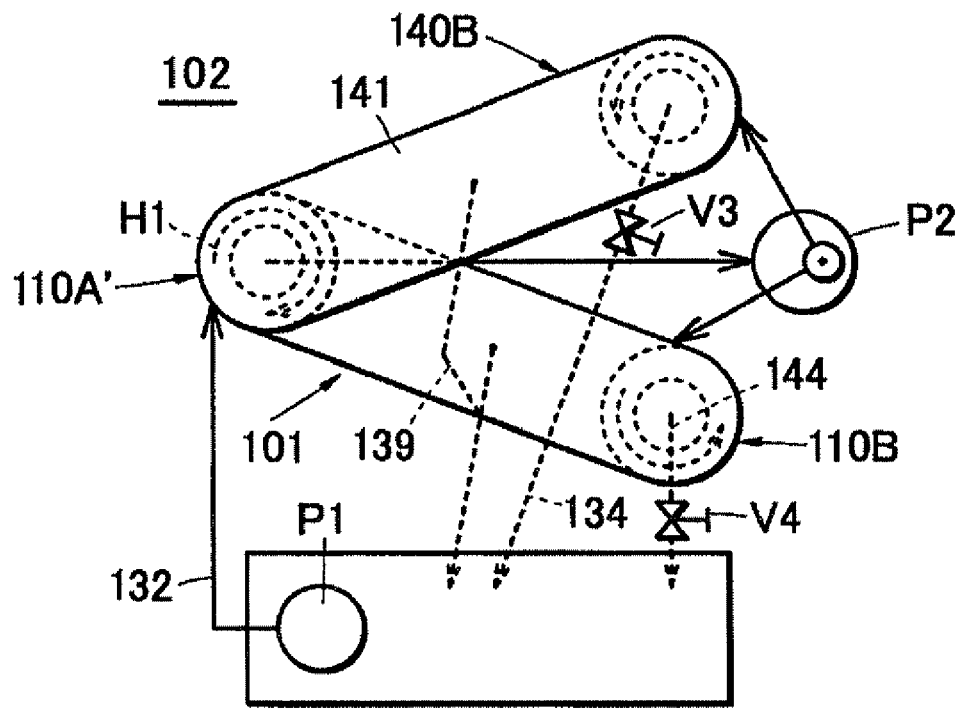
FIG. 9 is a schematic explanatory plan view of a triple-coupled apparatus for ultrafinely shattering organic granular substances thereof.
Figure 10:
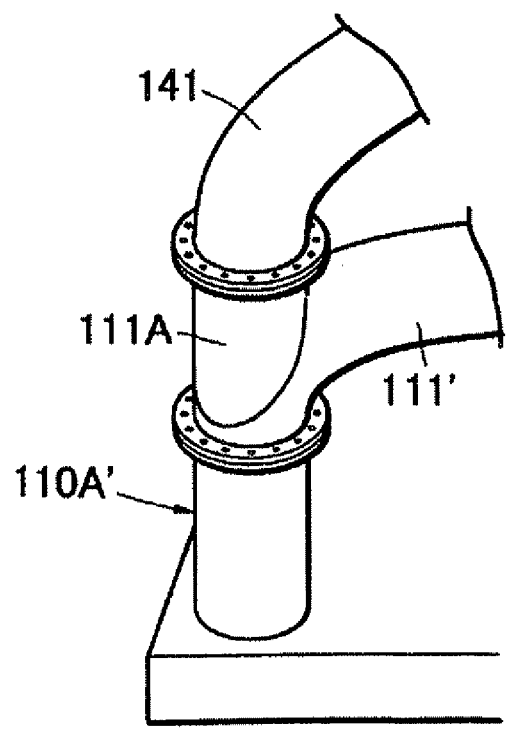
FIG. 10 is an explanatory view of a portion of the triple-coupled apparatus for ultrafinely shattering organic granular substances thereof.

Beside the double-coupled ultrafinely shattering apparatus 101, a triple-coupled apparatus 102 as shown in FIG. 9 and FIG. 10 is proposed, which comprises the double-coupled ultrafinely shattering apparatus 101 to the outside cylindrical wall 110A' of which another outside cylindrical wall 140E is added. The same component members as those of the double-coupled ultrafinely shattering apparatus 101 are designated by the same symbols of those. As shown in FIG. 10, an upper portion 141 of the outside cylindrical wall 140E is connected to a connecting portion 111A of the upper portion 111' above the outside cylindrical wall 110A' so as to be superimposed thereon, where the circulating directions of the high-speed water flows at the time of confluence are made coincident with each other to avoid an interference to the high-speed water flows H1 as great as possible. The repetitive ultrafine shattering is accomplished by decreasing opening degrees of the valve V3 of the discharge pipe 134 and the valve V4 of the discharge pipe 144. A surplus between the supply amount from the pipe 132 and the discharge amount from the discharge pipes 134, 144 is discharged from the overflow discharge pipe 39. Besides, a more-than-triple coupled apparatus may be constructed by connecting a plurality of outside cylindrical walls on the discharge side to the outside cylindrical wall on the discharge side of the double-coupled ultrafinely shattering apparatus in the superimposed condition.

Accordingly, for example when the spherical organic granular substances with a radius of 1 mm having only a specific surface area of 0.00120 $m^2$/g are ultrafinely shattered by the above-mentioned apparatus so as to have a radius of 0.0001 mm, the specific surface area becomes 12.0 m²/g, namely increased 10,000 times, so that the number of fermentation tubes 106 attached to the surface of the ultrafinely shattered organic particulate substances in the tank 105 is increased 10,000 times to enable the effective decomposing of organic granular substances and the effective culturing of large quantities of fermentation tubes. The fermentation tubes such as lactobacillus may be preferably collected at a treating site and at a culturing site so as to be agreeable with a climate and vigorous at the site. Also phototropic bacteria able to live in a symbiotic relation with the fermentation tubes may be added to the tank 105 or elsewhere to enhance the culturing by exchanging nourishments between the bacteria and the tubes. When the fermented organic particulate substances mixed with phototropic bacteria are used as a liquid fertilizer, the phototropic bacteria serve many useful actions such as suppression of saprogen proliferation, ingestion of bad smell organic substances as nourishment, preparation of nourishment for fermentation tubes and so on. Preferably the fermentation tubes are mixed with phototropic bacteria able to live in a symbiotic relation with the fermentation tubes such as lactobacillus and to enhance activities of the fermentation tubes so as to promote their proliferations. The phototropic bacteria are rich in nourishment such as amino acid, mineral, vitamin and so on and themselves can be usefully used as an organic fertilizer, as well as not only positively ingest hydrogen sulfide produced by sulfate reducers at the time of decomposition as a nourishment but also decompose and remove putrescine and cataverine which are poisonous amines and dimethylnitrosamine which is cancer-causing and teratogenic by ingesting them as culture substrates. Further, the phototropic bacteria not only serve to protect the respiration and the nourishment metabolism in roots of crops and to increase the yield of crops due to nitrogen fixation by removing harmful substances when being supplied to a field but also promote the proliferation of an actinomycete in a soil which willingly ingests them as a nourishment. The proliferated actinomycete ingest many pathogenic filamentous fungi for proliferation so as to mitigate consecutive planting disorders caused by the plant-pathogenic filamentous fungi.

The ultrafinely shattering apparatus according to the present invention is applicable to a toilet provided in a mountain or a remote place without a sewer system. The toilet utilizes wood-chips mixed with large quantities of fermentation tubes and phototropic bacteria.

Embodiment 9

Figure 11:
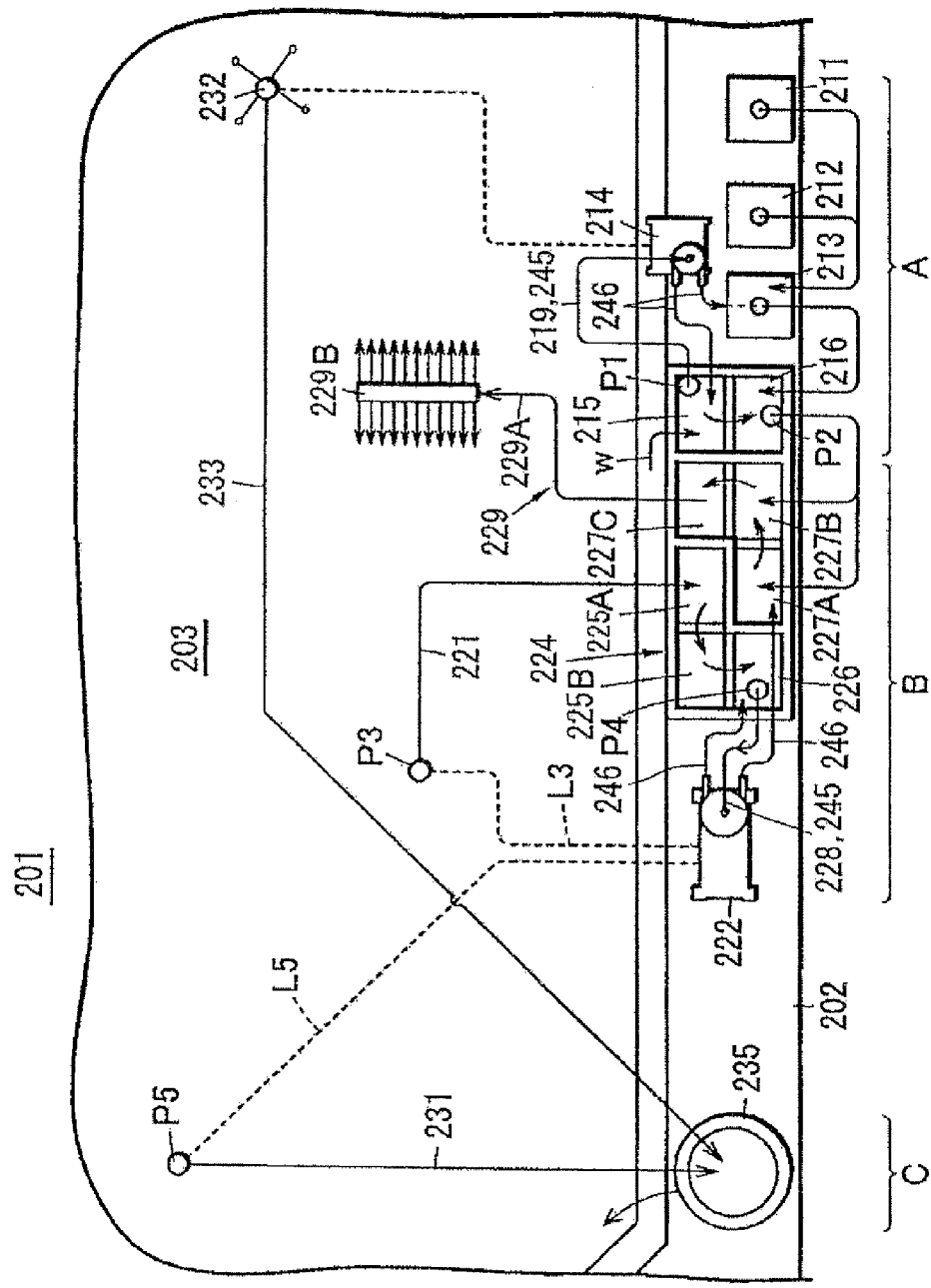
FIG. 11 is a plan view of an installation for decomposing colloidal sediment at the bottom of water according to one application embodiment of the present invention.
Figure 13:
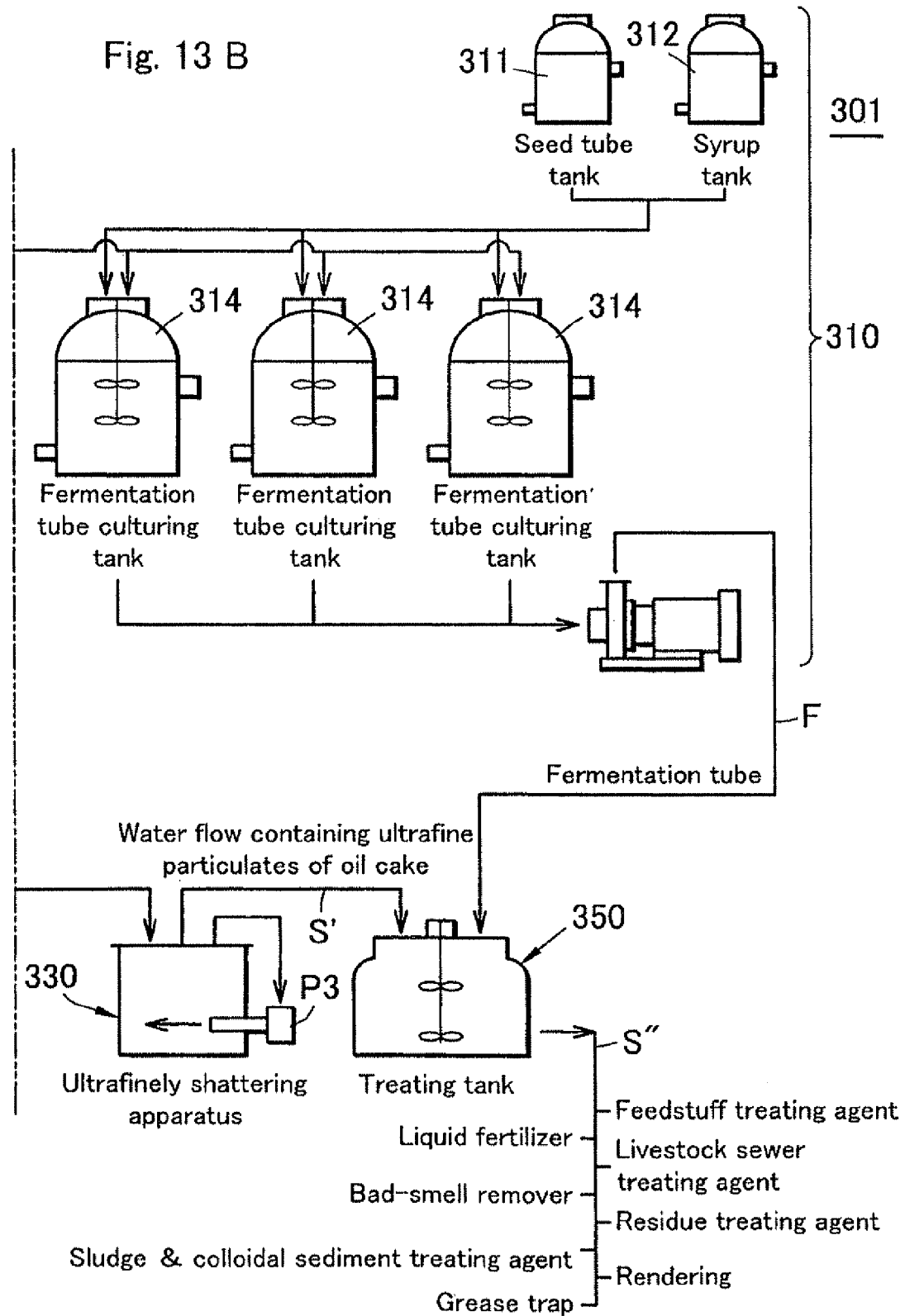
FIG. 13 is an explanatory view of an installation for decomposing oil cake according to another application embodiment of the present invention.

An installation for decomposing colloidal sediment at the bottom of water according to one application embodiment of the present invention will be explained with reference to FIG. 11 to FIG. 13. An installation 201 for decomposing colloidal sediment at the bottom of water in a lakeside is installed in a stable place of a river-protecting embankment 202, developed over the colloidal sediment area 203 and comprises an fermentation tube culturing section A, a colloidal sediment decomposing section B and a postprocessing section C.

The fermentation tube culturing section A serves as a fermentation tube supply device and comprises a seed tube tank 211 containing fermentation tubes such as lactobacillus, yeast fungus, butyric-acid bacteria, or the like, a syrup tank 212 containing nourishments including syrup or the like, a water tank 215 to which a clean water w is supplied, from which the high-pressure pump P1 sucks a water to supply it to a water shattering apparatus 214 and to which the treated water having clusters ultrafinely shattered by the apparatus 214 is returned, a culturing tank 213 to which the treated water is supplied from the apparatus 214, the seed fermentation tubes are supplied from the seed tube tank 211 and the syrup nourishments are supplied from the syrup tank 212 respectively, and a fermentation tube supply tank 216 disposed adjacent to the water tank 215 so as to be supplied with the treated water as well as supplied with cultured fermentation tubes from the culturing tank 213 and adapted to store the watered-down fermentation tubes temporarily and to supply them to a colloidal sediment treating area by a underwater pump P2. The water shattering apparatus 214 has an arrangement substantially similar to those described above so as to ultrafinely shatter clusters of water supplied by a supply pipe 245 and to supply the ultrafinely shattered water to the water tank 215 and the culturing tank 213 through two discharge pipes 246. The water is partially circulated between the ultrafinely shattering apparatus 214 and the tank 215 to enhance the shattering. The water tank 215 and the fermentation tube supply tank 216 are assembled in an intermediate tank 224.

As the fermentation tubes are generally known lactobacillus, yeast fungus, butyric acid bacteria and *Bacillus Natto Sawamura*. It is necessary to confirm that such fungi are not against regulations of a harbors in a country. Phototropic bacteria able to live in a symbiotic relation with the fermentation tubes may be added to a culture tank to enhance the culturing by exchanging nourishments between the bacteria and the tubes. When the fermented organic particulate substances mixed with phototropic bacteria are used as a liquid fertilizer, the phototropic bacteria serve many useful actions such as suppression of saprogen proliferation, ingestion of bad smell organic substances as nourishment, preparation of nourishment for fermentation tubes and enhancement of activities of the fermentation tubes to promote their proliferations. The phototropic bacteria are rich in nourishment such as amino acid, mineral, vitamin and so on and themselves can be usefully used as an organic fertilizer, and not only positively ingest hydrogen sulfide produced by sulfate reducers at the time of decomposition as a nourishment but also decompose and remove putrescine and cataverine being poisonous amines and dimethylnitrosamine being cancer-causing and teratogenic by ingesting them as culture substrates.

The colloidal sediment decomposing section 8 comprises a sediment ultrafinely shattering apparatus 222 for ultrafinely shattering colloidal sediment supplied from the bottom of water thereinto by a underwater pump P3 through a hose 221 via the intermediate tank 224 into particulates of several micronmeters order and discharging the ultrafinely shattered sediment to the intermediate tank 224, the intermediate tank 224 for fermenting the ultrafinely shattered sediment by the fermentation tubes supplied from the culturing section A, and a returning arrangement 229 for returning the fermented ultrafinely shattered sediment still containing large quantities of fermentation tubes from the intermediate tank 224 to the bottom of water. Electricity is supplied to the underwater pump P3 by a cord L3. The sediment ultrafinely shattering apparatus 222 operates by the same principle as the water shattering apparatus 214. The intermediate tank 224 comprises double-coupled sand-settling portions 225A, 225B (partitioned by a low wall allowing the flowing over) for settling and separating sands mixed with the colloidal sediment supplied by the hose 221, a suction and discharge portion 226 connected to the back sand-settling portion 225B, and triple-coupled fermentation portions 227A, 227B, 227C (partitioned by the low walls respectively), which are isolated from the sand settling portion 225 and the suction and discharge portion 226. The sediment ultrafinely shattering apparatus 222 is supplied with colloidal slurry from the suction and discharge portion 226 through pipes 228, 245 and discharges the shattered ultrafine sediment to the portion 226 through one discharge pipe 246 for partial circulation as well as also to a fermentation portion 227 through the other pipe 246. Large quantities of fermentation tubes are supplied from the fermentation tube supply tank 216 to the fermentation portions 227A, 227B so as to decompose the slurry being cultured during the moving through the portions 227A, 227B, 227C with the slurry, and finally the residue of slurry containing large quantities of fermentation tubes is calmly returned from the fermentation portion 227C to the bottom of water through a hose 229A and a perforated pipe 229B of the returning arrangement 229.

The postprocessing section C for settling a muddy water has a postprocessing tower (Z-Lant tower available from Higashinihon Z-Lant Co. Ltd.) 235 which is supplied with the muddy water on the downstream side with respect to the pump P3 and the returning arrangement 229 by a underwater pump P5 (supplied with an electricity by a cord L5) through a hose 231 as well as supplied with scum including refuse raised to a water surface by an aeration and sucked by a pump, through a scum skimmer 232 and a hose 233 together with a water, and filters the water by wood-chip layers containing large quantities of fermentation tubes therein for returning the filtered water to the river.

Embodiment 10

Next, an installation for decomposing oil cake according to another application embodiment of the present invention will be explained with reference to FIG. 13. The installation for decomposing oil cake 301 comprises a fermentation tube supply device 310, a slurry producing device 320 for preparing slurry S of oil cake A discharged from an oil press 305, a ultrafinely shattering apparatus 330 for ultrafinely shattering oil cake granule suspended in the slurry S from the slurry producing device 320, and a treating device 350 supplied with a water flow S' containing ultrafine particulates of oil cake from the ultrafinely shattering apparatus 330 as well as supplied with large quantities of fermentation tubes F from the supply device 310 for decomposing the ultrafine particulates of oil cake by the fermentation. The water flow S' containing ultrafine particulates of oil cake from the ultrafinely shattering apparatus 330 can be put on the market as a culture medium. A treated liquid S" containing large quantities of cultured fermentation tubes may be discharged from the treating device 350 for use as a liquid fertilizer for avoiding consecutive planting disorders, a bad-smell remover for a kitchen garbage storage or treating place, a treating liquid for sludge, colloidal sediment, livestock feedstuff, livestock sewer, residues in fishes and shellfish processing, grease trap, rendering and so on.

The fermentation tube supply device 310 comprises a seed tube tank 311 containing fermentation tubes such as lactobacillus, a syrup tank 312 containing nourishments including syrup or the like, a water shattering apparatus 313 to which a clean water w is supplied, from which the high-pressure pump P0 sucks a water to supply it at a high-speed such as 8 m/second or more, preferably 20 to 30 m/second to a water shattering portion operating by the same principle as the above-described ultrafinely shattering apparatus and to which the treated water having clusters ultrafinely shattered is returned, and a culturing tank 314 to which the treated water is supplied from the apparatus 313, the seed fermentation tubes are supplied from the seed tube tank 311 and the syrup nourishments are supplied from the syrup tank 312 respectively. In the culturing tank 314, the treated water having clusters ultrafinely shattered to the size of a few micrometers is useful for enhancing the culturing of large quantities of vigorous fermentation tubes because the fermentation tubes and the nourishments are evenly spread between the ultrafine clusters of water.

As the fermentation tubes F are generally known lactobacillus, yeast fungus, butyric acid bacteria and *Bacillus Natto* Sawamura. It is necessary to confirm that such fungi are not against regulations at a harbors in a country. Phototropic bacteria able to live in a symbiotic relation with the fermentation tubes may be added to a culture tank to enhance the culturing by exchanging nourishments between the bacteria and the tubes. When the fermented organic particulate substances mixed with phototropic bacteria are used as a liquid fertilizer, the phototropic bacteria serve many useful actions such as suppression of saprogen proliferation, ingestion of bad smell organic substances as nourishment, preparation of nourishment for fermentation tubes and enhancement of activities of the fermentation tubes to promote their proliferations. The phototropic bacteria are rich in nourishment such as amino acid, mineral, vitamin and so on and themselves can be usefully used as an organic fertilizer, and not only positively ingest hydrogen sulfide produced by sulfate reducers at the time of decomposition as a nourishment but also decompose and remove putrescine and cataverine being poisonous amines and dimethylnitrosamine being cancer-causing and teratogenic by ingesting them as culture substrates.

The slurry producing device 320 is supplied with oil cake from the oil press 305. For example, soybean oil cake A having pH of 10 around is strong alkaline and mixed with a water W with a weight ratio of about 1:9 under the hydrolyzed condition. In the case of the oil cake having a low pH, a pH regulating material B such as bicarbonate of soda, sodium hydrogen carbonate, caustic soda or the like is supplied to the slurry producing device 320 form a pH regulating device 306 to be stirred so that even the oil cake containing a paste-like oil can be suspended in an about 9 times amount of water W with respect to the amount of oil cake, resulting in the producing of fluidal weak alkaline slurry S. The slurry S is supplied to the ultrafinely shattering apparatus 330 by the pump P1 so that the oil cake granular substances suspended therein can be ultrafinely shattered to the size of a few micrometers.

Figure 14:
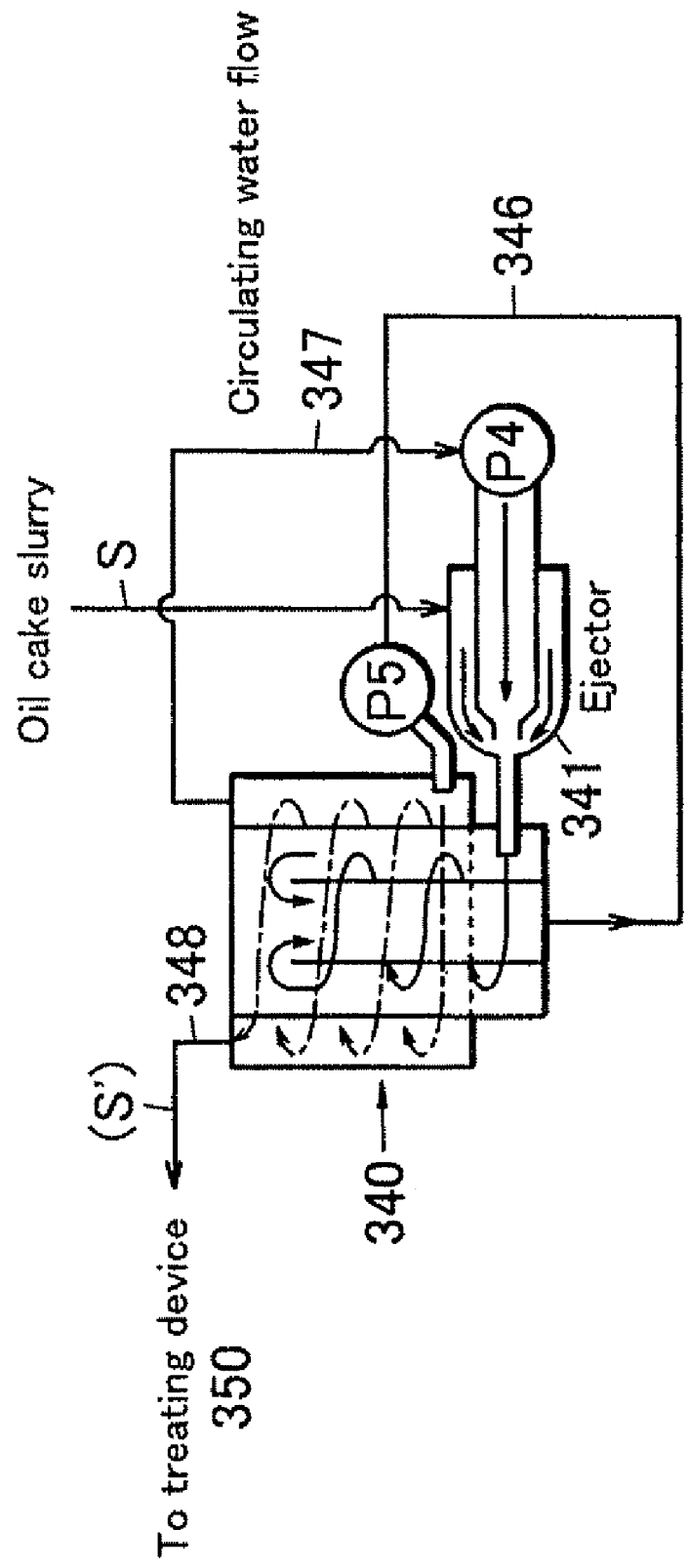
FIG. 14 is a schematic explanatory view of an apparatus for ultrafinely shattering organic granular substances according to a first embodiment for use in the installation.
Figure 15:
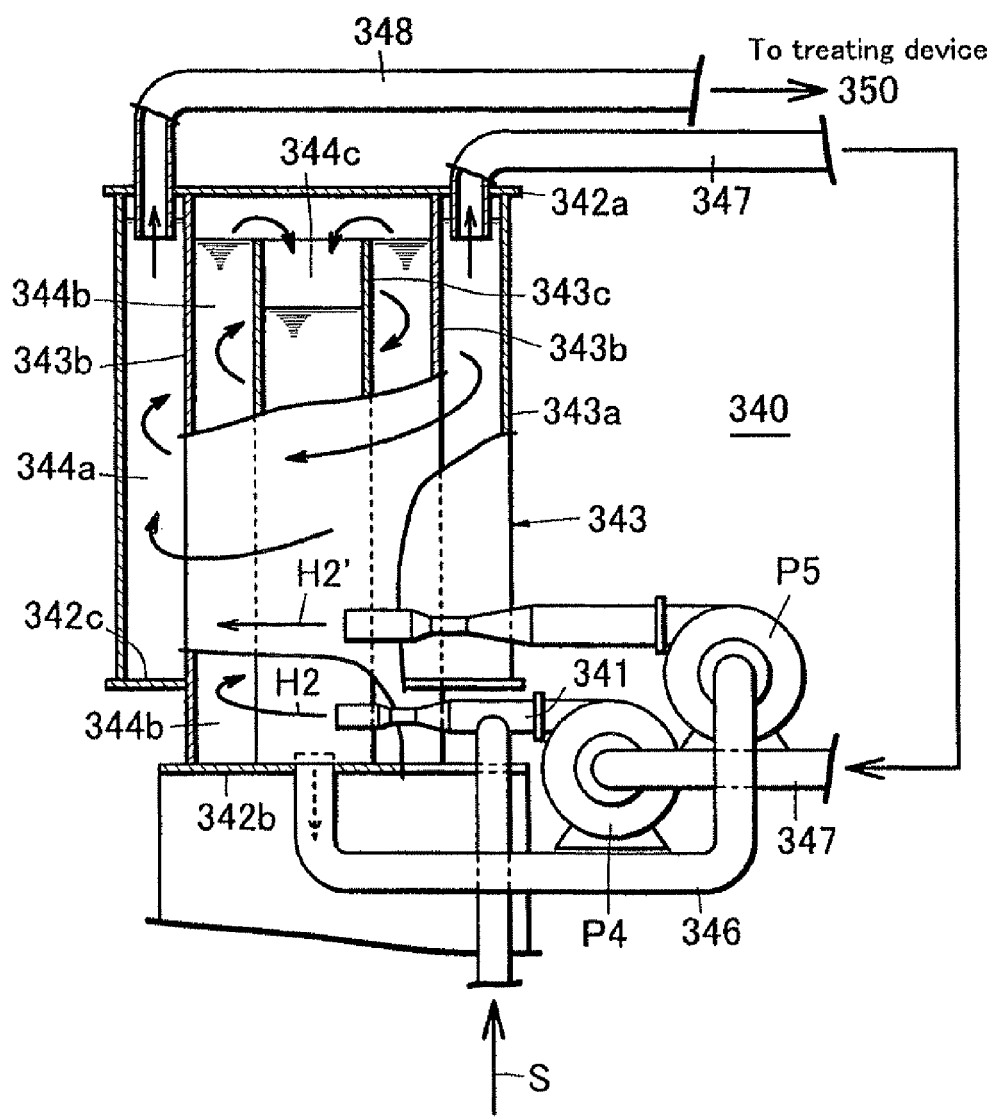
FIG. 15 is a fragmentary vertical sectional view of an apparatus for ultrafinely shattering organic granular substances according to a second embodiment for use in the installation.

In FIG. 14 and FIG. 15, the ultrafinely shattering apparatus 340 (designated by 330 in FIG. 13) functions similarly to the above-mentioned apparatus and comprises a casing 343 having a surrounding wall 343a closed by a top plate 342a and a bottom plate 342b, an outside cylindrical wall 343b closed by the top plate 342a and the bottom plate 342c, an inside cylindrical wall 343c closed by the bottom plate 342c (a gap is provided relative to the top plate 342a) so that three partitioned annular passages 344a, 344b, 344c are arranged therebetween respectively. The oil cake slurry S is supplied by a pump P4 together with a water at a high-speed into the intermediate second annular passage 344b so as to generate high-speed water flows of 20 to 30 m/second therein. And then the water flows enter the third annular passage 344c over an upper edge of the third cylindrical wall 343c to violently falls onto the bottom plate 342b (generating an effect of the basin of a waterfall) because the intermediate treated water within the third annular passage 344c is pushed by the pump P4 as well as sucked by another pump P5 from the bottom through a pipe 346 to provide a synergy effect, which pump P5 then supplies the water flows into the first annular passage 344a to generate high-speed water flows H2' of 20 to 30 m/second therein so as to apply impact forces and shearing forces to the oil cake granular substances suspended in the water flows repetitively.

Slots or slits may be formed in the second the third cylindrical walls 343b, 343c similarly in Embodiment 1. The taking of the slurry S into the high-speed water flows H2 is attained by an ejector 341 which uses high-speed water flows delivered by the pump P4 which sucks the water from the first annular passage 344a through the pipe 347. The treated water flows containing ultrafinely shattered oil cake particulates flow out as the intermediate treated water S' in FIG. 13 from the first annular passage 344a through a pipe 348 to the treating device 350, from which the fermented treated water S" in FIG. 13 flows out with oil cake particulates decomposed in a short time so as to be utilized in many applications.

The cylindrical walls 332c, 333c, 343a, 343b, 343c may have cross-sections such as ellipse, circle with flat portions to increase the impact forces and the shearing forces generated by the high-speed water flows by the high pressure pump.

The treating device 350 is supplied with the water flows (treatment liquid S") containing the ultrafine oil cake particulates and the large quantities of fermentation tubes from the device 310, so that the ultrafine oil cake particulates can be ingested as a feed of the fermentation tubes F to transform them into heat and carbonic acid gas. The treatment liquid S" is useful as a liquid fertilizer, an offensive smell preventing liquid, a feedstuff, a treating liquid for sludge, colloidal sediment, sewer, residues of fish and shell, grease trap, rendering or the like.

Embodiment 11

Figure 16:
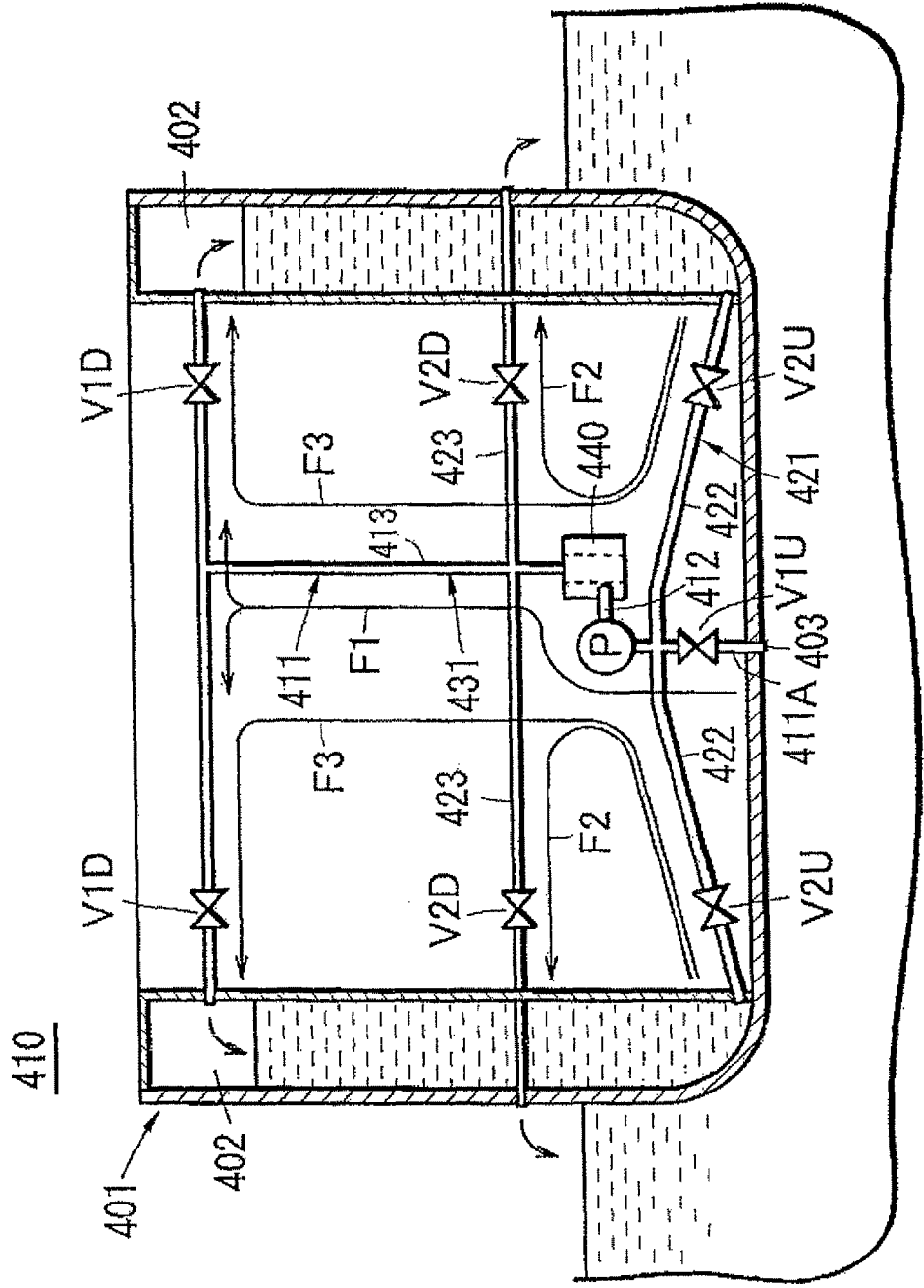
FIG. 16 is an explanatory view of an installation for treating a ballast water of a ship according to still another application embodiment of the present invention.

Next, an installation for treating a ballast water in a ship according to another application embodiment of the present invention will be explained with reference to FIG. 16. The a ballast water treating installation 410 comprises a oil cake 301 comprises a ballast tanks 402 arranged in surrounding portions of a hull 401 for use in the lowering of a stern so as to lower a screw into the underwater in a no-load condition, a pump P for supplying a ballast water from an opening 403 to the suitable tank 402 during a unloading at an anchorage harbor, supply pipes 411 provided with supply valves V1U, V1D on the upstream side and the downstream side of the pump P respectively (the supply flows are indicated by the arrows F1), discharge pipes 421 provided with discharge valves V2U, V2D on the upstream side and the downstream side of the pump P respectively so as to discharge the ballast water by the pump P from the ballast tank 402 to the sea for loading at another remote anchorage harbor (the discharge flows are indicated by the arrows F2), a circulation passage 431 provided with the valve V2U and the valve V2D on the upstream side and the downstream side of the pump P respectively so as to return the ballast water from the ballast tank 402 to that tank 402 by the pump P (the circulation flows are indicated by the arrows F3), and a ballast water treating section 440 disposed in an intermediate pipe 412 on the downstream side of the pump P adjacent thereto. Since the ballast water treating section 440 operates on the same principle as those of the above-described ultrafinely shattering apparatuses, it can ultrafinely shatter microbes and bacteria contained in the ballast water so as to become extinct.

Figure 19:
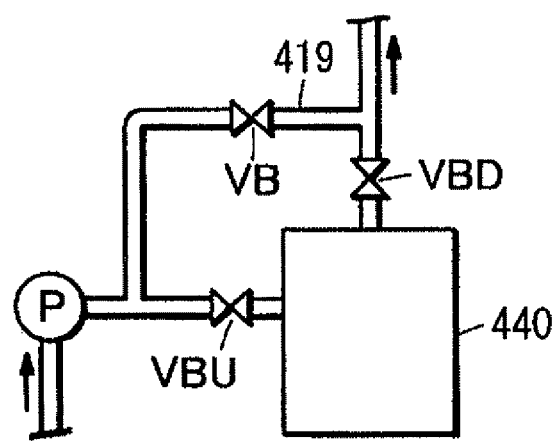
FIG. 19 is a partial explanatory view showing a bypass arrangement of the ballast water treating section in the installation.

The pump P serves to supply, discharge and circulate the ballast water and can be driven at a high-speed by an inverter electric motor so as to supply high-speed water flows to the ballast water treating section 440. A filter may be disposed in a pipe 411A between the suction opening 403 and the supply valve V1U for removing sands from a suction water. For checking and repairing the ballast water treating section 440, as shown in FIG. 19, there are provided a bypass pipe 419 for the treating section 440, a valve VB in the bypass pipe 419, and valves VBU, VBD before and after the treating section 440.

Treating Operation During Ballast Water Supply Process:

During the ballast water supply process by the supply pipe 411 comprising the suction pipe 411A running from the suction opening 403 to the pump P and provided with the supply valve V1U, the intermediate pipe 412 running from the pump P to the treating section 440 and having them at its opposed ends, and a delivery pipe 413 running from the treating section 440 to the ballast tanks 402, the pump P is operated for supplying the ballast water to the ballast tanks 402 with the supply valves V1U, V1D opened and the discharge valves V2U, V2D closed so that the ballast water can be ultrafinely shattered in the treating section 440. This operation is preferable for a comparatively short voyage, but may be omitted in the case of a long voyage.

Treating Operation During Ballast Water Discharge Process:

During the ballast water supply process by the discharge pipe 421 comprising the discharge pipes 422 running from the ballast tanks 402 to the connection points of the suction pipe 411A between the supply valve V1U and the pump P and provided with the discharge valves V2U, the common intermediate pipe 412 having the pump P and the treating section 440 at its opposed ends, and the discharge pipes 423 branched out of the delivery pipe 413, the pump P is operated for discharging the ballast water from the ballast tanks 402 outside the hull 401 with the supply valves V1U, V1D closed and the discharge valves V2U, V2D opened so that the ballast water can be ultrafinely shattered in the treating section 440. This operation is preferable for a comparatively short voyage and at an anchorage harbor having a strict regulation for the ballast water.

Treating Operation During Voyage By Circulating Ballast Water:

During the circulation performed by sucking the ballast water by the pump P from bottom portions of the ballast tanks 402 and returning to upper portions thereof through a circulation passage 431 comprising the discharge pipes 422, the intermediate pipe 412 and the delivery pipe 413 with the discharge valves V2U and the supply valves V1D opened and the discharge valves V2D and the supply valves V1U closed. This operation is preferable for a comparatively long voyage allowing the checking of inhabitant state of microbes and bacteria in the ballast water by a microscope.

Figure 17:
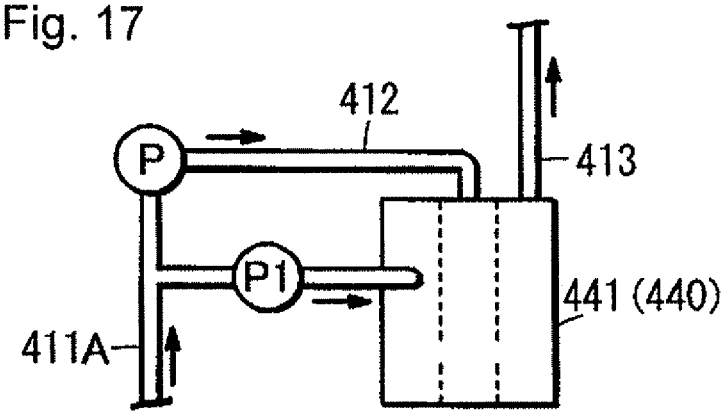
FIG. 17 is a partial explanatory view showing another arrangement of a pump and a ballast water treating section in the installation.

As schematically shown in FIG. 17, a first arrangement 441 of the ballast water treating section 440 has a high-pressure pump P1 for generating the high-speed water flows and the supply pump P arranged in parallel so that the ballast water supplied by the supply pump P can be ultrafinely shattered by the high-speed water flows as mentioned above and discharged to the pipe 413.

Figure 18:
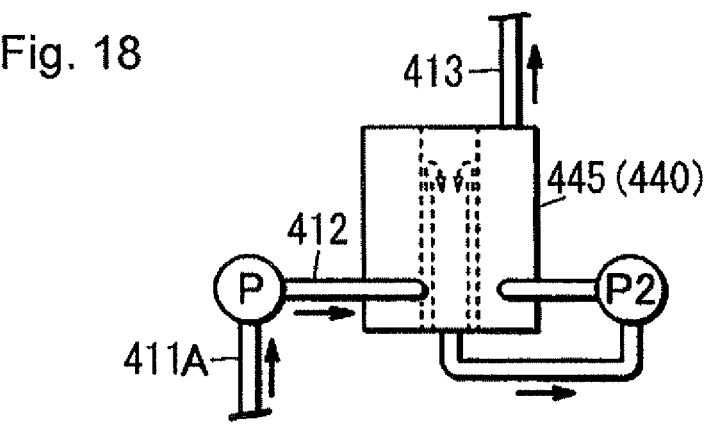
FIG. 18 is a partial explanatory view showing still another arrangement of a pump and a ballast water treating section in the installation.
Figure 20:
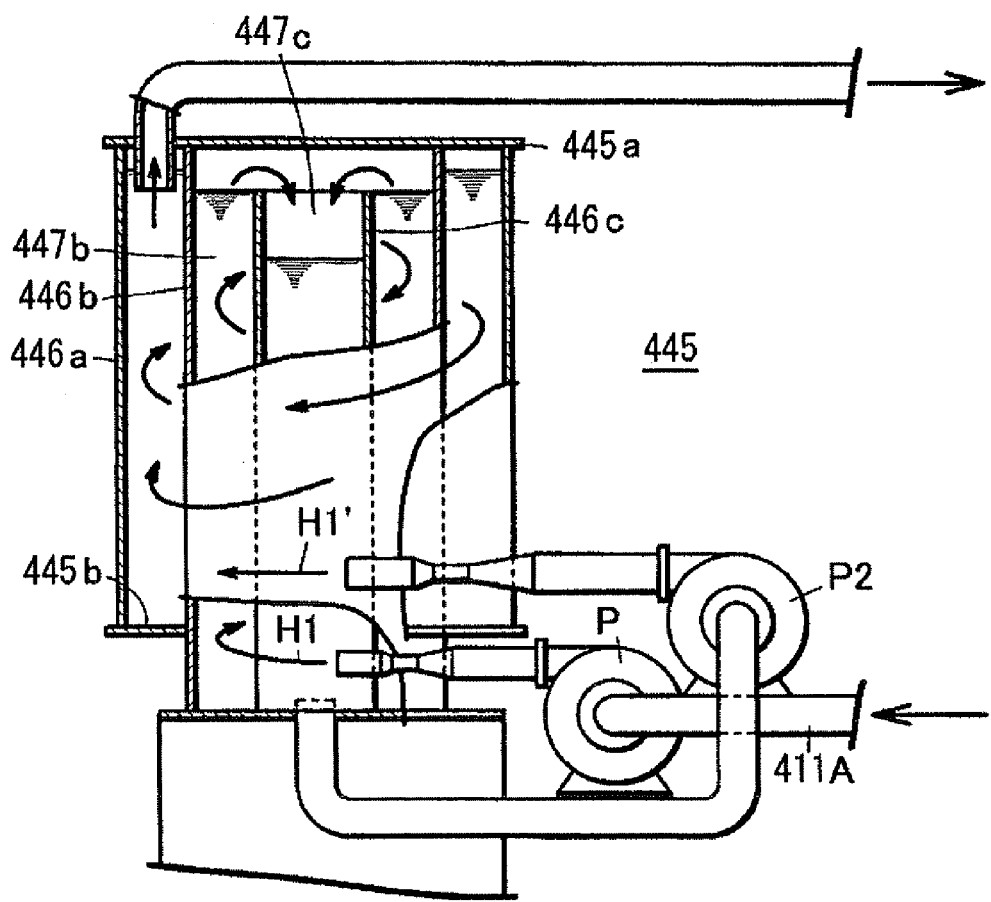
FIG. 20 is a fragmentary vertical sectional view showing an arrangement of the ballast water treating section in the installation.

As schematically shown in FIG. 18 and FIG. 20, a second arrangement 445 of the ballast water treating section 440 comprises a casing 446a closed by a top plate 445a and a bottom plate 445b, an outside cylindrical wall 446b closed by the top plate 445a and the bottom plate, an inside cylindrical wall 446c closed by the bottom plate (a gap is provided relative to the top plate 445a) so that three partitioned annular passages are arranged therebetween respectively. The ballast water is supplied by the pump P to the intermediate second annular passage 447b so as to generate the high-speed water flows H1 therein. And then the water flows enter the third annular passage 447c over an upper edge of the third cylindrical wall 446c to violently falls onto the bottom plate (generating an effect of the basin of a waterfall) because the intermediate treated water within the third annular passage 447c is pushed by the pump P as well as sucked by another pump P2 from the bottom through a pipe to provide a synergy effect, which pump P2 then supplies the water flows into the first annular passage 447a to generate high-speed water flows H1' of 20 to 30 m/second therein so as to apply impact forces and shearing forces to the microbes and bacteria in the ballast water.

The ballast tank 402 may be provided with a device for adding fermentation tubes to the ballast water treated by the treating section 440, which device comprises a seed tube tank, a nourishment tank, a culture tank supplied with a water, seed tubes and nourishments for culturing the large quantities of fermentation tubes and a fermentation tube supply tank. The water supplied to the culture tank may be such a treated water whose clusters are ultrafinely shattered by the same principle as that of the treating section 440.

As the fermentation tubes are generally known lactobacillus, yeast fungus, butyric acid bacteria and *Bacillus Natto* Sawamura. It is necessary to confirm that such fungi are not against regulations of a harbors in a country. Phototropic bacteria able to live in a symbiotic relation with the fermentation tubes may be added to a culture tank to enhance the culturing by exchanging nourishments between the bacteria and the tubes. When the fermented organic particulate substances mixed with phototropic bacteria are used as a liquid fertilizer, the phototropic bacteria serve many useful actions such as suppression of saprogen proliferation, ingestion of bad smell organic substances as nourishment, preparation of nourishment for fermentation tubes and enhancement of activities of the fermentation tubes to promote their proliferations. The phototropic bacteria are rich in nourishment such as amino acid, mineral, vitamin and so on and themselves can be usefully used as an organic fertilizer, and not only positively ingest hydrogen sulfide produced by sulfate reducers at the time of decomposition as a nourishment but also decompose and remove putrescine and cataverine being poisonous amines and dimethylnitrosamine being cancer-causing and teratogenic by ingesting them as culture substrates. For example when the spherical organic granular substances with a radius of 1 mm having only a specific surface area of 0.00120 $m^2/g$ are ultrafinely shattered by the above-mentioned apparatus so as to have a radius of 0.0001 mm, the specific surface area becomes 12.0 $m^2/g$, namely increased 10,000 times, so that the number of fermentation tubes 106 attached to the surface of the ultrafinely shattered organic particulate substances in the tank 105 is increased 10,000 times to enable the effective decomposing of organic granular substances and the effective culturing of large quantities of fermentation tubes.

Test Analogous to the Ballast Water Treatment:

Effects of the ballast water treating apparatus (the ultrafinely shattering apparatus) and the fermentation tubes to protozoans such as the microbes and bacteria in a specimen liquid were observes and confirmed.

Instead of the ballast water, the specimen liquid which microbes and bacteria inhabit was taken out from a sludge tank in the Toyama Meat Processing Center (Feb. 9, 2004). The specimen liquid prepared by mixing 1 $m^3$ of the sludge with a water was ultrafinely shattered by the treating section for 7 hours and then added with 20 vol % of fermentation tube liquid at a temperature of 15° C. for fermentation.

| | | Lapse | | | |
|---|---|---|---|---|---|
| Items | Before ultra. shattering | After that | Lapse of one day aft. AD | Lapse of two days | Lapse of three days |
| Appearance | clear spernatant & brown sludge | clear spernatant & brown sludge | bubbly spernatant | bubbly spernatant | bubbly spernatant |
| Smell | Blood smell | a little less | mellow ferment. smell | mellow ferment. smell | mellow ferment. smell |
| pH | 6.8 | 6.3 | 5.2 | 5.4 | 5.7 |
| Air/liquid temp. ° C. | 2/15 | 2/15 | 4/16 | −4/13 | 5/16 |
| Microsco. View | *Vorticella, Corurella, Litonotus, Arcella*: alive | *Corurella* weakened, others extinct | Ferment. Tube active, others extinct | Ferment. Tube active, others extinct | Ferment. Tube active, others extinct |
| Flock | Good | Broken 1/5 | dispersed | further | further |
| Sludge decrease rate | S S = 0.95% | — | 17.8 | 18.9 | 23.4 | aft. AD: after addition of fermentation tubes

Test Result: It was confirmed that the ballast water treating apparatus and the fermentation tubes are effective for making protozoa in the specimen liquid extinct.

Embodiment 12

Figure 21:
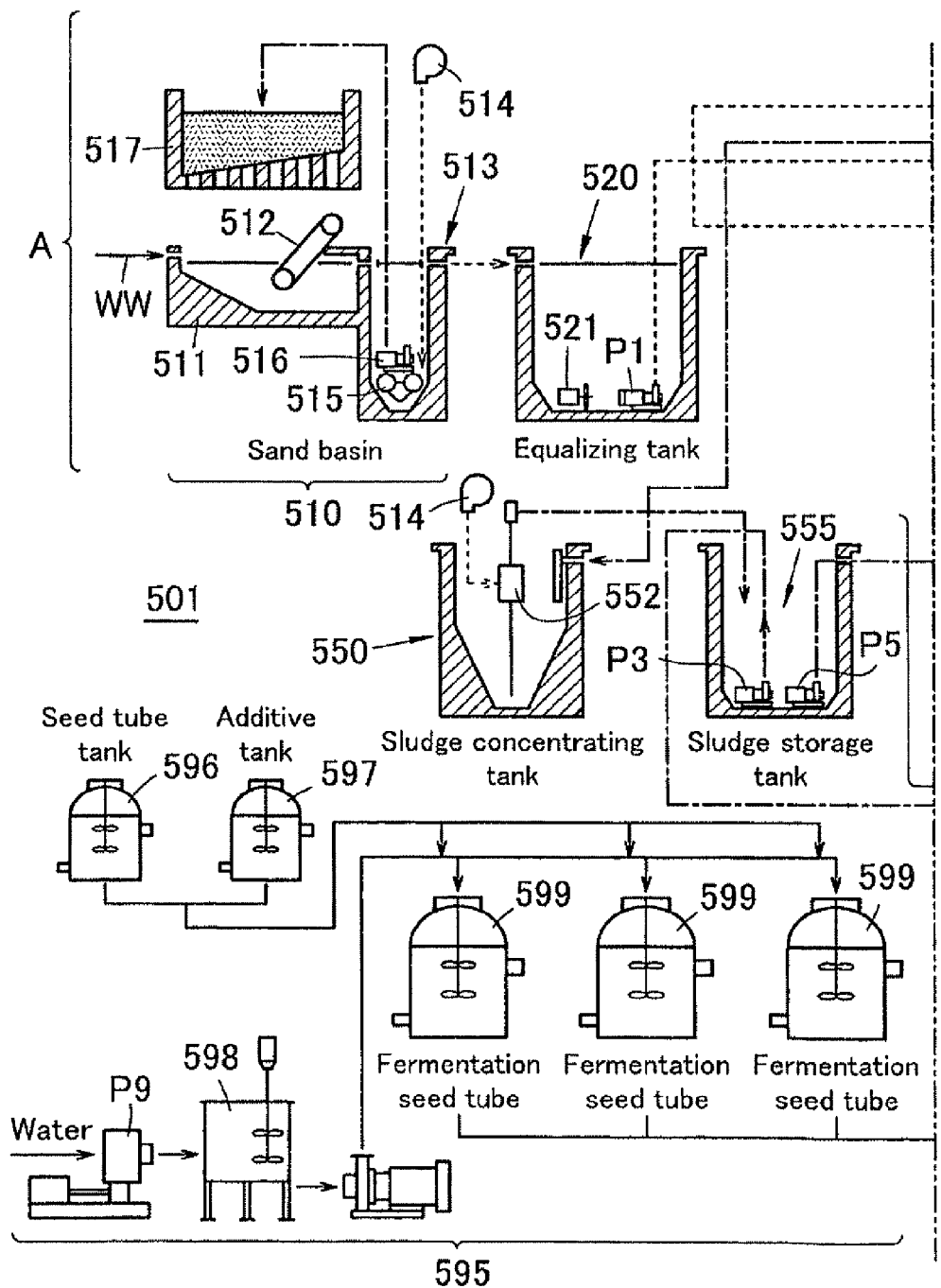
FIG. 21 is a schematic explanatory view of an installation for treating a waste liquid containing organic substances according to further application embodiment of the present invention.
Figure 21:
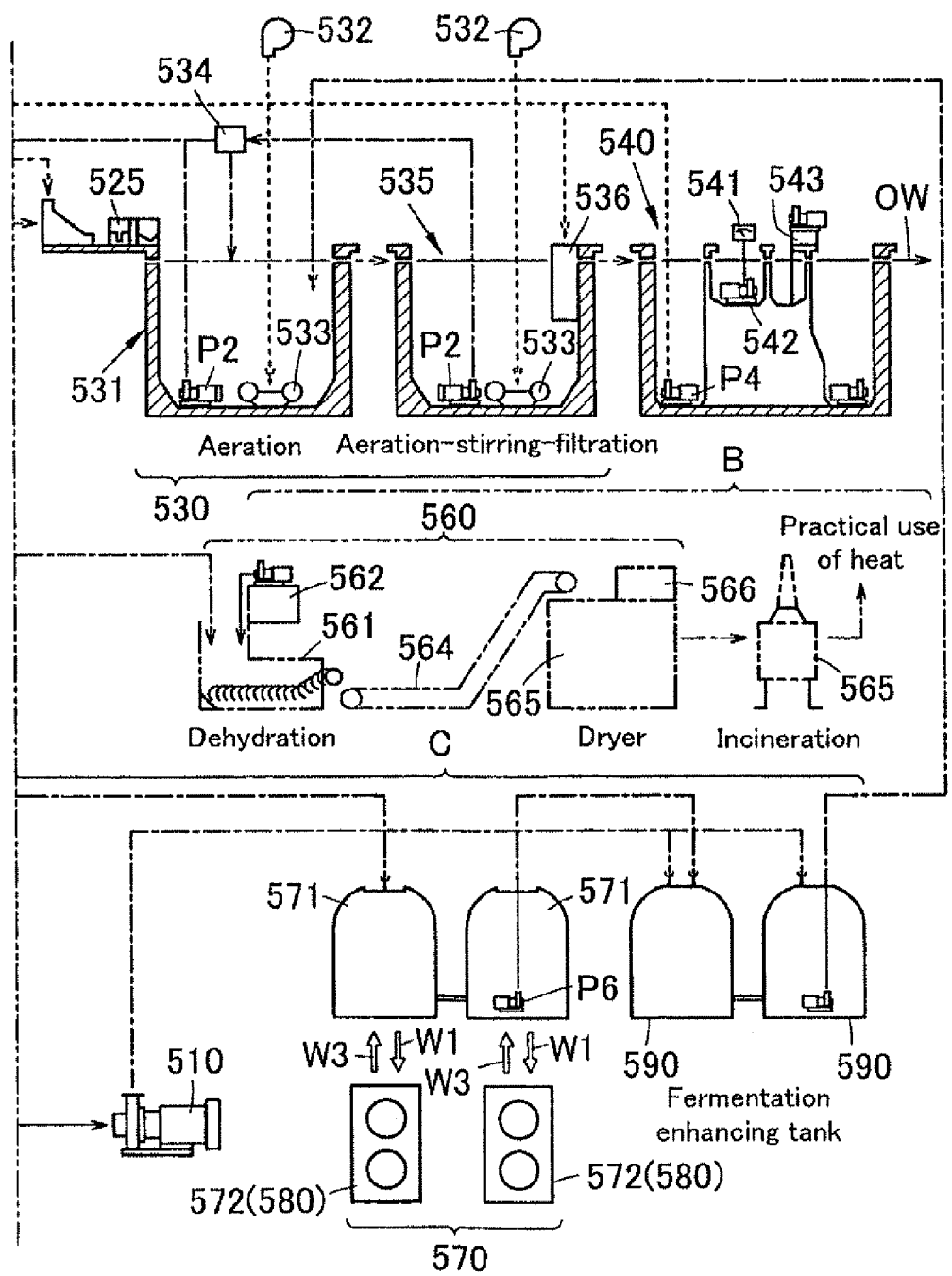

As shown in FIG. 21, an installation 501 for treating a waste liquid containing organic substances according to further application embodiment of the present invention has a waste water treating line A comprising a sand basin 510 for removing dirt and for sedimentation of sands in a supplied waste water WW such as sewage containing organic granular substances by a sand layer 517, an equalizing tank 520 for stirring the pretreated waste water by an underwater stirrer 521, a flow measuring tank 525 for supplying a predetermined quantity of the equalized waste water supplied by an underwater pump R1 in the equalizing tank 520 and mixed with a partially returned water from the postprocessing sections and an aeration tank 530 for applying a contact oxidation and a fermenting treatment to organic granular substances suspended in the predetermined quantity of the equalized waste water mixed with the supplied fermentation tubes, and a sludge fermentation treating line C comprising a sludge concentrating tank 550 supplied with a sludge by a pump P2 from a bottom of the aeration tank 530, a sludge storage tank 555 supplied with a concentrated sludge from the tank 550, a treating tank 571 for treating the concentrated sludge supplied by a pump P3 from the tank 555, a sludge ultrafinely shattering section 570 comprising two set of ultrafinely shattering devices 572, (580) supplied with high-speed sludge water flows of 8 m/second or more by a high pressure pump into particulates having the size of a few micrometers similarly to the above-mentioned ultrafinely shattering apparatus and a sludge fermentation enhancing tank 590 which is supplied with a water containing ultrafinely shattered sludge particulates having sludge dead bacterium cell membrane and cytoplasm broken as well as supplied with fermentation tubes from a fermentation tube culturing tank 599 and adapted to supply the fermentation liquid to the aeration tank 530. Conventionally, a residue sludge from the storage tank 555 was dehydrated and dried for incineration, and thus a sludge incinerating line B comprising a dehydrating and drying section 560 and an incinerator 565 becomes unnecessary in this embodiment because of the fermentation treating of ultrafinely shattered organic particulate substances employed therein.

A sand basin 510 has a main tank 511, a dart remover 512 for removing coarse foreign materials floating in the tank 511, an auxiliary tank 513 adjacent thereto and provided with an aeration/stirring device 515 supplied with an air from a blower 514, and the sand layer 517 disposed above the tank 511 so as to be supplied with the waste water from a bottom of the tank 513 by an underwater pump 516.

The aeration section 530 comprises a first aeration tank 531 having the pump P2, an aeration/stirring device 533 supplied with an air from a blower 532 and a sludge returning regulating device 534 as well as supplied with a liquid containing residue sludge, organic particulate substances and fermentation tubes after the fermentation from the tank 590, and a second aeration tank 533 connected to the tank 531 in series and having the pump P2 and the aeration/stirring device 533 with the blower 532 so as to decompose the organic granular substances suspended in the waste water by the large quantities of fermentation tubes from the tank 590 and the contact oxidation utilizing bubbles from the blower 532. The sludge is sent from the bottom of the section 530 to the condensation tank 550 by the pump P2, but a portion of the sludge from the second tank 535 is returned to the first tank 531 by the sludge returning regulating device 534. Accordingly, the condensation tank 550 is almost supplied with the predetermined quantity of sludge from the first tank 531, but added with the sludge from the second tank 535 for a short quantity by the returning regulating device 534. Intermediate treated water having organic granular substances and sludge decomposed is sent from the first tank 531 to the second tank 535 through a membrane filtration device 536 and then sent to a discharge section 540. The transferring of water after a measuring tank 525 is carried out by a head for the tank 525.

The discharge section 540 comprises a pump P4 for supplying a back-flushing water to the membrane filtration device 536 for cleaning it, a pH sensor 541, a pH regulator 542 and a sterilizing device 543 to allow the discharging of the treated water OW to a river and so on.

In the sludge condensation tank 550, a fluidal sludge is supplied to the sludge storage tank 555 by an air lifter 552 utilizing a pneumatic force from a blower 551. Since all of the sludge in the storage tank 555 is sent to the treating tank 571 for the decomposing by the fermentation tubes, the incineration of sludge becomes unnecessary. From the sludge condensation tank 550, the fluidal sludge is supplied to the storage tank 555 by an air-lift 552 which uses a pneumatic force supplied from a blower 551, and all of the sludge is sent from the storage tank 555 to the treating tank 571 where the sludge decomposition is carried out by utilizing the fermentation tubes. Since the sludge can be decomposed substantially completely, the sludge incinerating line B is unnecessary, which comprises a pump P5, a dehydrating device 561, a coagulant supplier 562, a belt conveyer 564, a hot air dryer 565, an incinerator 565 and a deodorizing device 566.

The sludge ultrafinely shattering section 570 comprises the treating tanks 571 and the sludge ultrafinely shattering devices 572, 580. Since the sludge ultrafinely shattering device 572, 580 has the same function as those of the above-mentioned ultrafinely shattering apparatuses, only its construction will be explained schematically hereinafter.

Figure 22:
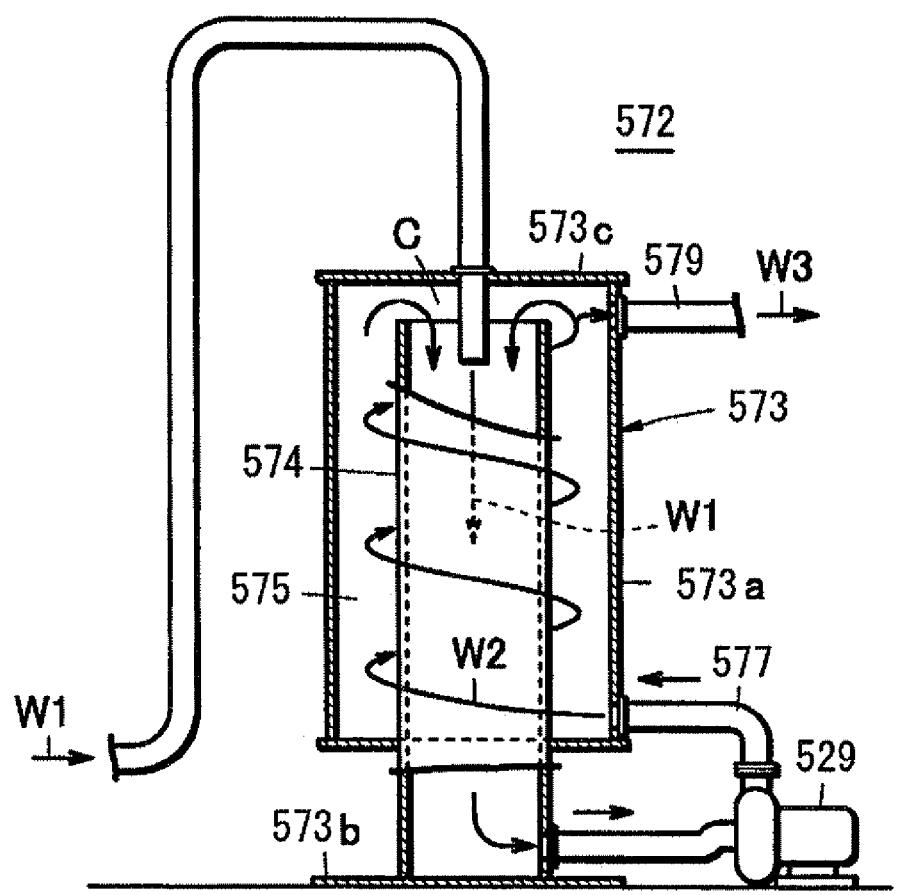
FIG. 22 is a schematic explanatory fragmentary vertical sectional view showing a construction of a first embodiment of an apparatus for ultrafinely shattering organic granular substances for use in the installation.

As shown in FIG. 22, it comprises a casing 573 having an outside cylindrical wall 573a closed by a top plate 573c and a bottom plate and an inside cylindrical wall 574 having an open top end (with a clearance C relative to the top plate 573c) and closed by a bottom plate 573b arranged concentrically so as to receive high-speed water flows W1 produced by a first high pressure underwater pump within the treating tank 671 into the inside cylindrical wall 574, to receive high-speed water flows W2 delivered by a second high pressure pump 529 into an annular passage 575 defined by the outside and the inside cylindrical walls 573a, 574 and to discharge the treated water W3 containing the ultrafinely shattered sludge particulates from the annular passage 575 through a pipe 579.

The ultrafinely shattering for the sludge and clusters of the water is attained by impact forces generated by the high-speed water flows W1 at the bottom within the inside cylindrical wall 574 and shearing forces generated by the high-speed water flows W2 within the annular passage 575. When the clearance C is increased, a rate of repetition of the ultrafinely shattering is increased. And the rate of repetition is also increased by increasing a supply quantity of the water flows W1 (namely increasing speeds of the water flows W1) with a discharge quantity of the treated water W3 made constant substantially.

Figure 23:
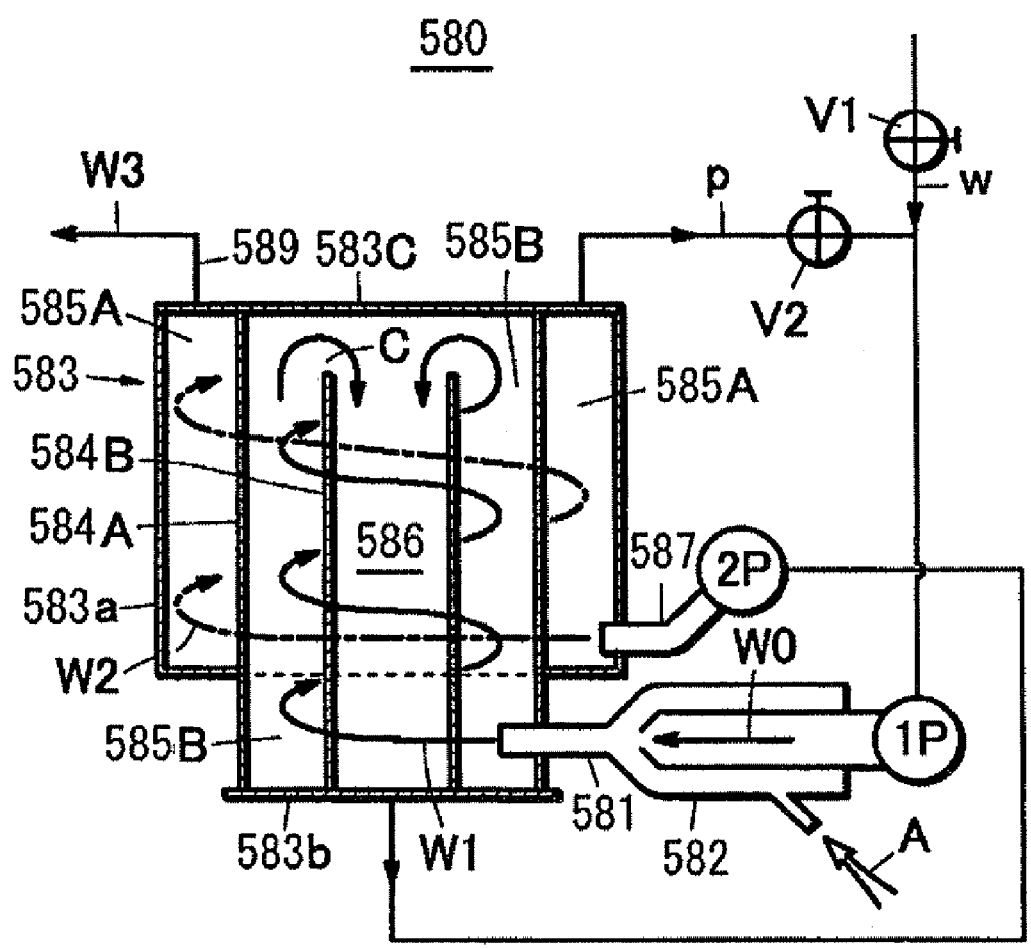
FIG. 23 is a schematic explanatory fragmentary vertical sectional view showing a construction of a second embodiment of an apparatus for ultrafinely shattering organic granular substances for use in the installation.
Figure 24A:
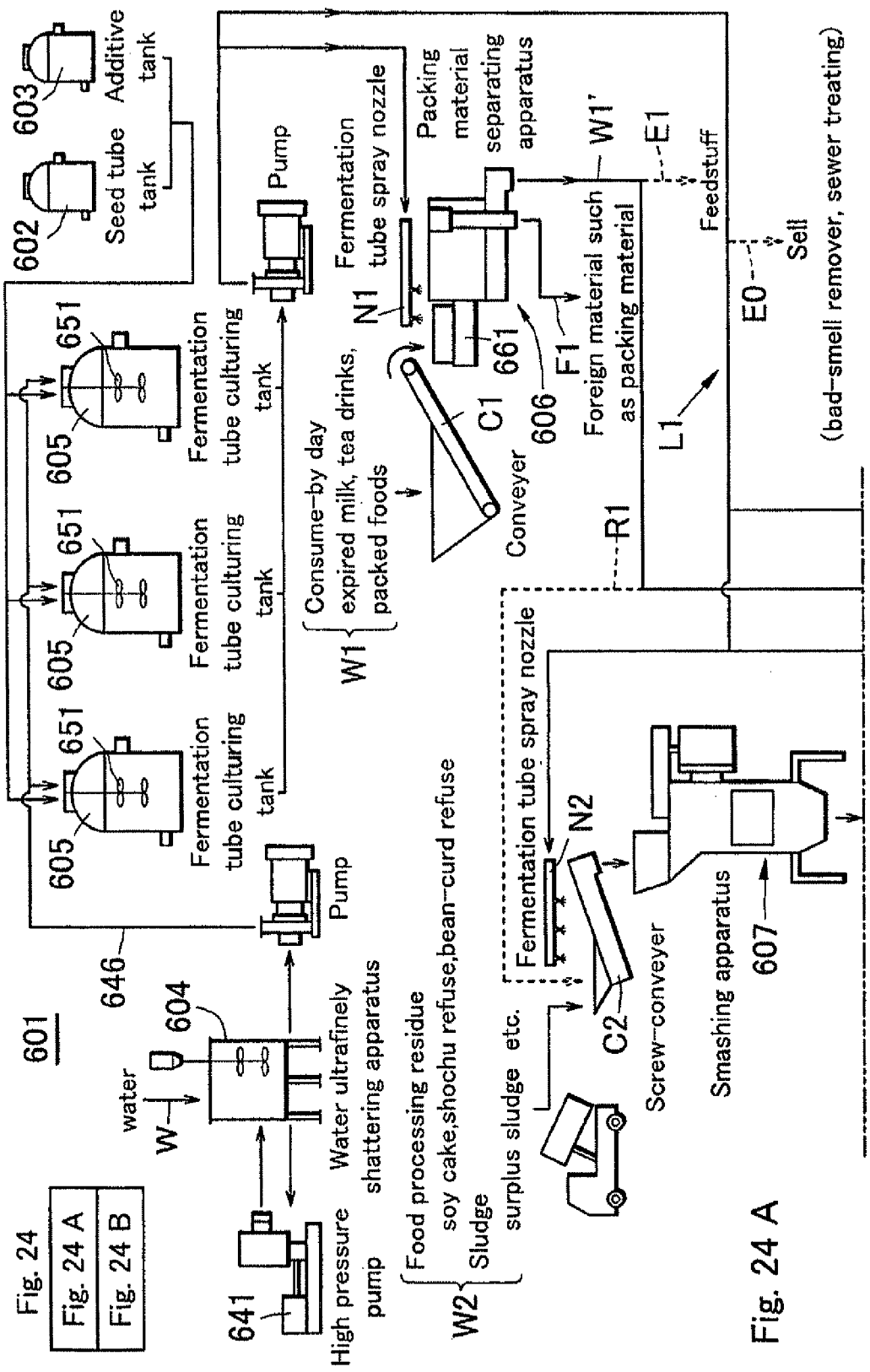
FIG. 24 is a functional flow block diagram showing a construction of a feedstuff manufacturing plant utilizing organic granular substances according to still further application embodiment of the present invention.
Figure 24:
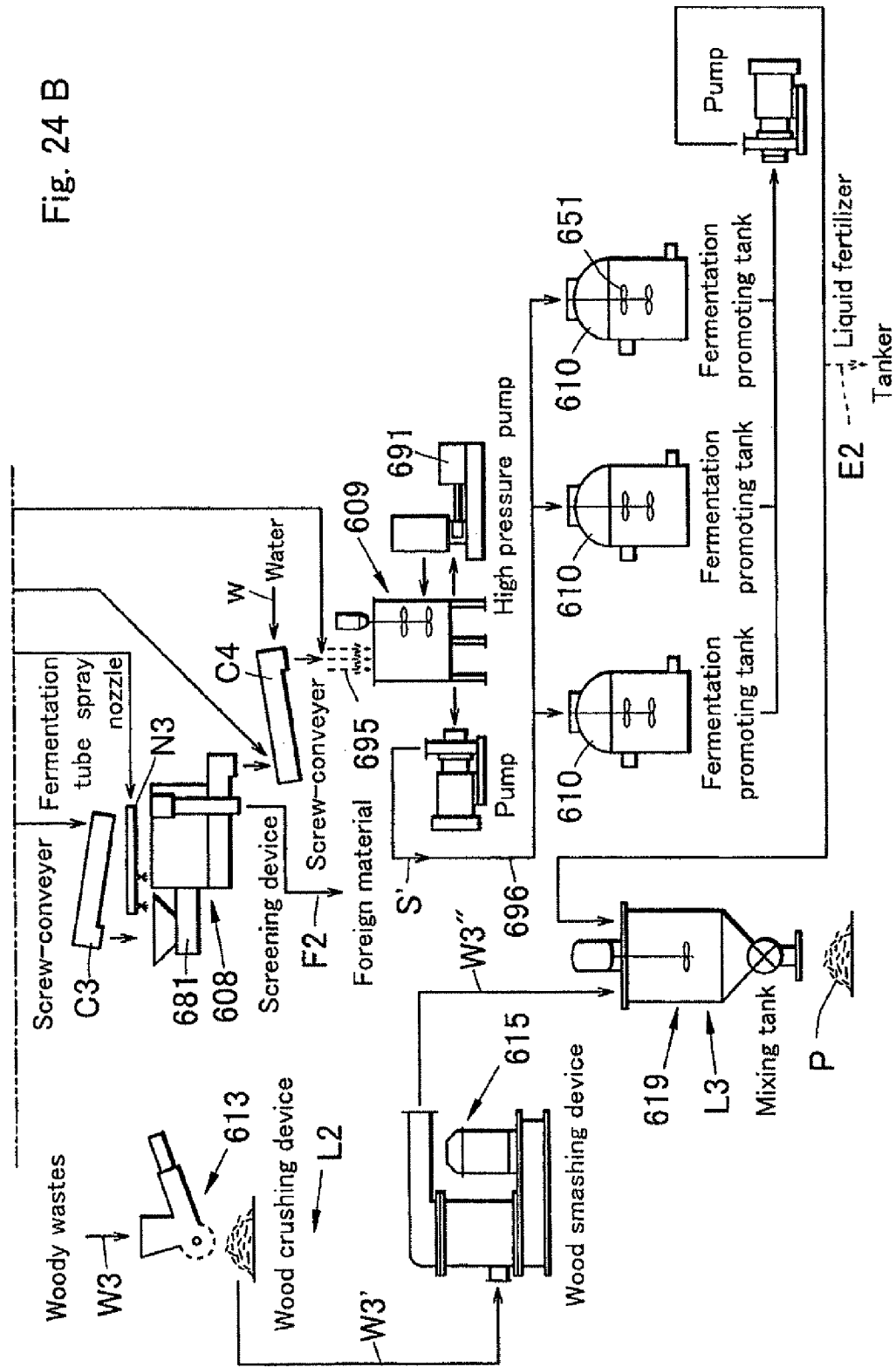

As shown in FIG. 23, the sludge ultrafinely shattering device 580 comprises a casing 583 having an outside cylindrical wall 583a, an intermediate cylindrical wall 584A and an inside cylindrical wall 584B arranged and spaced concentrically and has an outside annular passage 585A defined by the outside and the intermediate cylindrical walls 583a, 584A closed by a top plate 583C and a bottom plate, an intermediate annular passage 585B defined by the intermediate and the inside cylindrical walls 584A, 584B closed by a bottom plate 583b and communicated with an interior of the inside cylindrical wall 584B through a clearance between the top plate 583C and an upper edge of the inside cylindrical wall 584B. A water w containing sludge granules is sucked from the treating tank 571 through a valve V1 by a first high pressure pump 1P and supplied as high-speed water flows W1 through a first water supply portion 581 into the intermediate annular passage 585B. The first high pressure pump 1P has an ejector 582 for sucking an air A into the high-speed water flows W1 as air bubbles by a first high-speed water flow W0 generated by itself to strengthen the cavitation action and the contact oxidation action in the aeration tank. A second high pressure pump 2P sucks the water from the bottom portion within the inside cylindrical wall 584B and delivers second high-speed water flows W2 through a second water supply portion 587 into the outside annular passage 585A. From the outside annular passage 585A, a treated water W3 containing ultrafinely shattered sludge particulates and clusters of the water as well as ultrafine air bubbles is discharged through a discharge portion 589 to the treating tank 571 and a portion of the treated water is sucked by the first pump 1P through a pipe p with a valve V2 so as to repeat the circulation of the water.

A rate of repetition of the ultrafinely shattering is controlled by the valves V1, V2. Namely, when an opening degree of the valve V1 is decreased and an opening degree of the valve V2 is increased, the rate of repetition is increased. Further, as mentioned above, the rate of repetition is increased by decreasing a quantity of the discharge water W3 and/or increasing the clearance C. Instead of two stage bottom, the bottom plate 583b may be made to take the same level as that of the outside cylindrical wall 583a. The cylindrical walls 584A, 5848 may be set cocentrically in such an extent as to keep the annular passages 585A, 585B and further have flat portions, curvature changing portions or vertically elongated slits so as to increase the impact forces and the shearing forces there.

As shown in FIG. 20, the waste water containing the ultrafinely shattered sludge and organic particulate substances is sent from the treating tank 571 to the fermentation promoting tank 590, in which the contact oxidization and the aerobic fermentation for the ultrafinely shattered sludge are greatly promoted in the waste water containing large quantities of ultrafine air bubbles and rich oxygen by large quantities of fermentation tubes supplied from the culture device 595 to decompose large quantities of sludge and organic substances. Such fermentation is preferably carried out by a batch method of every three days or may be performed continuously. The culture device 595 comprises a seed tube tank 596 containing fermentation tubes such as lactobacillus, an additive tank 597 containing nourishments including syrup, a water ultrafinely shattering apparatus 598 in which clusters of a supplied water are ultrafinely shattered by the impact forces of the high-speed water flows, the shearing forces generated by the water flow high-speed differentials and ultrasonic impact generated at the rupturing of air bubbles as described above in the ultrafinely shattering apparatuses 572, 580, and a culture tank 599 to which the treated water is supplied from the apparatus 598, the seed fermentation tubes are supplied from the seed tube tank 596 and the additive is supplied from the additive tank 597 respectively. The cultured fermentation tubes are supplied by the pump P10 to the fermentation promoting tank 590. As the fermentation tubes are used lactobacillus, yeast fungus, butyric-acid bacteria, *Bacillus Natto Sawamura* collected at a site near to the installation. Also phototropic bacteria living in symbiosis with the fermentation tubes are added so as to exchange necessary nourishments each other and to hasten the culture.

The high-speed of the circulating water flows is set to at least 8 m/second, preferably 30 to 50 m/second around for attaining the ultrafinely shattering.

Next, a feedstuff manufacturing plant utilizing organic granular substances according to still further application embodiment of the present invention will be explained with reference to FIG. 24 to FIG. 27. The feedstuff manufacturing plant 601 comprises a fermentation tube culturing line L1 for culturing large quantities of fermentation tubes by utilizing organic substances W1, W2 such as waste foods, residue sludge or the likes, a fine wood-piece preparing line L2 for preparing wood fine pieces P including large 3D quantities of sawdust and woody fibers by smashing woody wastes W3 and a feedstuff manufacturing line L3 by manufacturing fermented feedstuff by mixing the large quantities of wood fine pieces P from the line L2 with the large quantities of fermentation tubes from the line L1.

The fermentation tube culturing line L1 has substantially the same arrangement as the fermentation tube supply device 310 of the Embodiment 10 and comprises a seed tube tank 602 containing fermentation tubes such as lactobacillus, an additive tank 603 containing additives such as nourishments including syrup, a water ultrafinely shattering device 604 to which a clean water w is supplied, from which the high-pressure pump 641 sucks a water to supply it at a high-speed to the device 604 again so that the treated water can have clusters ultrafinely shattered repeatedly, a fermentation tube culture tank 605 with a stirrer 651 to which the treated water having clusters ultrafinely shattered is supplied from the device 604, the seed fermentation tubes are supplied from the seed tube tank 602 and the additives are supplied from the additive tank 604 respectively, an an apparatus 606 for separating packing materials F1 from organic substances W1 such as packed foods whose consume-by day has expired and which are conveyed by a conveyer C1 and sprayed with a liquid containing large quantities of cultured fermentation tubes from the tanks 605 through spray nozzles N1, an organic substances smashing apparatus 607 for smashing blocks of waste organic substances W2 such as residue sludge, soy cake, bean-curd refuse conveyed by a conveyer C2 sprayed with the liquid containing large quantities of cultured fermentation tubes from the tanks 605 through spray nozzles N2, a rotary screening device 608 for removing foreign materials F2 such as caps and stones from smashed organic granular substances conveyed by C3 from the apparatus 607 and sprayed at an inlet 681 with the liquid containing large quantities of cultured fermentation tubes from the tanks 605 through spray nozzles N3, an ultrafinely shattering device 609 (which operates based on the same principle as in the device 604) for ultrafinely shattering slurry-like organic granular substances conveyed by a conveyer C4 from the screening device 608 and the apparatus 607 and added with a water w to produce a culture solution, and a fermentation promoting apparatus 610 with a stirrer 651 for further culturing fermentation tubes supplied from the nozzles N1 to N3 within the culture solution supplied by a pump from the device 609 while decomposing the organic particulate substances by the fermentation tubes.

Figure 25A:
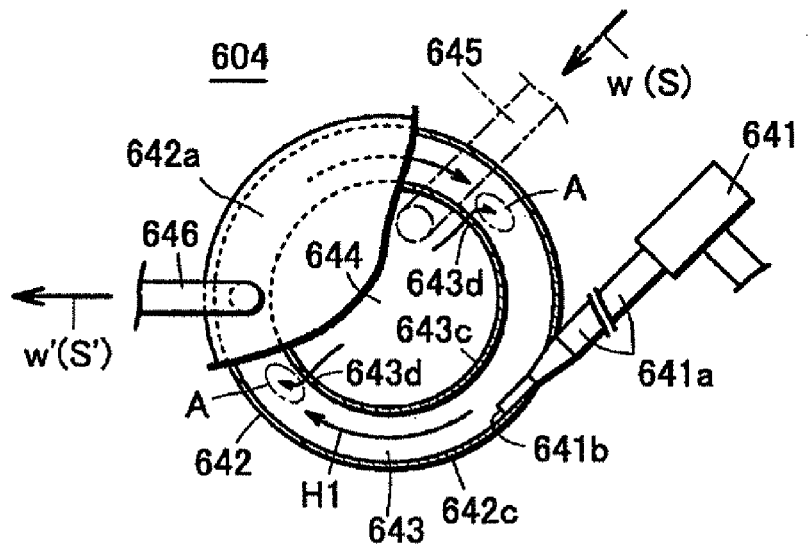
FIG. 25a is a fragmentary horizontal sectional view of an apparatus for ultrafinely shattering both cluster of a water and organic granular substances in the plant.
Figure 25B:
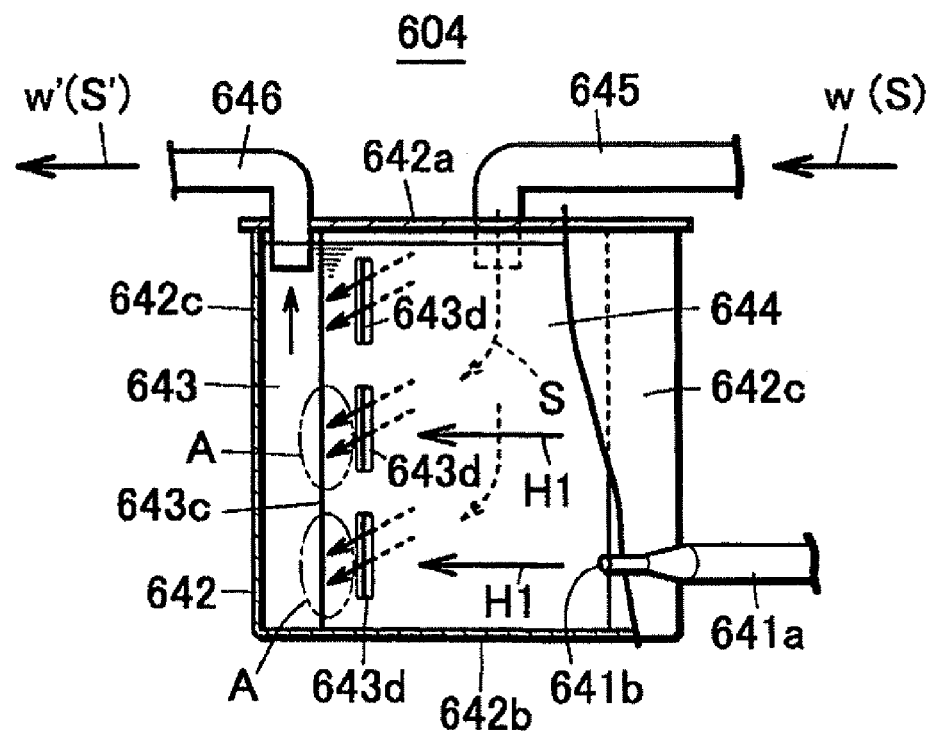
FIG. 25b is a fragmentary vertical sectional view of an apparatus for ultrafinely shattering both cluster of a water and organic granular substances in the plant.

As shown in FIG. 25a and FIG. 25b, the water ultrafinely shattering device 604, (609) uses high-speed water flows H1, for example of at least 8 m/second delivered by a high pressure pump 641 for ultrafinely shattering the water w, (S) supplied from a pipe 645, (695) by the same actions as in the above-mentioned apparatuses into 1 to 10 μm orders. Also the ultrafinely shattering device 609 operates based on the same principle for ultrafinely shattering the slurry-like organic granular substances. Schematically the device 604, (609) comprises a hollow casing 642 having an outside cylindrical wall 642c closed by a top plate 642a and a bottom plate 642b and an inside cylindrical wall 643c closed by the top plate 642a and the top plate 642c so as to an outside annular passage 643 therebetween and an interior room 644 within the inside cylindrical wall 643c. The first high pressure pump 641 has a water injection pipe 641a installed to the outside cylindrical wall 642c so that its delivery port 641b is directed tangentially toward the annular passage 643, and a discharge pipe 646 for supplying the water w' having ultrafinely shattered clusters (slurry S' of organic particulate substances) to the culture tank 605 (the fermentation promoting apparatus 610) so as to enable effective culturing of the fermentation tubes due to the enormous enlarging of specific surface area as mentioned above. The supplied water w, (S) is supplied from the interior room 644 to the outside annular passage 643 through slots 643d formed in the inside cylindrical wall 644. Accordingly, for example when the spherical organic granular substances with a radius of 1 mm having only a specific surface area of 0.00120 $m^2$/g are ultrafinely shattered by the above-mentioned apparatus so as to have a radius of 0.0001 mm, the specific surface area becomes 12.0 m²/g, namely increased 10,000 times, so that the number of fermentation tubes 106 attached to the surface of the ultrafinely shattered organic particulate substances in the tank 105 is increased 10,000 times to enable the effective decomposing of organic granular substances and the effective culturing of large quantities of fermentation tubes. The high pressure pump 641, 691 is adapted to suck the water from the annular passage 643 of the apparatus 604, 609 so as to employ the circulation system.

As the fermentation tubes are generally known lactobacillus, yeast fungus, butyric-acid bacteria, *Bacillus Natto* Sawamura. In this plant 601, such fermentation tubes are used for the treating of organic substances and the culturing of fermentation tubes and further used for preventing the generation of offensive smell in rendering or a grease trap or other various treatments and may be shipped for sale as the treating liquid E0. The fermentation tubes such as lactobacillus may be preferably collected at a treating site and at a culturing site so as to be agreeable with a climate and vigorous at the site. Also phototropic bacteria able to live in a symbiotic relation with the fermentation tubes may be added to the tanks 605, 610 to enhance the culturing by exchanging nourishments between the bacteria and the tubes. When the fermented organic particulate substances mixed with phototropic bacteria are used as a liquid fertilizer, the phototropic bacteria serve many useful actions such as suppression of saprogen proliferation, ingestion of bad smell organic substances as nourishment, preparation of nourishment for fermentation tubes and so on. When the fermentation tubes are mixed with phototropic bacteria able to live in a symbiotic relation with the fermentation tubes such as lactobacillus, it is possible to enhance activities of the fermentation tubes so as to promote their proliferations. The phototropic bacteria are rich in nourishment such as amino acid, mineral, vitamin and so on and themselves can be usefully used as an organic fertilizer, as well as not only positively ingest hydrogen sulfide produced by sulfate reducers at the time of decomposition as a nourishment but also decompose and remove putrescine and cataverine which are poisonous amines and dimethylnitrosamine which is cancer-causing and teratogenetic by ingesting them as a culture substrate. Further, the phototropic bacteria not only serve to protect the respiration and the nourishment metabolism in roots of crops and to increase the yield of crops due to nitrogen fixation by removing harmful substances when being supplied to a field but also promote the proliferation of an actinomycete in a soil which willingly ingests them as a nourishment. The proliferated actinomycetes ingest many pathogenic filamentous fungi for proliferation so as to mitigate consecutive planting disorders caused by the plant-pathogenic filamentous fungi.

A stirrer 651 is mounted to the culture tank 605. The fermentation tubes are supplied to the tank 610 by mixing them with the organic granular substances on the conveyer C1 and in the supply portion 681 through the nozzles N1 to N3, but may be directly supplied into the tank 610, which may be also provided with the stirrer 651, a heater and a temperature controller as required. A foodstuff E1 prepared by mixing unpacked foods with the liquid containing large quantities of fermentation tubes may be also on market for livestock, and a liquid fertilizer E2 obtained by promoting the fermentation of residue sludge, soy cake, bean-curd refuse may be shipped for sale by a tank truck.

Figure 26A:
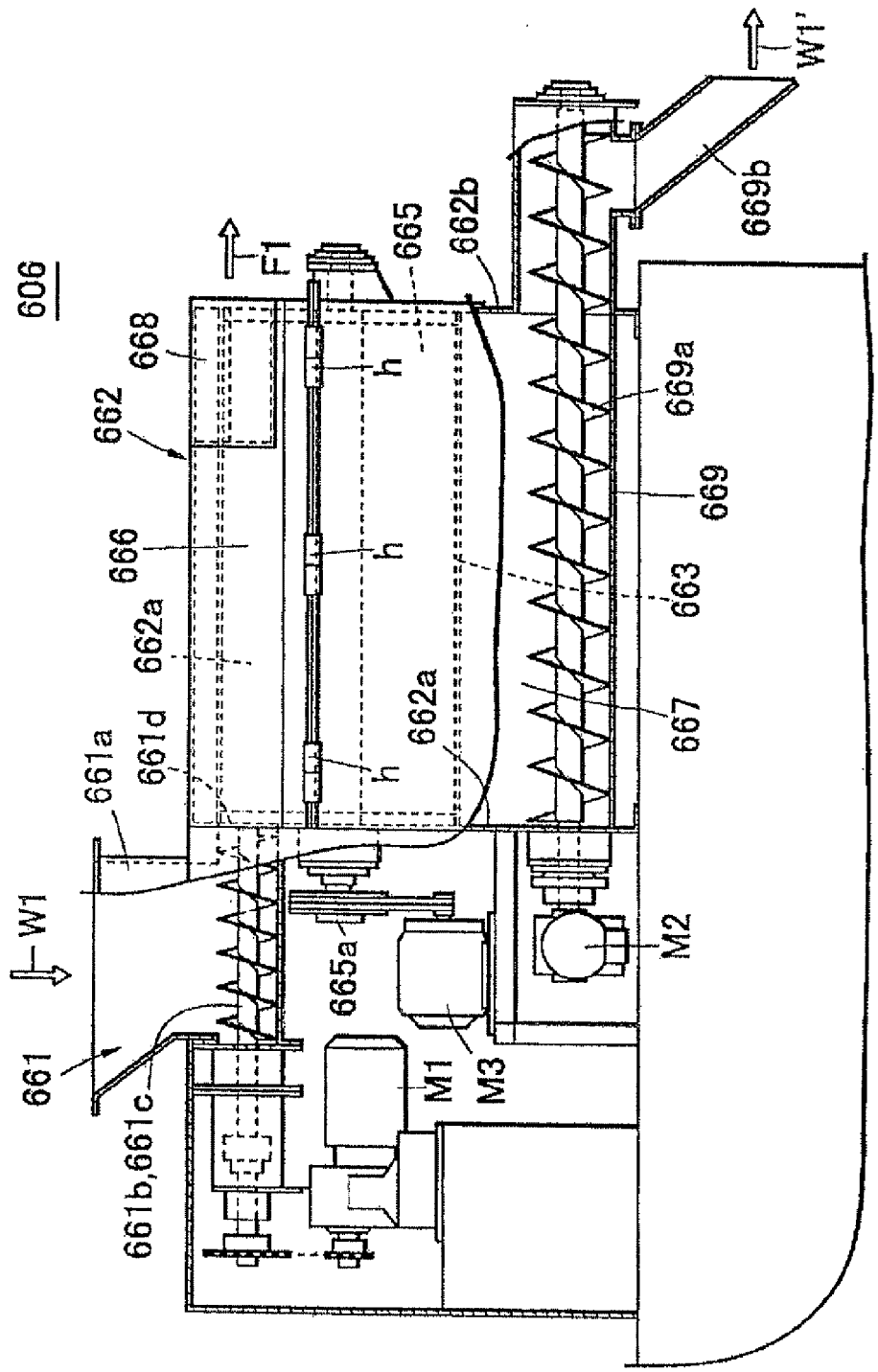
FIG. 26a is a fragmentary vertical sectional view of an apparatus for separating packing materials from waste packed foods in the plant.
Figure 26B:
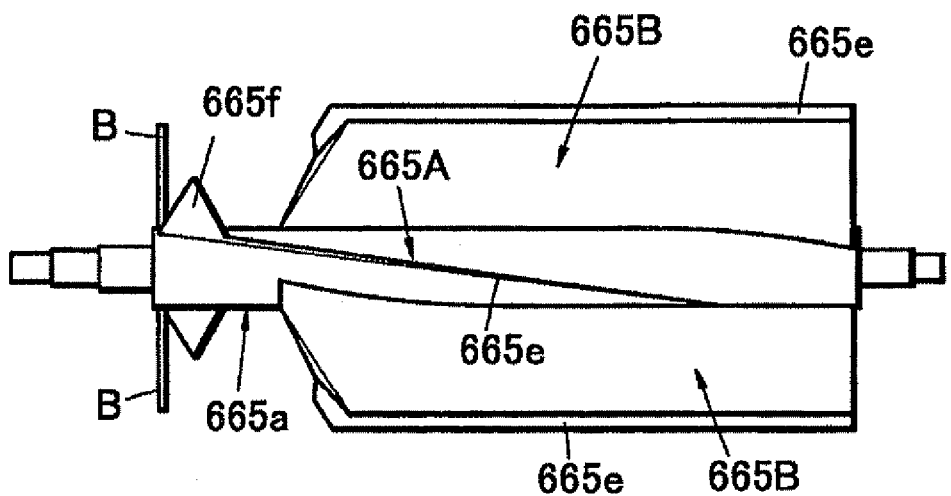
FIG. 26b is a vertical view of a rotary spiral member of an apparatus for separating packing materials from waste packed foods in the plant.

As shown in FIG. 26a and FIG. 26b, the apparatus 606 for separating packing materials from organic substances W1 such as packed foods comprises a crushing section 661 horizontally mounted on the supply side and having a supply portion 661a for receiving packed waste foods W1, an outlet 661d for transferring crushed foods to a separating portion 662a, and a pair of crashing spiral members 661b, 661c provided with tooth attached to their peripheries and rotated by a motor M1 so as to crunch the waste foods W1 from above and convey crashed foods to the outlet 661d, and a separating chamber 662 for loosening the crashed foods and separating packing materials from crashed food pieces supplied from the outlet 661d during conveying the crashed food pieces toward a discharge side.

The separating chamber 662 comprises the separating portion 662a closed by a front and a rear end walls 662a, 662b for separating packing material pieces F1 from food pieces W' by a rotary spiral member 665 horizontally received within a horizontal cylinder 663 formed by a screen having a multiplicity of pores of 2 to 3 mm diameter, a discharge portion 668 formed in an upper casing 666 for discharging the packing material pieces F1 from a rectangular hole of the screen to outside, and another discharge portion 669 provided in a downward tapered lower casing 667 for discharging the food pieces W1' received from the horizontal cylinder 663 through a nozzle 669b by a screw conveyer 669a rotated by a motor M2. The upper casing 666 is connected to the lower casing 667 by hinges so as to be opened and closed.

The rotary spiral member 665 comprises a rotary shaft 665a rotated at a speed of 300 to 600 rpm or at a circumferential speed of 10 to 25 m/second by a motor M3, two preposed helical blades 665A projecting radially from the rotary shaft 665a so as to extend from its supply side end to its discharge side near-end and to contact at outside edges 665e with the inner surface of the cylinder 663, two postposed helical blade 665b projecting radially from the rotary shaft 665a so as to extend from its supply side near-end to its discharge side end and to contact at outside edges 665e with the inner surface of the cylinder 663, and a pair blades B at its supply-side end. The helical blades 665A, 665B are alternately arranged in the circumferential direction of the shaft 665a and shaped like a swept-back wing so as to allow the easy receiving of crushed foods from the crushing section 661, have triangle small blades 665f at their supply-side ends for scattering the coming crushed foods and have narrow long rubber plates attached replaceably to their outside edges 665e. More than two pieces of blades B may be arranged at an equal interval.

Foods contained in strong packages may be crushed by a dual-shaft type rotary cutter crusher or a dual-shaft type screw crusher and separated by the screening device 608 into crushed food pieces and crushed packing material pieces. In the case of the foods contained in soft packages, the crushing section 661 may be omitted and the crushing may be carried out by a rotary spiral member provided on the supply side with crusher projection or blades within the screen cylinder for separation, resulting in a dedicated application and a simple construction.

The fine wood-piece preparing line L2 has a wood crushing device 613 (such as a hammer crusher or a rotary cutter) for crushing wood wastes W3 with metal fittings removed into fine woody pieces W3' having lengths of 3 to 5 cm and a wood smashing device 615 for smashing the woody pieces from the crushing device 513 into finer wood pieces W3" containing large quantities of saw-dusts and fibers having sizes of 5 mm to several μm. Since the woody pieces W3" contain cellulose, lignin of aromatic polymer, resin and so on which can be decomposed by fermentation tubes into simple substances such as grape sugar, the feedstuff for livestock can be prepared in the line L3.

Figure 27A:
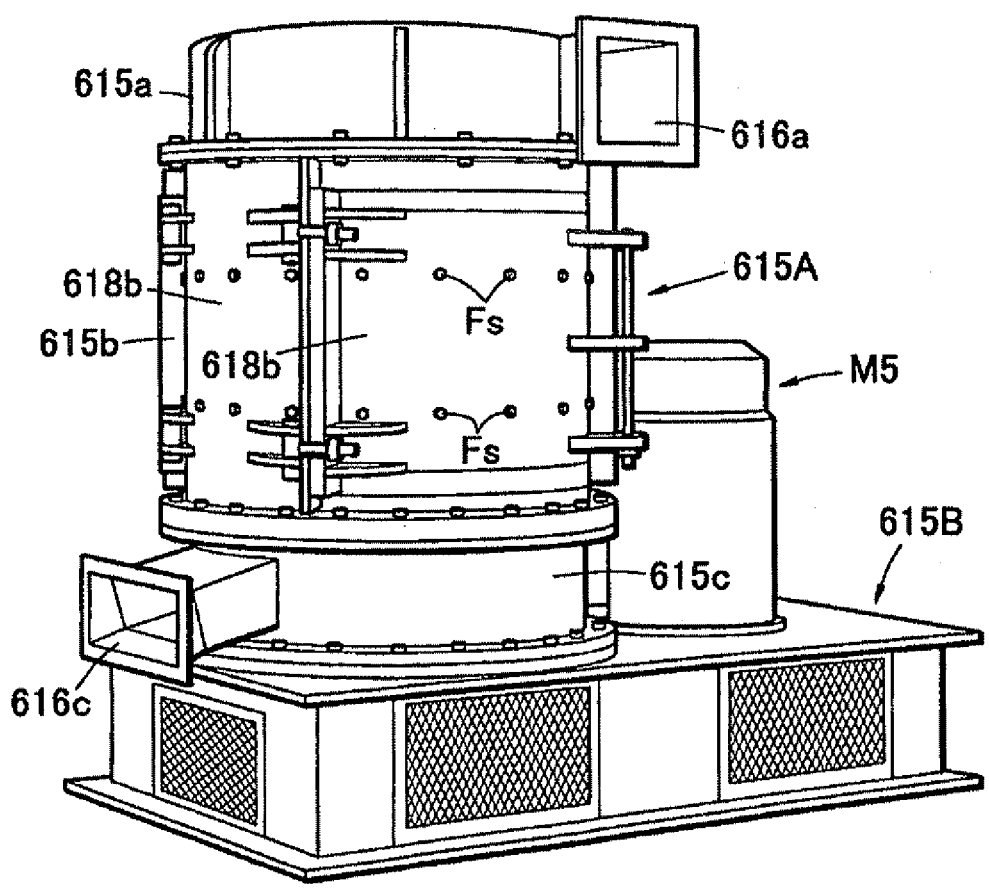
FIG. 27a is a perspective view of a wood smashing device in the plant.
Figure 27B:
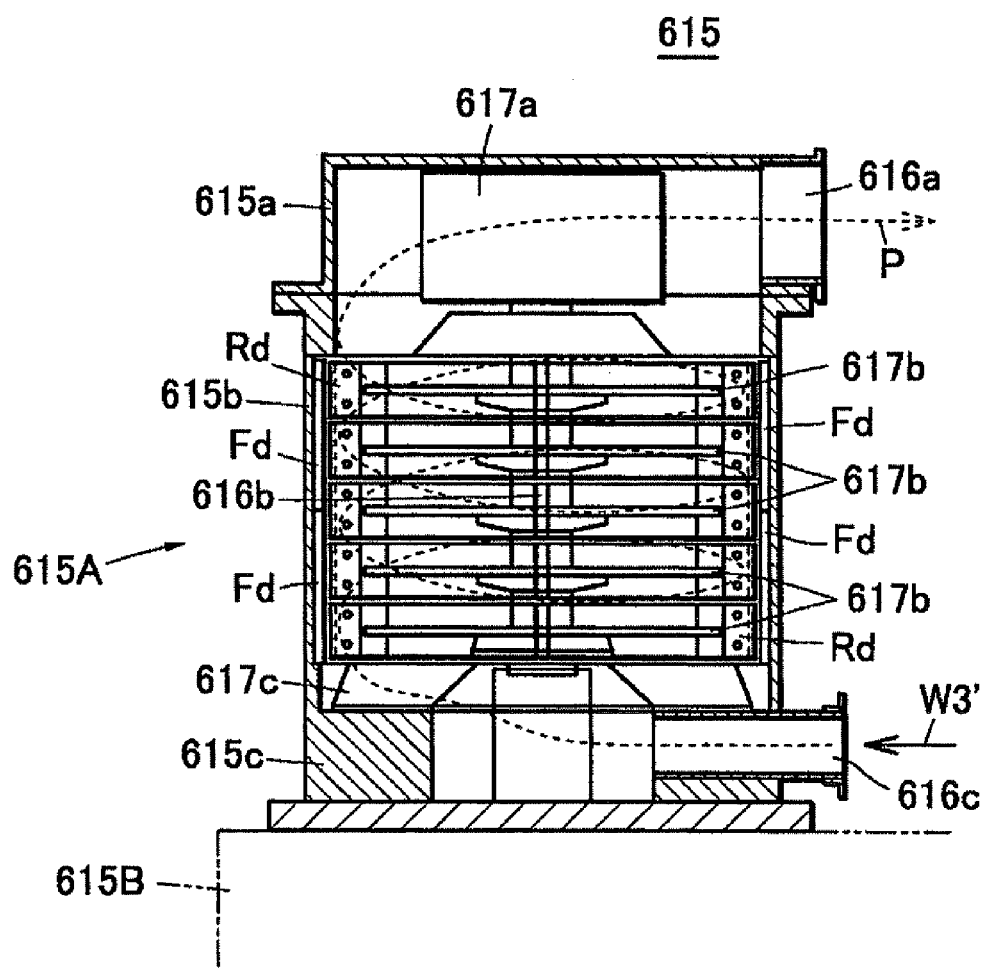
FIG. 27b is a vertical sectional view of a main portion of a wood smashing device in the plant.
Figure 27C:
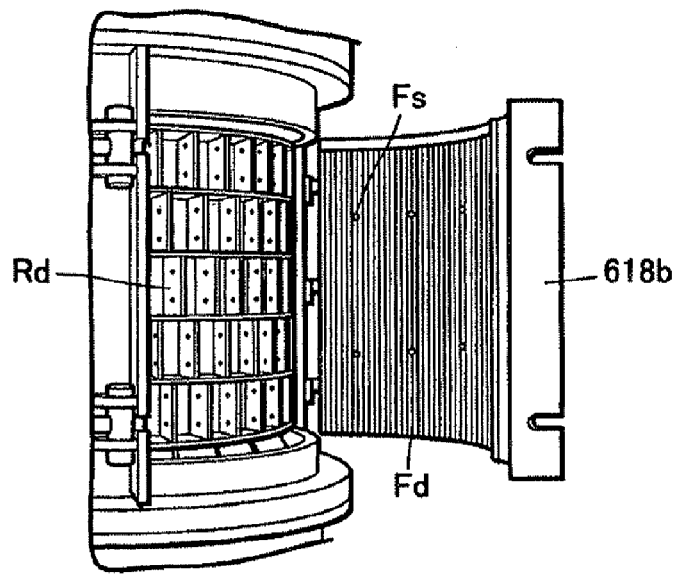
FIG. 27c is a partial perspective view showing rotary smashing vertical blades and stationary smashing blades of a wood smashing device in the plant.
Figure 28A:
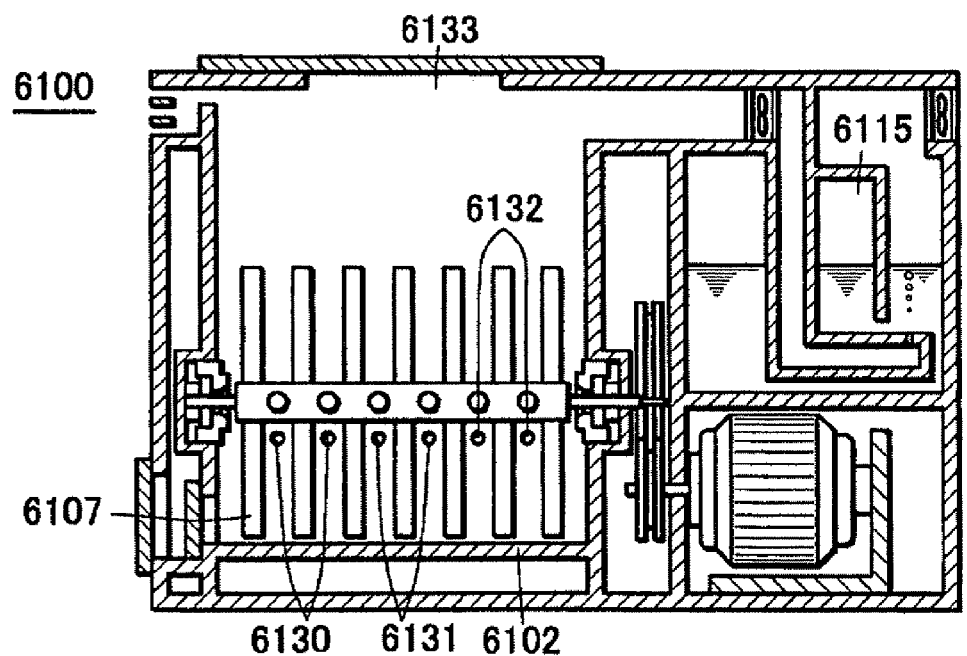
FIG. 28a is a vertical sectional view of a waste decomposing apparatus using fermentation tubes according to a prior art.
Figure 28B:
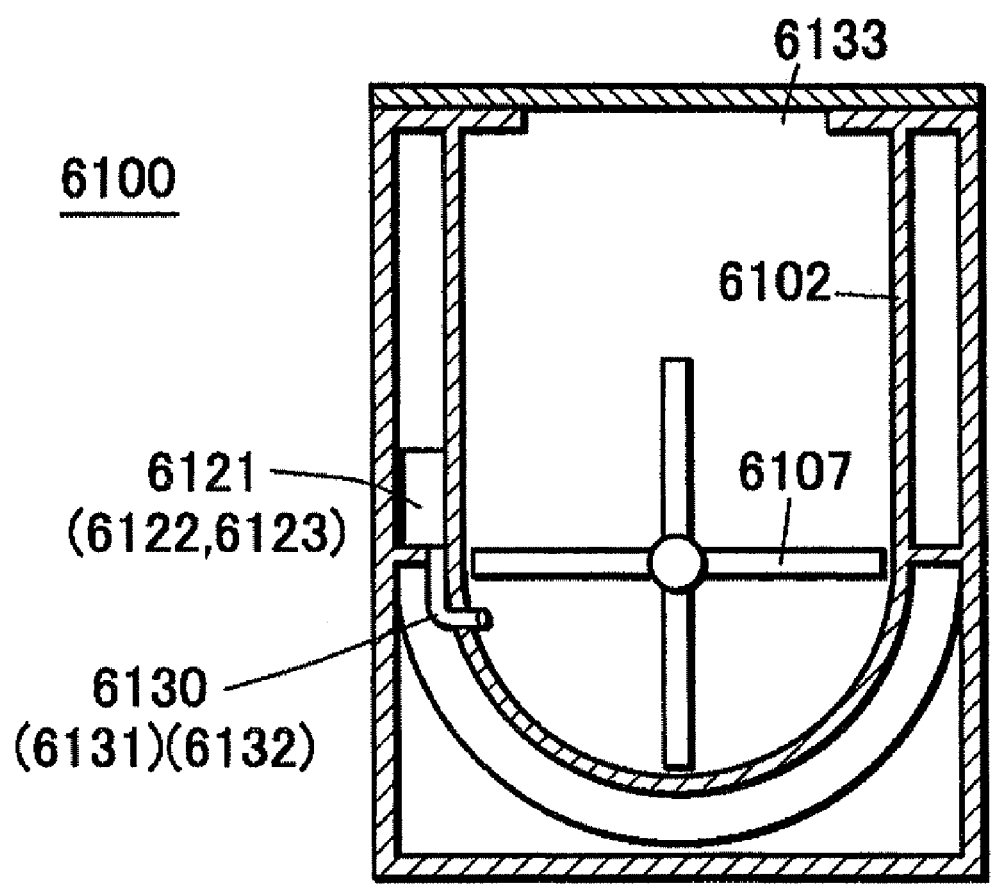
FIG. 28b is a vertical cross-sectional view of a waste decomposing apparatus using fermentation tubes according to a prior art.

The wood smashing device 615 comprises, as shown in FIGS. 27a, 27b, 27c, a vertical casing 615A having an upper end portion 615a with an outlet 616a for discharging smashed wood pieces W3", a cylindrical wall 615b and a lower end portion 615c formed by a lower end portion of the cylindrical wall 615b and provided with an inlet 616c for sucking wood pieces W3', a vertical rotary shaft 616b rotatably supported within the vertical casing 615A by bearings disposed in the upper end portion 615 and the lower end portion 615c respectively, a main suction blade 617a attached to the rotary shaft 616b on the outlet side for sucking the wood pieces W' into the cylindrical wall 615a through the inlet 616c and discharging the smashed wood pieces W3" outside through the outlet 616a, an auxiliary suction blade 617c attached to the rotary shaft 616b on the inlet side for supporting the sucking of the wood pieces W', a plurality of rotary disks, particularly 5 pieces of disks 617b attached to an intermediate portion of the rotary shaft 616b between both the suction blades 617a, 617c, a multiplicity of, for example 24 pieces of rotary smashing vertical blades Rd attached to the peripheral portion of each disk 617b, and stationary smashing blades Fb having serrations attached replaceably by screws Fs to the inner surface of the vertical casing 615A so as to be near to the chips of the smashing vertical blades Rd.

The rotary shaft 616b is rotatably supported in a vertical posture by a thrust/radial bearing mounted at a mid portion of a bottom plate of the lower end portion 615c. The vertical casing 615A and an electric motor M5 are arranged on a base 615B side by side so that the shaft 616b with the disks 617b having, for example a diameter of about 945 mm can be rotated, for example at a speed of about 2000 rpm by the motor M5 through a pulley-belt transmission means. The casing 615A has a pair of checking doors 618b formed in the cylindrical wall 615b and also provided in their inside surfaces with the replaceable stationary blades Fb for checking five pieces of the disks 617b. Each groove of the serrations of the stationary smashing blades Fb is formed in the vertical running manner so as to be opposed to the smashing vertical blades Rd. Clearances between the rotary smashing vertical blades Rd and the stationary smashing blades Fb may be so set as to get smaller gradually or stepwise from the suction side to the discharge side, so that a smashing load can be equalized from the suction side to the discharge side to prevent local wears.

In the wood smashing device 615, when the shaft 616b is rotated, the wood small pieces W3' having sizes of 30 to 50 mm are sucked by the main and the auxiliary blades 617a, 617c and moved radially by centrifugal forces generated by the rotating disks 617b, and then smashed effectively into the finer wood pieces W3" having the size of a few micrometers to 5.00 mm by the rotary and the stationary smashing blades Rb, Fb during moving up from the lower inlet 616c to the upper outlet 616a, so that the size controlling can be performed automatically by weights of wood pieces.

The foodstuff manufacturing line L3 has a mixing tank 619 provided with a stirrer and supplied with large quantities of fermentation tubes from the fermentation promoting tank 610 and large quantities of fine wood pieces W3" from the wood smashing device 615 to mix them and to produce the fermented foodstuff.

Instead of the representative embodiment of the foodstuff manufacturing plant 601, may be proposed such a manufacturing plant as to mix the fine wood pieces W3" supplied from the device 615 with the fermentation tubes supplied from the fermentation tube culturing tanks 605 within the mixing tank 619. Further, the fine wood pieces W3" from the device 615 may be directly mixed with the suspension liquid within the fermentation promoting tanks 610 used as the mixing tank 619 for manufacturing the foodstuff. The fine wood pieces W3" may be packed in a bag or a container and then dipped into the suspension liquid within the mixing tank 619 or the fermentation promoting tanks 610 so as to allow the fermentation tubes to inhabit therein. Furthermore, the waste foods separated from the packing material and supplied with the fermentation tubes from the nozzles N1 may be shipped as the foodstuff E1 and mixed with the fine wood pieces W3" to manufacture the feedstuff.

A livestock-farming system according to another application embodiment of the present invention as shown in FIG. 29 employs the foodstuff and/or wood chips containing the fermentation tubes obtained as mentioned above. This system is an installation for farming livestock such as cows, bulls, pigs and chickens as a farming place inside the fence in the open air. The farming place according to the present invention provides a place for livestock to run, walk, pasture or take a rest by using the above-mentioned wood chips and foodstuff.

The wood chips include crushed or smashed wood pieces having suitable sizes produced by crushing or smashing timbers provided by thinning or pruning woods or breaking up a wood house, and they are spread over on a ground directly or on a waterproof sheet or layer indirectly in a laminated state. Wood chip layers can be two layers, for example a coarse wood chip layer to a fine wood chip layers.

The wood chips include pulled-up roots, driftwood, and/or may include sawdust produced by a saw in a lumber mil. Wood chips can be decreased by the effective fermentation.

The system according to the present invention, wood chips from the wood pruned in the forest, dead trees or pruned wood in in the parks, gardens or roadside can be used. Above mentioned waste wood chips can be suitably utilized during the disposal process. The wood chips from the wood houses can also be used as a wood chip layer.

The firming place is preferable to be constructed on the waterproof layer on which the wood chips are deposited in the form of layers. Waterproof layer may include the components which can prevent from contamination caused by excretory substances penetrating into the ground, for example concrete. In this regard, waterproof layer may be formed by a flexible durable resin sheet such as a rubber sheet or a plastic sheet.

In the farming place, it is preferable to provide a filtration layer formed by an old Tatami mat or a carpet under the wood chip layer so as to separate excretion such as urine from the wood chip layer.

A drainpipe may be provided between the filtration layer and the waterproof layer or within the filtration layer as a drainage.

As one embodiment, may be employed such a construction as to stack up the hydrophilic filtration layer, for example comprising old Tatami mats and having the plurality of drainpipes embedded therein on the waterproof sheet spread over the ground, the coarse chip layer and the fine chip layer. This embodiment is suitable for the farming place.

In the system according to the present invention, the farming place is provided with the waterproof layer on the ground, filtration layer deposited on the waterproof layer. Further, wood chip layer includes the coarse wood chip layer and fine wood chip layer.

In another embodiment, the farming place may have a catchment pit formed in the ground for collecting liquid from the filtration layer and the wood chip layer.

Further, it is preferable to arrange a discharge pump for sucking the liquid from the catchment pit, and a piping connected to the pump for supplying the liquid to a sprinkler system disposed above the uppermost chip layer.

This sprinkler system may have preferably a capacity to operate normally under such a rainfall as reaching 30 to 80 mm/hour so as to be used in an open-air farming place. On the good weather day, the liquid and water can be made to evaporate by sprinkling them onto the farming place. And it is possible to check the quantity and the condition of the fermentation tube in the liquid by pumping up the liquid from the catchment pit suitably.

The feedstuff for use in this system is suitable for livestock and may be mixed with grains, cereals, compound feeds, pastures or straws. Especially, foodstuff for farming pigs may include, similarly to a conventional pig farming, leftovers, waste processed foods, residues, organic sludge, garbage, livestock excrement or the likes.

In this invention, the fermentation tubes are added to the wood chips or the foodstuff, or both of them. Concretely, the culture medium containing fermentation tubes is mixed with the wood chips or the foodstuff or sprinkled over the wood chip layer.

When only the wood chips are used, the fermentation tubes ferment cellulose of the chip, other wood fibers, and other hydrocarbons which produce water, carbonic acid gas and heat and proliferate by themselves to decompose and consume the chips a little by a little. During the fermentation, they contribute the enhancing of the decomposing of feces and urine and the preventing of the generation of offensive smell components to reduce the offensive smell. Further, they transfer to the foodstuff directly place on the wood chip layer to serve to make the feedstuff odorless.

When the fermentation tubes are added to the foodstuff, the fermentation tubes serve to ferment the foodstuff so as to make it more useful preventing or delaying decomposition of the foodstuff. When the farming place employs such a feedstuff and a drink water as containing the fermentation tubes, also the active some fermentation tubes are excreted by livestock together with excretion to promote the converting of the wood chips in the chip layer to compost.

As a group of the fermentation tubes available for mixing with the wood chips, there are lactobacillus, actinomycete, acetobacter, yeast and so on, which are fungi capable of decomposing starch, protein or the likes so as to be mixed with the foodstuff. When the foodstuff mixed with the fermentation tubes are spread over the wood chip layer, the fermentation tubes move from the spread foodstuff to the wood chips also.

Waste timbers issued from broken-up wood houses may be used for producing the wood chips. Even though such waste timbers would include various kinds of timbers applied with an antiseptic agent containing heavy metals, some fermentation tubes can ingest compounds of heavy metals such as cadmium, chrome contained in the antiseptic agent during proliferation so as to make them harmless. As such fermentation tubes have been known lactobacillus, actinomycete, acetobacter, yeast and so on. Particularly, since the heavy metals harmful for a human body can be ingested by some fermentation tubes as the culture medium to be made harmless, such fermented wood chips are safe for livestock and also for compost. For example, the compound of cadmium is decomposed by the fermentation tubes into cadmium simple substances adapted to be ingested by the fermentation tubes as an essential element, so that its toxicity can be removed or mitigated.

The ingested fermentation tubes by livestock activate fungi inhabiting in the stomach and intestines to promote health as well as to mitigate offensive smell of excretion. The excretion with fermentation tubes are mixed with the wood chips, the reducing of the wood chips can be further enhanced as well as the compost having good quality can be manufactured as mentioned above. The fermentation tubes can stop life-activities of decomposition fungi to prevent the producing of offensive smell as well as to prevent the attracting harmful insects such as a fly.

The fermentation tubes may be previously added to leftovers, waste processed foods, residues, organic and so on to ferment them, so that such fermented organic substances may be used as useful foodstuff to reduce a manufacturing cost of the foodstuff.

Since the fermentation tubes are mixed with the wood chips, also the excrement can be left on the wood chips and converted to compost by the fermentation tubes, enabling the saving of manpower for cleaning the excrement. Furthermore, since the livestock-farming system can prevent the generating of offensive smell and the attracting harmful insects, an environmental restriction can be relaxed to allow the selecting the farming place in a comparatively wide area and the natural open-air pasturage, so that stress of livestock can be alleviated resulting in good meat to be forwarded as well as good eggs to be forwarded.

The fermentation tubes may be used after the culturing by a culture device of *lactobacillus* taken from plants or soil near to the farming place. It is preferred for the culturing that suitable organic culture medium is previously ultrafinely shattered to the size of a few micrometers by the ultrafinely shattering apparatus and then the fermentation tubes are cultured by the ultrafine organic particulate substances within the culture tank under a suitable condition for the fermentation tubes.

The ultrafinely shattering apparatus uses, as mentioned above, the impact forces generated by the high-speed water flows, the shearing forces generated by differentials between the high-speed water flows and/or the impact forces generated by rupture of air bubbles with the cavitation action to ultrafinely shattered organic granular substances supplied into the high-speed water flows. The apparatus comprises, for example, double cylindrical walls within a casing so that an annular passage is defined therebetween, a high pressure pump for supplying the high-speed water flows to the annular passage, a supply pipe for supplying a slurry containing the organic granular substances into the inside cylindrical wall, slits formed in the inside cylindrical wall for supplying the slurry perpendicularly into the high-speed water flows in the annular passage, and a discharge pipe for discharging the organic particulate substances ultrafinely shattered by the above-mentioned forces from the annular passage.

As the culture organic medium may be used also garbage, leftover, waste processed foods, residues of the processed foods, organic sludge, or wood chips which are preferable for the foodstuff.

These organic substances and wood chips are ultrafinely shattered by the ultrafinely shattering apparatus after being coarsely crushed, and the ultrafine shattered organic particulates are supplied as a slurry into the culture tank for use in the culturing of fermentation tubes.

During the culturing, particular fermentation tubes are cultured so as to prevent the proliferation of various other bacteria under a particular culture condition. The slurry containing the fermentation tubes cultured in the culture tank and the organic particulate substances are used for the fermentation medium to be mixed with the foodstuff, the wood chips, or the wood chip layer spread over the livestock farming place through a piping or a sprinkler system. In this way, in the farming system of the present invention, the fermentation tubes can be mixed with the wood chips or the foodstuff, or sprinkled over them.

Sometimes, the mixture of the slurry containing fermentation tubes and the wood chips may be used for forming the wood chip layer by being spread over the farming place in a wet condition or a dry condition. Preferably, the fermenting wood chip mixture may be stored at a suitable humidity and mixed with large quantity of new wood chips for replenishment.

It is preferable that the fermentation tubes are mixed with phototropic bacteria able to live in a symbiotic relation with the fermentation tubes such as lactobacillus and to enhance activities of the fermentation tubes so as to promote their proliferations. The phototropic bacteria are rich in nourishment such as amino acid, mineral, vitamin and so on and themselves can be usefully used as an organic fertilizer, as well as not only positively ingest hydrogen sulfide produced by sulfate reducers at the time of decomposition as a nourishment but also decompose and remove putrescine and cataverine which are poisonous amines and dimethylnitrosamine which is cancer-causing and teratogenic by ingesting them as culture substrates. Further, the phototropic bacteria not only serve to protect the respiration and the nourishment metabolism in roots of crops and to increase the yield of crops due to nitrogen fixation by removing harmful substances when being supplied to a field but also promote the proliferation of an actinomycete in a soil which willingly ingests them as a nourishment. The multiplied actinomycetes ingest many pathogenic filamentous fungi for proliferation so as to mitigate consecutive planting disorders caused by the plant-pathogenic filamentous fungi. As the phototropic bacteria, may be used a phodospirillaceac fungus, for example the trade mark "Z-Lant fermentation tube" available from Higasinihon Z-Lant Co. Ltd. Such fermentation tubes, for example *lactobacillus* and *Bacillus subtilis* have a strong action for fermenting and decomposing the organic granular substances.

The phototropic bacteria may be added to the culture tank during the proliferation of fermentation tubes so as to increase the culturing speed or added to the slurry containing the fermentation tubes when the slurry is mixed with the foodstuff or the wood chips. The phototropic bacteria may be spread over the wood chip layer to which the substrate for fermentation tubes has been already added.

EXAMPLE

As shown in FIG. 29, the pig-farming system 6201 which utilizes the wood chips farms, for example about 30 heads of pigs 6240 on the farming place 6210 having an area of 300 m² around surrounded by a fence 6211.

The farming place has a wood chip floor 6217 consisting of a plurality of wood chip layers and the foodstuffs 6220 directly placed on the floor 6217 at several locations into both of which the fermentation tubes 6230 are mixed. In this farming place, also the excretion 6245 of pigs 6240 is left on the floor 6217 and mixed with the wood chips of the floor 6217, so that the excretion 6245 together with the wood chip floor 6217 is fermented by the fermentation tubes to become good quality compost at last.

The farming place 6210 is set in a concaved ground 6213 having a depth of 2.5 m around formed by digging down the ground and having a circumferential bank 6212 with the fence 6211. The concaved ground is covered with a water proof sheet 6214 made of vinyl chloride as a water-proof layer, on which many old Tatami mats are arranged as a filtration layer while many water collecting and discharge pipes 6215 are embedded within the Tatami mats. On the filtration layers 6212, a wood chip layer 6217 having a thickness of about 2 m comprising coarse wood chip layers 6217a and fine wood chip layers 6217b, each of which has a thickness of about 50 cm, piled up alternately twice are stacked.

Deciduous trees 6211a are planted near to the farming place on the south side to the west side to provide a sun-shade for pigs, and may be planted in the farming place also.

A catchment pit 6218 is formed by a water-proof concrete cylinder with an upper end opened in the ground 6213 for collecting liquid from the piping 6215.

The catchment pit 6218 accommodates an underwater discharge pump 6219a for sucking the liquid such as a rain water and urine therefrom, and a piping 6219b is connected to the pump for sprinkling the liquid over the uppermost fine chip layer 6217b from above. The chip layer can keep the wet condition due to the sprinkled liquid, while a portion of the liquid and water can evaporate and the remaining can maintain and occasionally promote the fermenting of the wood chips by the fermentation tubes.

In this example, coarse wood chips of the coarse wood chip layer 6217a are prepared by crushing or smashing timbers provided by thinning or pruning woods through a crushing device so as to have widths or diameters of about 0.5 to 1.0 mm and lengths of 5 to 20 mm around, and sawdust discharged from a lumber mill, is used for the fine wood chip layer 6217b.

Figure 30:
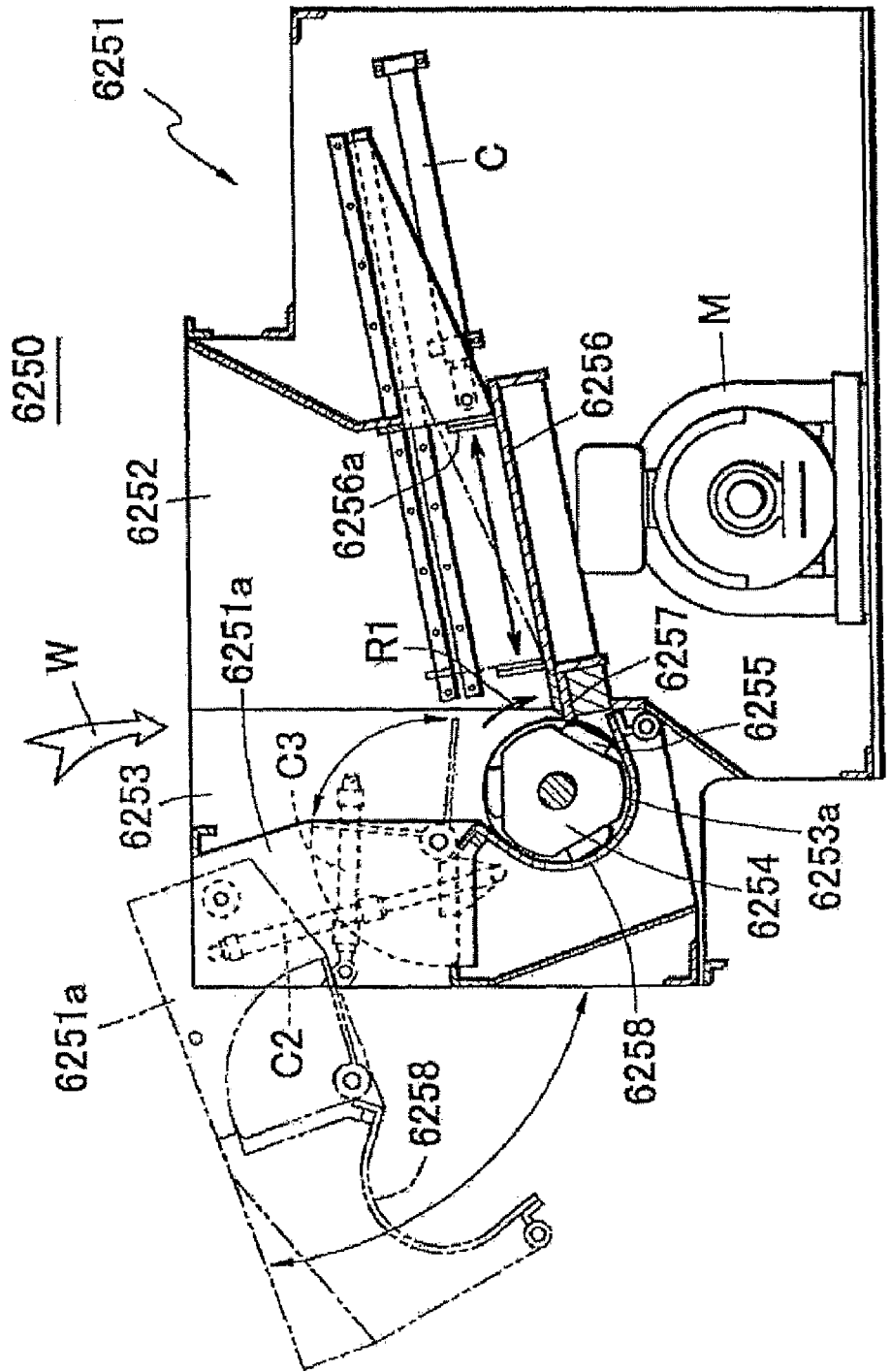
FIG. 30 is a vertical sectional view showing a wood crushing device for producing wood chips for use in the pig-farming system.

As shown in FIG. 30, one example of a wood crushing device 6250 for producing coarse or fine wood chips comprises a casing 6251 having an upper opening 6252 for receiving wood pieces W, a crushing chamber 6253 for holding and crushing the wood pieces W, a crushing rotor 6254 rotatably and horizontally supported within a lower fore portion of the crushing chamber 6253, a plurality of crushing cutters 6255 arranged in a surrounding surface of the rotor 6254 in the axial direction and in the circumferential direction respectively, a stationary blade 6257 fixedly secured to a lower portion of the chamber 6253 so that the rotary cutter can be brought into adjacent thereto, a screen 6258 mounted replaceably to a lower discharge opening 6253a of the chamber 6253 so as to cover the rotor 6254 along a half of its circumference and to sort grain sizes, and a motor M for rotating the rotor in the direction of arrow R1 through a transmission means (not illustrated herein).

On the opposed side to the rotor, there is provided a pusher 6256a supported by a plate 6256 so as to be reciprocated by a cylinder C1, and the wood pieces W are crushed by the rotary cutters and the stationary blade while being pushed toward the cutters by the pusher 6256a.

As the screen 6258 can be used nets having various sizes of pores to produce the wood chips having different sizes.

For replacing the screen 6258 and maintaining the rotor 6254, a front portion 6251a of the casing 6251 is adapted to be opened and closed by a cylinder C2 and locked by a cylinder C3. The supplied wood pieces W are pressed from above by a restrain plate 6259.

For the feedstuff 6222 of the pig, garbage or leftover issued from home or restaurant, waste foods whose consume-by date has passed issued from stores, food residues from various kinds of food processing factories, or excretion of livestock are fermented by the large quantities of fermentation tubes within a container or on the wood chip floor 6217.

Also a drinking water 6221b for pigs is supplied with large quantities of fermentation tubes.

In order to enhance procreative power of the pig, clover, comfrey, premature barley, potato runners, Gramineae posture or wild grass is also fed to the pigs.

As the fermentation tubes are used bacteria or fungi such as lactobacillus for effectively fermenting the wood chips.

Namely, which lactobacillus for use in this pig-farming system 6201 is collected from plants or soil near to the farming place 6210 and cultured in large quantities by the culture device.

The culture device for use in the pig-farming system 6201 comprises the ultrafinely shattering apparatus for ultrafinely shattering organic granular substances for culture medium and the culture tank.

The cultural tank is used for culturing the fermentation tubes and restraining various other fungi by using the ultrafinely shattered organic substances contained in a portion of the high-speed water flows F discharged from the discharge pipe 6265.

The slurry containing the fermentation tubes such as *lactobacillus* is sprinkled over the wood chip layer suitably or regularly so that the fermentation tubes can be added to the chip layer. Accordingly, the wood chips in the farming place continue the fermentation decomposing the wood chip depending on its temperature under a pig-farming condition. The feces and urine of pigs absorbed into the wood chip layer are rapidly decomposed due to the continuation of fermentation to lessen the generation of offensive smell and to be effective for improving the neighbor environment.

As the decomposing of the wood chip proceeds, a volume of the wood chip layer gets decreased. Therefore, the replenishment of the wood chip is carried out together with the fermentation tubes contained in the slurry to be sprinkled or mixed into the wood chips for replenishment.

Areas where one kind of or several kinds of fermentation tubes prevail against others are formed on the wood chip layer. Of course, this pig-farming system may be applicable to the farming of livestock and a chicken.

What is claimed is:

1. A livestock breeding system comprising:
   a breeding place enclosed by a fence for breeding livestock;
   layers of wood chips spread over and stacked up on a surface of the earth in the breeding place; and
   a feedstuff for breeding the livestock, the feedstuff being a mixture of wood chips containing sawdust and/or wood fibers and fermentative bacteria, and wherein
   the layers of wood chips comprise the wood chips mixed with the fermentative bacteria,
   the breeding place has a waterproof layer laid on the surface of the earth and an infiltration filter layer laid on the waterproof layer,
   a catchment pit is formed in the earth surface so as to collect a liquid through the filter layer and/or the wood chip layer,
   a sprinkler device has a pump for sucking a liquid in the catchment pit and delivering it to a piping adapted to sprinkle it onto the uppermost wood chip layer from above, and
   the layers of wood chips comprise a layer of wood chips having a first coarseness and a layer of wood chips having a second coarseness less than the first coarseness, the layers being stacked on the filter layer;
   the livestock breeding system further comprising a feedstuff manufacturing plant including a wood smashing device for producing wood chips containing sawdust and/or wood fibers; a culture tank for culturing the fermentative bacteria,
   an apparatus for producing shattered organic particle substances comprising micrometer sized particulates by shattering waste organic substances, said apparatus comprising
   a cylindrical casing having a top wall, a bottom wall and two or more substantially concentric cylindrical walls arranged between the top wall and the bottom wall so as to define annular passages between the adjacent cylindrical walls;
   a water injection device for injecting a pressurized water tangentially into the annular passage so as to generate water flows of 8 m/second or more in a circumferential direction therein; and
   a supply port formed in at least one of the top wall, the bottom wall and the cylindrical walls for supplying the slurry containing the organic granular substances, wherein the organic granular substances are shattered into particulates including micrometer sized particulates by means of shearing action created between the water flows of 8 m/second or more,
   a fermentation tank for adding the cultured fermentative bacteria to the shattered organic particle substances supplied from the apparatus for shattered organic particle substances to ferment the organic particle substances as well as to culture the fermentative bacteria, and
   a mixing section for obtaining the feedstuff for livestock by mixing the wood chips from the wood smashing device with the fermented shattered organic particle substances supplied from the fermentation tank and containing the fermentative bacterial.

2. A livestock breeding system as set forth in claim 1, wherein the wood smashing device comprises a plurality of rotary smashing vertical blades arranged around respective rotary bodies attached to a vertical rotary shaft in a vertically stacked-up condition with a plurality stages within a vertical cylindrical casing; a stationary smashing blade having a concavo-convex or serrated surface and mounted to an inner surface of the cylindrical casing so as to be close to the rotary smashing vertical blades; a suction port provided in a lower end portion of the cylindrical casing for sucking up wood chips; a suction impeller vane attached to the vertical shaft so as to suck up wood chips and to deliver them between the rotary smashing vertical blades and the stationary smashing blades from below; and a discharging port provided in an upper portion of the cylindrical casing so as to discharge smashed wood chips outside.

3. A livestock breeding system according to claim 1, wherein the fermentative bacteria is lactobacillus.

4. A livestock breeding system comprising:
   a breeding place enclosed by a fence for breeding livestock;
   layers of wood chips spread over and stacked up on a surface of the earth in the breeding place; and
   a feedstuff for breeding the livestock, the feedstuff being a mixture of wood chips containing sawdust and/or wood fibers and fermentative bacteria, and wherein
   the layers of wood chips comprise the wood chips mixed with the fermentative bacteria,
   the breeding place having a waterproof layer laid on the surface of the earth and an infiltration filter layer laid on the waterproof layer,
   a catchment pit formed in the earth surface so as to collect a liquid through the filter layer and/or the wood chip layer,
   a sprinkler device having a pump for sucking a liquid in the catchment pit and delivering it to a piping adapted to sprinkle it onto the uppermost wood chip layer from above, and
   the layers of wood chips comprise a layer of wood chips having a first coarseness and a layer of wood chips having a second coarseness less than the first coarseness, the layers being stacked on the filter layer;

the livestock breeding system further comprising a feedstuff manufacturing plant, said plant comprising:

an organic substance smashing device for producing organic granular substances by smashing waste organic substances;

an apparatus for shattering organic granular substances to produce shattered organic particle substances to be suspended in a water clusters of which are shattered together with the organic granular substances supplied from the organic substance smashing device by impact forces of water flows of 8 m/second or more generated by a pump, shear forces produced by speed differentials between the of 8 m/second or more water flows, and/or ultrasonic forces produced by breakage of air bubbles contained in the water flows of 8 m/second or more;

a fermentation section for producing a suspension of the shattered organic particle substances containing fermentative bacteria cultured with the progress of fermentation after addition of the fermentative bacteria to the shattered organic particle substances suspended in the water;

a wood smashing device for producing wood chips containing sawdust and/or wood fibers by smashing wood; and a mixing section for obtaining feedstuff for livestock by mixing the wood chips from the wood smashing device with the suspension of fermented shattered organic particle substances from the fermentation section.

5. A livestock breeding system as set forth in claim 4, wherein the fermentation section is constructed as a fermentation enhancing tank for enhancing the fermentation stirring the suspension of the shattered organic particle substances to which the fermentative bacteria have been added after the apparatus for shattering organic granular substances.

6. A livestock breeding system as set forth in claim 4, wherein the wood smashing device comprises a plurality of rotary smashing vertical blades arranged around respective rotary bodies attached to a vertical rotary shaft in a vertically stacked-up condition with a plurality stages within a vertical cylindrical casing; a stationary smashing blade having a concavo-convex or serrated surface and mounted to an inner surface of the cylindrical casing so as to be close to the rotary smashing vertical blades; a suction port provided in a lower end portion of the cylindrical casing for sucking up wood chips; a suction impeller vane attached to the vertical shaft so as to suck up wood chips and to deliver them between the rotary smashing vertical blades and the stationary smashing blades from below; and a discharging port provided in an upper portion of the cylindrical casing so as to discharge smashed wood chips outside.

7. A livestock breeding system as set forth in claim 4 or 6, wherein the wood smashing device receives wood chips having a length of 3-5 cm supplied from a wood crusher which crushes wood pieces by a rotary cutter.

8. A livestock breeding system according to claim 4, wherein the fermentative bacteria is lactobacillus.

* * * * *